US006458741B1

(12) United States Patent
Roark et al.

(10) Patent No.: US 6,458,741 B1
(45) Date of Patent: Oct. 1, 2002

(54) CATALYSTS FOR LOW-TEMPERATURE DESTRUCTION OF VOLATILE ORGANIC COMPOUNDS IN AIR

(75) Inventors: Shane E. Roark, Boulder, CO (US); James H. White, Boulder, CO (US)

(73) Assignee: Eltron Research, Inc., Boulder, CO (US)

( * ) Notice: Subject to any disclaimer, the term of this patent is extended or adjusted under 35 U.S.C. 154(b) by 0 days.

(21) Appl. No.: 09/468,034

(22) Filed: Dec. 20, 1999

(51) Int. Cl.[7] .......................... B01J 23/10; B01J 23/38; B01J 23/54; B01D 53/72
(52) U.S. Cl. ...................... 502/303; 502/304; 502/308; 502/324; 502/326; 502/330; 502/331; 502/344; 502/345; 502/349; 502/350; 423/245.3
(58) Field of Search ................. 502/303–304, 502/308, 309, 313–319, 324–326, 330–331, 344–345, 349–350; 423/245.1, 245.3; 422/177

(56) References Cited

U.S. PATENT DOCUMENTS

| | | | |
|---|---|---|---|
| 3,885,020 A | 5/1975 | Whelan | 423/245 |
| 4,661,329 A | 4/1987 | Suzuki et al. | 423/245 |
| 4,968,656 A * | 11/1990 | Fukuda et al. | 502/244 |
| 5,061,464 A | 10/1991 | Cordonna, Jr. et al. | 423/213.5 |
| 5,283,041 A | 2/1994 | Nguyen et al. | 423/240 |
| 5,384,301 A | 1/1995 | Flytzani-tephanopoulos et al. | 502/304 |
| 5,491,120 A | 2/1996 | Voss et al. | 502/304 |
| 5,500,198 A | 3/1996 | Liu et al. | 423/246 |
| 5,627,124 A | 5/1997 | Farrauto et al. | 502/304 |
| 5,843,195 A | 12/1998 | Aoyama | 48/127.7 |
| 5,851,948 A | 12/1998 | Chuang et al. | 502/314 |
| 5,882,616 A | 3/1999 | Ziebarth et al. | 423/245.3 |
| 5,925,590 A * | 7/1999 | White et al. | 502/302 |

OTHER PUBLICATIONS

Liu, W. and Flytzani–Stephanopoulos, M., "Total Oxidation of Carbon Monoxide and Methane over Transition Metal–Fluorite Oxide Composite Catalyst: I. Catalyst Composition and Activity"; (1995) *J. Catal.* 153:304–316.

Liu, W. and Flytzani–Stephanopoulos, M., "Total Oxidation of Carbon Monoxide and Methane over Transition Metal–Fluorite Oxide Composite Catalyst: II. Catalyst Characterization and Reaction Kinetics"; (1995) *J. Catal.* 153:317–332.

Kundaković, Lj. and Flytzani–Stephanopoulos, M., "Cu–and Ag–Modified Cerium Oxide Catalyst for Methane Oxidation"; (1998) *J. Catal.* 179:203–221.

(List continued on next page.)

*Primary Examiner*—Wayne A. Langel
*Assistant Examiner*—Maribel Medina
(74) *Attorney, Agent, or Firm*—Greenlee, Winner & Sullivan, PC

(57) ABSTRACT

Catalyst compositions for destruction of volatile organic carbons (VOCs) in an oxygen-containing gas stream at low temperatures comprising: one or more first metals selected from the group consisting of: Ce and Zr; and at least one of: (a) one or more second metals selected from the group consisting of: Gd, La, Sr and Sc; (b) one or more third metals selected from the group consisting of: Ti, V, Mn, Fe, Co, Cr, Ni, Au, Ag and Cu; and (c) one or more fourth metals selected from the group consisting of Pt, Pd, Rh, Ru, Re, Os and Ir are provided. Catalyst compositions provided may be single-phase, mixed-metal oxides, or multi-phase. Catalysts of this invention have improved activity for VOC reduction at low temperatures in gaseous systems.

29 Claims, 27 Drawing Sheets

OTHER PUBLICATIONS

Perego, C. and Villa, P., "Catalyst preparation Methods"; (1997) *Catal. Today.* 34:281–305.

Spivey, J.J., "Complete Catalytic Oxidation of Volatile Organics"; (1987) *Ind. Eng. Chem. Res.* 26:2165–2180.

Terribile, D. et al., "Catalytic Combustion of Hydrocarbons with Mn and Cu–doped Ceria–zirconia Solid Solutions"; (1999) *Catal. Today* 47:133–140.

Trovarelli, A., "Catalytic Properties of Ceria and $CeO_2$–Containing Materials"; (1996) *Catal. Rev. Sci. Eng.* 38(4):439–520.

Trovarelli, A et al., "The Utilization of Ceria in Industrial Catalysis"; (1999) *Catal. Today* 50:353–367.

Barresi, A.A. and Baldi, B., "Deep Catalytic Oxidation of Aromatic Hydrocarbon Mixtures: Reciprocal Inhibition Effects and Kinetics"; (1994) *Ind. Eng. Chem.* 33:2964–2974.

Bernal, S. et al.; "Some Recent Results on Metal/Support Interaction Effects in $NM/CeO_2$ (NM: Noble Metal) Catalysts"; (1999) *Catal. Today* 50:175–206.

Gangwal, S.K. et al.,"Kinetics and Selectivity of Deep Catalytic Oxidation of n–Hexane and Benzene"; (1988) *Appl. Catal.* 36:231–247.

Haruta, M. et al., "Low–Temperature Oxidation of CO over Gold Supported on $TiO_2$, a–$Fe_2O_3$, and $Co_3O_4$"; (1993) *J. Catal.* 144:175–192.

Leitenburg, C. et al., "Wet Oxidation of Acetic Acid Catalyzed by Doped Ceria"; (1996) *Appl. Catal. B: Environmental* 11:L29–L35.

* cited by examiner

CATALYSTS FOR LOW-TEMPERATURE DESTRUCTION OF VOLATILE ORGANIC COMPOUNDS IN AIR

STATEMENT REGARDING FEDERALLY SPONSORED RESEARCH OR DEVELOPMENT

This invention was made with Government support under Contract No. F33615-98-C-5124 awarded by the Department of the Air Force. The Government has certain rights in the invention.

BACKGROUND OF THE INVENTION

This invention relates generally to catalysts for destruction of volatile organic compounds (VOCs).

Contamination of the environment by volatile organic compounds (VOCs) is of great concern. VOCs originate in many ways, including spray painting and engine maintenance (degreasing and fuel line repair), indoor air decontamination, dry cleaning, food processing (grills and deep fryers), fume hoods, residential use and solvent-intensive industrial processes. VOCs have direct and secondary (e.g. photochemical smog) effects on health and the environment.

Direct methods for removing VOCs from contaminated air require heating the air stream to relatively high temperatures to incinerate the contaminants. The cost required to maintain such elevated temperatures (around 815 to 925° C.) and to cool the surroundings can be unacceptably high.

Various catalysts have been studied for their use in lower-temperature removal of VOCs (see, for example, Spivey, J. J. (1987) Ind. Eng. Chem. Res. 26:2165–2180). The catalytic properties of ceria and $CeO_2$ containing materials have been reviewed (Trovarelli, A. (1996) Catal. Rev. Sci. Eng. 38(4):439–520; Bernal, S. et al. (1999) Catal. Today 50:175; Trovarelli, A. et al. (1999) Catal. Today 50:353–356). Pure $CeO_2$ is reported to be active for the oxidation of CO over the temperature range of 200° to 500° C. (Liu, W. and Flytzani-Stephanopoulos, M. (1995) J. Catal. 153:304–316). However, temperatures of at least 300° C. were reported to be necessary for methane oxidation using compositions such as $Ce_{0.2}Zr_{0.8}O_x$, $Cu_{0.08}[Ce(La)]_{0.92}O_x$, $Cu_{0.5}[Ce(La)]_{0.5}O_x$ and $Cu_{0.5}Zr_{0.5}O_x$ (where Ce(La) indicates cerium containing 1.5 wt % lanthanum) (Liu, W. and Flytzani-Stephanopoulos, M. (1995) J. Catal. 153:304–316).

In a mixture of CO and NO, $CeO_2$ can simultaneously oxidize CO and reduce NO to produce $CO_2$ and $N_2$. This quality has led to the application of $CeO_2$ in three-way catalysts for automotive exhaust systems. In this capacity, $CeO_2$ is used in combination with other metals to remove unburned hydrocarbons, CO, and NO (Trovarelli, A. (1996) Catal. Rev. Sci. Eng. 38(4): 439–520).

Cerium oxide doped with 10% Zr, 50% Zr, 4.5% La or 10% La, and cerium oxide (doped with Zr or La as above)-supported silver (2–5% Ag) or copper (5–15%) catalysts have been studied for the combustion of methane (Kundakovic, Lj. and Flytzani-Stephanopoulos, M. (1998) J. Catal. 179:203–221). Temperatures of at least 400° C. were required for any appreciable oxidation of methane using these materials.

$CeO_2$—$ZrO_2$ mixed oxides in proportions of $Ce_{0.92}Zr_{0.08}O_2$ to $Ce_{0.5}Zr_{0.5}O_2$, and $Ce_{0.76}Zr_{0.19}(Mn$ or $Cu)_{0.05}O_{2-x}$, have been reported for use in oxidation of C1–C4 hydrocarbons (Terribile, D. et al. (1999) Catal. Today 47:133–140). Temperatures of about 650 to about 800K were reported to be required for 50% conversion of methane, ethane, propane, butane and isobutane.

U.S. Pat. No. 5,283,041 describes a ternary compound of vanadium oxide (0.01 to 20 weight percent), zirconium oxide (40 to 88 weight percent) and either manganese oxide, cerium oxide and cobalt oxide (3 to 48 weight percent). Platinum, palladium and rhodium may also be present from 0.01 to 5 weight percent. This compound is used to treat gas streams containing halogenated organic compounds using temperatures of 175° C. to 550° C.

U.S. Pat. No. 5,491,120 describes an inert carrer with a BET surface area of at least 10 $m^2/g$ used to support a coating of bulk ceria with a BET surface area of at least 10 $m^2/g$ and one or more bulk metal oxides which are either titania, zirconia, ceria-zirconia, silica, alumina-silica or $\epsilon$-alumina metal oxide for oxidizing components of a gas stream, in particular a diesel engine exhaust.

U.S. Pat. No. 5,851,948 describes an inert porous support such as alumina or silica having a surface area of 10–400 $m^2/g$ used to support a catalyst composition of 0.5 to 15 wt % of chromium, cobalt, copper, cerium or iron oxide covered with a thin (at most 0.1 mm thick) layer of Pd, Pt, Ru or Rh (concentration of 0.01 to 2 wt %).

U.S. Pat. No. 5,627,124 describes a composition of ceria and alumina (each having a surface area of at least 10 $m^2/g$ and being 5 to 95 percent of the composition) coated on a refractory carrier for pollution abatement of exhausts containing unburned fuel or oil.

U.S. Pat. No. 5,882,616 describes perovskites of the formula $XYO_3$, where X is lanthanum, cerium or yttrium, and Y is a transition metal such as copper, chromium, manganese, iron, cobalt and nickel supported on a support such as alumina, silica, magnesium aluminate, titanium oxide, zirconium oxide and mixtures thereof.

Even with somewhat advanced materials, the technologies currently used for reduction of VOCs from contaminated air still require heating the air stream to relatively high temperatures to reduce the concentration of VOCs.

There remains a need for materials and processes that destroy VOCs at low concentrations at ambient- or near-ambient temperatures under oxygen-rich conditions. These materials should have high oxygen storage capacity, optimal surface oxygen mobility, stability against feedstream poisons, active sites with a propensity for $\pi$-bond systems as well as VOCs in general, and should not require high temperatures to reduce the concentration of VOCs in air.

BRIEF SUMMARY OF THE INVENTION

Catalyst compositions for destruction of VOCs comprising: at least one of cerium and zirconium with at least one member of the group consisting of: Gd, La, Sc, Cr, Ti, V, Mn, Fe, Co, Ni, Au, Ag, Cu Pt, Pd, Rh, Ru, Re, Os and Ir are provided.

Catalyst compositions of the invention may comprise mixed oxides, single-phase materials, or multi-phase materials. Catalyst compositions further comprising a supporting material are also provided.

One class of compounds of the invention include catalyst compositions for destruction of VOCs in a gas comprising one or more first metals selected from the group consisting of: Ce and Zr; and at least one of ((a) (b) or (c)) where (a) is one or more second metals selected from the group consisting of: Gd, La, Sr and Sc; (b) is one or more third metals selected from the group consisting of: Ti, V, Mn, Fe, Co, Cr, Ni, Au, Ag and Cu; and (c) is one or more fourth metals selected from the group consisting of Pt, Pd, Rh, Ru, Re, Os and Ir.

In this class of compounds, preferably the second metals are one or more of Gd, Sr and La. Preferably the third metals are one or more of Cu, Au, Fe, Co and Mn. The second and third metals together preferably comprise less than about 80% of said catalyst composition, more preferably together comprise less than about 50% of the catalyst composition, and most preferably together comprise between about 5 and 50% of the catalyst composition. Preferably the fourth metals are Pt, Pd and mixtures thereof, with Pt being more preferred than Pd. The fourth metals preferably comprise less than about 25% of said catalyst composition, and more preferably comprise less than about 5% of said catalyst composition, and most preferably comprise less than about 2% of said catalyst composition.

One class of compounds of the invention has one member from the group of second and third metals combined. Another class of compounds of the invention has one member from the group of second metals and one member from the group of third metals. Another class of compounds of the invention has more than one member from the group of second metals. Another class of compounds of the invention has more than one member from the group of third metals. Another class of compounds of the invention has more than one member from the group of second and third metals combined. Each of the above classes may optionally contain one or more members of the group of fourth metals.

Another class of compositions provided are the catalyst compositions with the formula:

$$nN/Ce_{1-x}Zr_cA_aA'_{a'}A''_{a''}B_bB'_{b'}B''_{b''}O_{2-\delta}$$

wherein n is a percentage from 0 to 25; N is one or more metals selected from the group consisting of Pt, Pd, Rh, Ru, Re, Os and Ir; x=a+a'+a''+b+b'+b''+c; a, a', a'', b, b', b'' and c are each, independently of one another, 0 to 0.9; δ is a number which renders the composition charge neutral; A, A' and A'' are independently selected from the group consisting of Gd, La, Sr and Sc; B, B' and B'' are independently selected from the group consisting of Ti, V, Mn, Fe, Co, Cr, Ni, Au, Ag and Cu; provided that when n is zero, at least one of a, a', a'', b, b', b'' or c is nonzero.

In this class of compounds, preferably, N is selected from the group consisting of Pt and Pd. Preferably, n is a percentage from 0 to 10, more preferably, n is a percentage from 0 to 5, and most preferably, n is a percentage from 0 to 2. In this class of compounds, preferably A, A'' and A'' are selected from the group consisting of Gd, La and Sr. In this class of compounds, preferably B, B'' and B'' are selected from the group consisting of Mn, Cu, Fe, Co and Cr. Preferably, c is between 0 to 0.2. Preferably, a+a'+a'' is between 0 and 0.1. Preferably b+b'+b'' is between 0.05 and 0.5.

Specific examples of this class of compounds include catalyst compositions of formula:

$$Ce_{1-f}Cu_fO_{2-\delta}$$

wherein f is about 0.001 to about 0.5 and δ is a number which renders the composition charge neutral. Specific examples of compounds of this formula include $Ce_{0.9}Cu_{0.1}O_{2-\delta}$ and $Ce_{0.8}Cu_{0.2}O_{2-\delta}$. Other specific examples of this class of compounds include catalyst compositions with formula $Ce_{1-g}Mn_gO_{2-\delta}$, wherein g is about 0.001 to about 0.8. Specific examples of compounds with this formula include catalyst composition of formula: $Ce_{0.8}Mn_{0.2}O_{2-\delta}$ and $Ce_{0.5}Mn_{0.5}O_{2-\delta}$. Other specific examples of this class of compounds include catalyst compositions with formula: $Ce_{0.5}Fe_{0.1}Cu_{0.4}O_{2-\delta}$, $Ce_{0.475}Zr_{0.05}Mn_{0.475}O_{2-\delta}$, $Ce_{0.45}Zr_{0.05}Mn_{0.45}Cu_{0.05}O_{2-\delta}$ and $Ce_{0.8}Zr_{0.05}Cu_{0.15}O_{2-\delta}$.

Another class of compounds included in the invention are those having formula:

$$nN/Ce_{1-x}Zr_cA_aA'_{a'}B_bB'_{b'}O_{2-\delta}$$

wherein n is a percentage from 0.01 to 15 N is one or more metals selected from the group consisting of Pt, Pd, Rh, Ru, Re, Os and Ir; x=a+a'+b+b'+c; a, a', b, b' and c are each, independently of one another, 0 to 0.5; δ is a number which renders the composition charge neutral; A and A' are independently selected from the group consisting of Gd, La, Sr and Sc; B and B' are independently selected from the group consisting of Ti, V, Mn, Fe, Co, Cr, Ni, Au, Ag and Cu; provided that when n is zero, at least one of a, a', b, b' or c is nonzero.

In this class of compounds, preferably, N is Pt or Pd, or mixtures thereof. Preferably, n is a percentage from 0.01 to 10, more preferably, n is a percentage from 0.01 to 5, and most preferably, n is a percentage from 0.01 to 2. In this class of compounds, preferably A and A' are one or more of Gd, La and Sr, and preferably B and B' are one or more of Mn, Cu, Co, Cr and Fe.

Specific examples of catalyst compositions of this class include 5%Pt/$Ce_{0.8}Cu_{0.2}O_{2-\delta}$, 1%Pt/$Ce_{0.8}Cu_{0.2}O_{2-\delta}$, 5%Pt/$Ce_{0.8}Sr_{0.2}O_{2-\delta}$, 1%Pt/$Ce_{0.8}Sr_{0.2}O_{2-\delta}$, 5Pt/$Ce_{0.8}Au_{0.2}O_{2-\delta}$, 1%Pt/$Ce_{0.8}Au_{0.2}O_{2-\delta}$, 5%Pt/$CeO_{2-\delta}$ and 1%Pt/$CeO_{2-\delta}$.

Another class of compounds of this invention include those having formula:

$$nN/m\ Ce_{1-x}A_aA'_{a'}B_bB'_{b'}O_{2-\delta}/Zr_{1-z}A''_{a''}A'''_{a'''}B''_{b''}B'''_{b'''}O_{2-\delta}$$

wherein n is a percentage from 0 to 15; m is a percentage greater than 0; N is one or more metals selected from the group consisting of Pt, Pd, Rh, Ru, Re, Os and Ir; x=a+a'+b+b'; z=a''+a'''+b''+b'''; a, a', a'', a''', b, b', b'' and b''' are each, independently of one another, 0 to 0.5; δ is a number which renders the composition charge neutral; A, A', A'' and A''' are independently selected from the group consisting of Gd, La, Sr and Sc; B, B', B'' and B''' are independently selected from the group consisting of Ti, V, Mn, Fe, Co, Cr, Ni, Au, Ag and Cu; provided that when n is zero, at least one of a, a', a'', a''', b, b', b'' or b''' is nonzero.

In this class of compounds, preferably, N is selected from the group consisting of: Pt and Pd and mixtures thereof. Preferably, n is a percentage from 0.01 to 10, more preferably, n is a percentage from 0.01 to 5, and most preferably, n is a percentage from 0.01 to 2. Preferably m is a percentage from 0.5 to 25. In this class of compounds, preferably A, A', A'' and A''' are independently selected from the group consisting of Gd, La and Sr, and B, B', B'' and B''' are independently selected from the group consisting of Mn, Cu, Co, Cr and Fe.

A specific example of compounds of this class include those of formula: 1% Pt/12%$CeO_2$/$ZRO_2$.

Another class of compounds of this invention include those having formula:

$$nN/m(CeO_2)/p(A_aA'A_{a'}A''_{a''}B_bB'_{b'}B''_{b''}O_{2-\delta})/q(A'''_{a'''}A''''_{a''''}A'''''_{a'''''}B'''_{b'''}B''''_{b''''}B'''''_{b'''''}O_{2-\delta})$$

wherein n, p and q are percentages from 0 to 50; m is a percentage greater than 0; N is one or more metals selected from the group consisting of Pt, Pd, Rh, Ru, Re, Os and Ir; a, a', a'', a''', a'''', a''''', b, b', b'', b''', b'''' and b''''' are each, independently of one another, 0 or 1; δ is a number which renders the composition charge neutral; A, A', A'', A''', A'''' and A''''' are independently selected from the group consisting of Gd, La, Sr and Sc; B, B', B", B''', B"" and B''''' are independently selected from the group consisting of Ti, V, Mn, Fe, Co, Cr, Ni, Au, Ag and Cu; provided that when n is zero, at least one of p and q is nonzero and at least one of a, a', a", a''', a"", a''''', b, b', b", b''', b"" and b''''' is nonzero.

In this class of compounds, preferably N is selected from the group consisting of Pt and Pd and mixtures thereof. In this class of compounds, A, A', A", A''', A"" and A''''' are preferably Gd, La and Sr, and B, B', B", B''', B"" and B''''' are preferably Mn, Cu, Co, Cr and Fe. Preferably, p and q are less than 50%. Preferably m is 10% to 50%. Preferably n is 5% or less.

Specific examples of compounds of this class include those with formula $CeO_{2-\delta}/10\%$ CuO and $CeO_{2-\delta}/10\%$ $MnO_2$.

More preferred catalysts of the invention are mixtures of cerium and/or zirconium with one or more metals selected from the group consisting of: Pt, Pd, Cu, Gd, Mn, Fe, Zr, La, Co, Sr, Au, and Cr. Preferably, these metals are present in a concentration of about 1% to 50%.

Also provided are methods for reducing the concentration of VOCs in an oxygen-containing gas containing at least one VOC which comprises the step of contacting said gas with a catalyst composition of the invention, whereby the concentration of at least one VOC in said gas is reduced. These methods may further comprise heating either said gas or said catalyst composition, or both, to a temperature sufficient to reduce the concentration of at least one VOC in said gas to a selected value. The catalyst compositions may be held in a reactor at temperatures of from about ambient temperature to about 250° C. Preferably, the temperatures are from about ambient temperature to about 150° C. The gases may contain the normal components of air, hydrocarbons and halogen-containing materials. The gas may also contain substances including water vapor, sulfur-containing gases and other substances.

Catalyst compositions useful in the methods of the invention include those with a surface area ranging from about 20 to about 220 $m^2/g$.

The catalyst compositions useful in the methods of the invention may be prepared by methods known in the art, or the methods described herein or modifications of methods known in the art or modifications of the methods described herein, including the method comprising: (a) treating a mixture of selected metal salt precursors with a precipitating reagent to form a precipitate; (b) drying said precipitate; (c) calcining said precipitate at a temperature of about 300° C. or higher; (d) contacting one or more solutions of one or more metals selected from the group consisting of Pt, Pd, Rh, Ru, Re, Os and Ir (preferably Pt or Pd or mixtures thereof) with said precipitate; (e) reducing said composition (preferably at temperatures of about 200° C. or higher); and optionally (f) oxidizing said composition (preferably at temperatures of between about 80° C. to about 800° C.). The catalyst compositions useful in the methods of the invention may also be prepared by the method comprising the steps: (a) mixing selected metal oxides; (b) ball milling said metal oxides; and (c) calcining in air (preferably at temperatures of about 300° C. or higher).

One class of catalyst compositions of the invention include combinations of ceria and/or zirconia optionally combined with platinum and/or palladium. Another class of catalyst compositions of the invention include combinations of ceria and/or zirconia at least one metal from the group consisting of: Gd, La, Sc, Cr, Ti, V, Mn, Fe, Co, Ni, Au, Ag and Cu, optionally combined with platinum and/or palladium. Catalyst compositions of the invention include those with predominantly fluorite crystal structures. Other structures that may be present include defect fluorite, pyrochlore ($A_2B_2O_7$) and perovskite-like phases. Cerium and zirconium oxide with some amount of dopants are generally present as fluorite structures. Dopants may also be present as oxides. A class of catalyst compositions of the invention are those that do not require an inert support, such as alumina or carbon. Another class of catalyst compositions of the invention include a support material such as a honeycomb matrix having inner and outer surfaces, wherein said catalyst material is present on the inner surfaces of said honeycomb matrix. Preferably, the support material is fabricated from ceramic materials, but may also be fabricated from metals or ceramic or metal fibers.

The catalyst compositions may be coated onto the support material by any method which produces a suitable coating of catalyst composition, including the method of: (a) treating a mixture of metal salt precursors with a precipitating reagent to form a precipitate; (b) preparing a slurry of said precipitate; (c) coating said slurry onto said support; and (d) calcining said slurry. The catalyst compositions may also be coated onto a support material by: (a) mixing a solution of metal salt precursors with the support; and (b) calcining said precursors. The catalyst compositions may also be coated onto said support material by: (a) mixing the support with one or more metal salt precursors to form a mixture; (b) treating said mixture with a precipitating reagent to form a precipitate; and (c) calcining said precipitate.

The methods above may also further comprise the steps of: adding one or more metals selected from the group consisting of Pt, Pd, Rh, Ru, Re, Os and Ir metal to form a composition; reducing said composition (preferably at temperatures of about 200° C. or higher); and optionally oxidizing said composition (preferably at temperatures of between about 80° C. to about 800° C.).

Also provided are methods of decomposition of VOCs in a gas, comprising the steps of providing a reactor containing a catalyst composition of the invention; and passing the gas through the reactor to decompose the VOCs. Also provided is a catalytic reactor for decomposition of VOCs in a gas which comprises: a casing having an entrance port, an exit port and a passage therebetween for the movement of said gases from said entrance port to said exit port with a catalyst composition of the invention in said passage. In the catalytic reactor, the gases preferably contact said catalyst before exiting said casing.

In the catalyst compositions of the invention, if a metal selected from the group consisting of: Pt, Pd, Rh, Ru, Re, Os and Ir and mixtures thereof is present, the metal(s) is preferably dispersed onto the metal oxide surface, and preferably the incipient wetness impregnation method is used.

As used herein, "catalyst composition" includes those compositions useful for destruction of VOCs in a gas. Catalyst compositions comprise at least one of cerium and zirconium with at least one member of the group consisting of: Gd, La, Sc, Cr, Ti, V, Mn, Fe, Co, Ni, Au, Ag, Cu Pt, Pd, Rh, Ru, Re, Os and Ir. Catalyst compositions of the invention are useful in reducing the concentration of at least one VOC in gas. As used herein, "destruction" of a VOC refers to the transformation of a VOC into another substance, preferably carbon dioxide and water. As used herein, "mixed metal oxides" include one or more metal oxides. As used herein, "single-phase material" is a material that comprises a single crystallographic phase. As used herein, "multi-phase material" refers to a material wherein some components are single-phase and other components are mixed metal oxides.

As used herein, a "precipitating reagent" is a substance or mixture of substances that causes precipitation of a desired substance. Preferred precipitating reagents include $NH_4OH$, $(NH_4)_2CO_3$, $Na_2CO_3$, NaOH, urea and $K_2CO_3$. As used herein, "contacting" substances is meant to indicate that substances are physically near each other, but is not intended to mean a homogeneous solution is formed. Preferably, reducing occurs in a hydrogen-containing atmosphere and oxidation occurs in air, but any reaction conditions that produce the desired result may be used.

The catalysts of this invention are suitable for use in any reactor system and particularly with either fixed and fluid bed reactors and can be prepared as powders or pressed into plugs, pellets and other shapes suitable for use in a given reactor configuration.

VOCs destroyed by the catalyst compositions of the invention include, but are not limited to: acetates, alkanes, alkenes, alcohols, aldehydes, ethers, esters, aromatics, carboxylic acids, ketones, and halogenated hydrocarbons.

The catalyst compositions of the invention may be used to reduce the concentration of VOCs in a gaseous atmosphere. Preferably, the VOCs are converted to carbon dioxide and water. Preferably, the gaseous atmosphere is oxygen-containing, and most preferably, the gaseous atmosphere is air. Catalyst composition of the invention may be used to reduce the concentration of VOCs in gases containing any concentration of VOCs. In one application, catalyst compositions of the invention may reduce the concentration of VOCs in air where there is an excess of oxygen and between between 10 ppm and percent levels of VOCs.

The catalysts of the invention are all useful to reduce the concentration of VOCs in gases at low temperatures (from about 200° C. and below). Preferably, temperatures from about 150° C. to about 30° C. are used. Most preferably, temperatures of about 100° C. and below are used.

The catalysts of the invention function in the presence of potentially interfering substances, such as water, sulfur-containing gases and halogens.

The catalysts are preferably preconditioned prior to said gases contacting said catalyst. The preconditioning treatment is useful to desorb moisture and change the oxidation state of some species. More preferably, the catalysts are preconditioned at a temperature of between about 150° C. to 400° C. Catalyst compositions of the invention are preferably preconditioned under a flow of air or VOC for a time sufficient to maximize activity, preferably for one hour or more. The preferred preconditioning time is longer at lower temperatures and can be as long as 24 hours at temperatures of 100° C. or less.

Catalysts of the invention have long lifetimes and can be regenerated by heating for a sufficient time to drive off adsorbed organics and moisture. For example, catalysts of the invention may be regenerated by heating at a temperature of about 150° C.

DETAILED DESCRIPTION OF THE INVENTION

Figure 1:
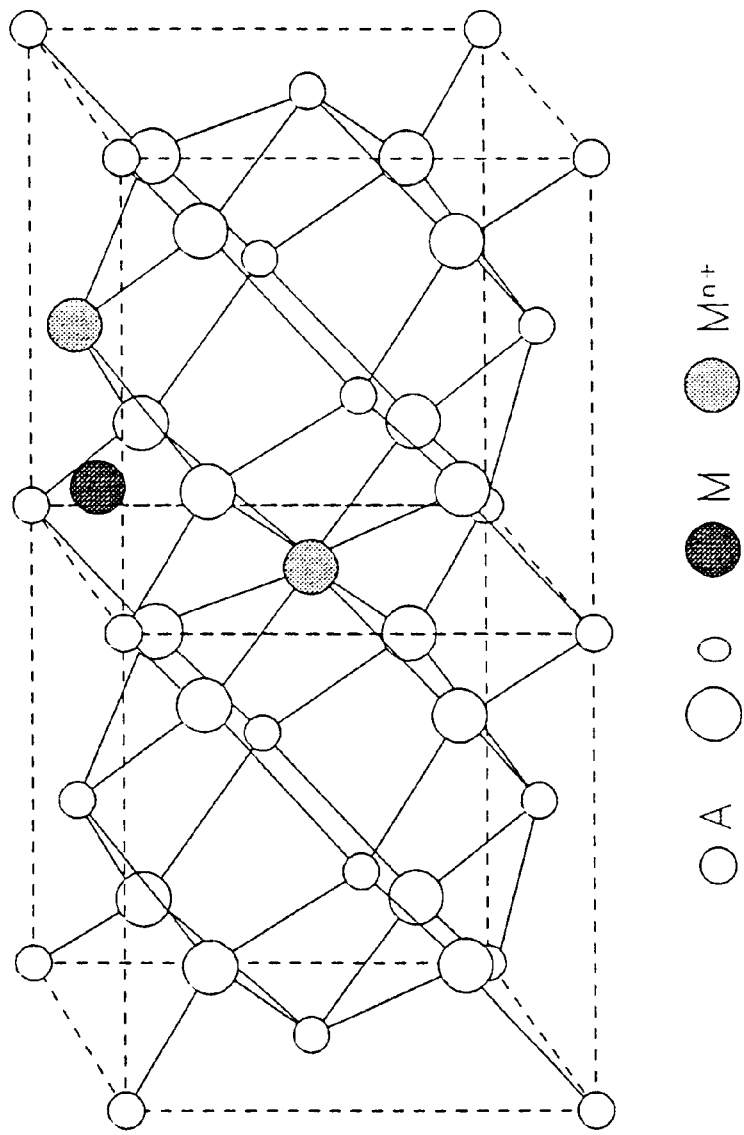
FIG. 1 is the crystallographic structure of doped fluorite-type oxides.

The oxidation catalysts described in this invention are useful for reducing the concentration of VOCs at lower temperatures than previously reported. High activity for the destruction of VOCs is achieved through a combination of appropriate catalyst elements and preparation procedures that optimize material qualities such as oxygen mobility, oxygen storage capacity, resistance to poisons, textural properties, metal dispersion, and active sites for a range of organic functional groups.

Some of the applications of these VOC oxidation catalysts include removal of VOCs from ventilated work spaces used in spray painting, fuel line maintenence, and vapor degreasing. These catalysts can also be used to treat vapor effluents from chemical processing, computer chip/device manufacturing, air-stripping towers and catalytic wet-air oxidation, dry cleaning, and restaurants. Furthermore, these catalysts can be used to decontaminate residential and workplace office air, in air filtration devices used in face masks for firefighting and underground mines, and for the destruction of biohazardous materials. Finally, these catalysts can be used to remove CO from feedstreams in hydrogen/oxygen fuel cells, where CO poisons the anode electrocatalyst, and as CO oxidation catalysts for $CO_2$ lasers, where the catalyst would increase the $CO_2/CO$ ratio, improving the laser performance.

The specific components of these catalysts can be separated into four categories. The first category includes Ce, which comprises the major portion of the metal oxide component either as $CeO_2$ or doped $CeO_2$. This component acts both as a support in synergy with noble metals, and an active metal oxide oxidation catalyst. An equilibrium between $Ce^{3+}$ and $Ce^{4+}$ results in an exceptionally high oxygen storage and release capacity that facilitates catalytic combustion by providing oxygen directly to catalytically active sites. Furthermore, $CeO_2$-containing catalysts are less susceptible to deactivation from water vapor and more resistant to sintering than catalysts employing inactive metal oxide supports such as $Al_2O_3$. Also included in this category is Zr, which has qualities similar to Ce and improves the low-temperature reducibility of $CeO_2$. The second category includes the metals Gd, La, Sc, and Sr which are incorporated as dopants in $CeO_2$ to promote oxygen vacancies and increase oxygen mobility within the catalyst. The oxygen vacancy association energy for these elements increases in the order Gd<La<Sc<Sr; therefore, varying the identity and concentration of these dopants allows control over the bulk oxygen mobility. The third category includes the metals Ti, V, Co, Cr, Ni, Au, Ag, Mn, Fe, and Cu. These metals contain multiple oxidation states and the corresponding oxides are also good oxidation catalysts. When combined with $CeO_2$, they provide additional catalytic active sites with metal oxygen bond strengths conducive to complete destruction of VOCs. Finally, the fourth category includes the metals Pt, Pd, Rh, Re, Os, Ru, and Ir. These elements are included in the catalysts mostly in the reduced state dispersed over the surface and within the pores of the metal oxide. Generally, inclusion of one of these fourth category metals in the composition significantly improves activity at low temperatures.

Using fluorite-type oxides (such as $CeO_2$ and $ZrO_2$) with appropriate dopants, in combination with other materials that have high oxygen exchange rates and demonstrated oxidation activity as metal supports (such as $MnO_x$ and $Fe_2O_3$), significant improvements in the materials used for supported metal catalysts are achieved. The crystallographic structure for a doped defect fluorite oxide is shown in FIG. 1. The fluorite-type metal oxides have a face-centered-cubic structure, with each tetravalent metal atom (O) surrounded by eight $O^{2-}$ ions (A) forming the vertices of a cube. Doping fluorite oxides with divalent or trivalent metals ($M^{n+}$) produces high oxygen vacancy concentrations, which can be controlled by the degree of doping and the specific dopant used. Therefore, choosing dopants with lower association energies will produce oxides with higher oxygen mobility.

Not desiring to be bound by theory, based on the range of compositions of these catalysts, several general mechanisms for VOC destruction are believed to be involved. The general mechanistic strategy for the catalytic decomposition of VOCs using the catalysts described in this work can be viewed in terms of the Mars-van Krevelen mechanism, (Gangwal, S. K. et al. (1988) Appl. Catal. 36:231–247):

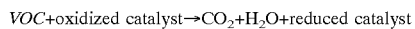
VOC+oxidized catalyst→$CO_2$+$H_2O$+reduced catalyst

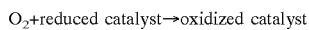
$O_2$+reduced catalyst→oxidized catalyst

Figure 2:
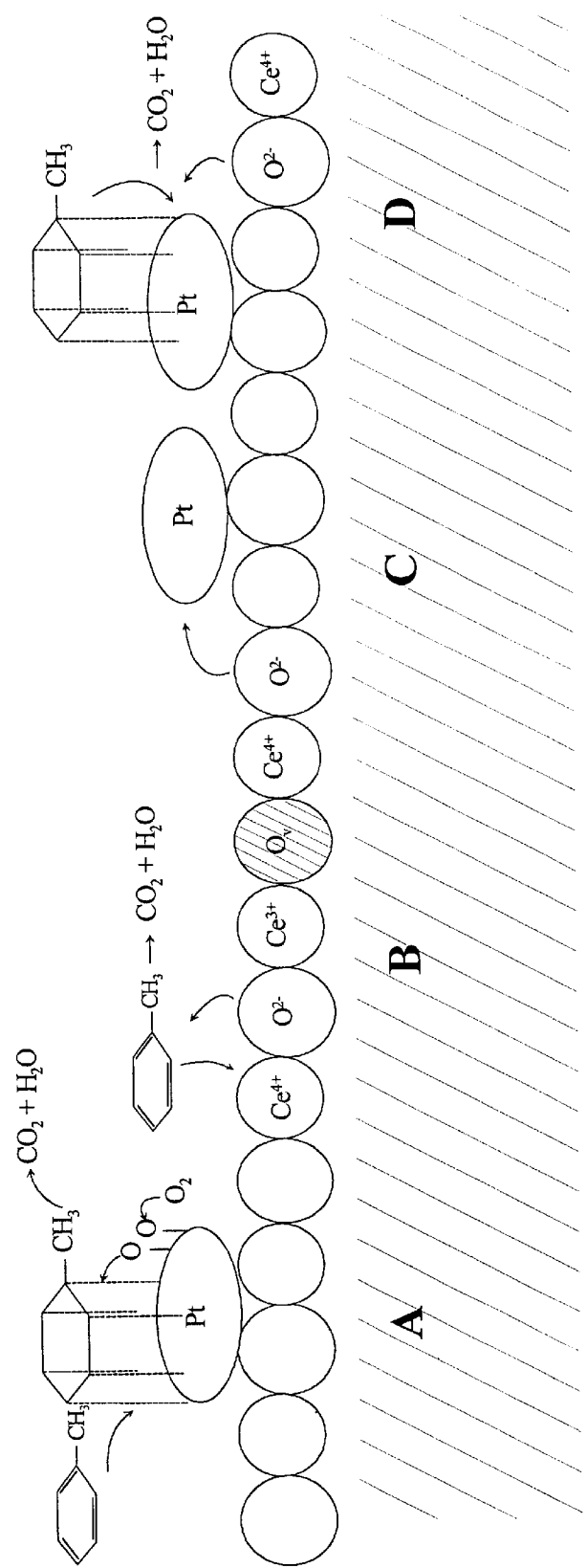
FIG. 2 is a schematic diagram showing the processes leading to oxidation of toluene on a $Pt/CeO_{2-\delta}$ catalyst.

The specific mechanism will depend on the identity of the VOC and catalyst, and for metals deposited onto active supports, it is likely that several mechanisms are occurring simultaneously and in concert. A general concept for the oxidation of VOCs by precious metals on active supports is shown in FIG. 2 for the oxidation of toluene on $Pt/CeO_2$. For such noble metal-containing catalysts, there is a contribution to the overall oxidation from the noble metal alone. Assuming a Langmuir-Hinshelwood process, the first step is adsorption of toluene and oxygen onto the Pt surface, as shown in section A of FIG. 2. Toluene adsorbs parallel to the surface (flat) to produce a Pt complex, which activates the toluene for further reaction (Barresi, A. A. and Baldi, B. (1994) Ind. Eng. Chem. 33:2964–2974). Oxygen adsorbs on adjacent Pt atoms, followed by dissociation. The oxidation of toluene then proceeds by reaction with atomic oxygen to produce $CO_2$ and $H_2O$. Similarly, toluene and oxygen also adsorb on the $CeO_2$ surface, followed by reaction to produce $CO_2$ and $H_2O$. However, on the $CeO_2$ surface, oxidation also can proceed by reaction with lattice oxygen resulting in the reduction of $Ce^{4+}$ to $Ce^{3+}$, as shown in section B of FIG. 2. The $Ce^{3+}$ is then oxidized back to $Ce^{4+}$ by reaction with gas-phase oxygen. The fact that this process occurs readily on $CeO_2$ surfaces is partly responsible for the activity of this material for oxidation reactions. Furthermore, the presence of Pt on the $CeO_2$ surface facilitates the reduction of $Ce^{4+}$, which is the rate limiting step in the oxygen uptake process, as shown in section C. An additional contribution to the overall oxidation comes from reaction of toluene and oxygen at the three-phase-boundary of the Pt, $CeO_2$ and gas phase (Liu, W. Flytzani-Stephanopoulos (1995) J. Catal. 153:317–332). In this process toluene either adsorbs to acidic sites on the $CeO_2$ and reacts with oxygen originating on the Pt surface, (Barresi, A. A. and Baldi, B. (1994) Ind. Eng. Chem. Res. 33:2964–2974) or toluene adsorbed on the Pt reacts with oxygen supplied by the $CeO_2$, as shown in section D of FIG. 2 (Haruta, M. et al. (1993) J. Catal. 144:175–192). The relatively high activity of $Pt/CeO_2$ catalyst systems for oxidation of VOCs, therefore, is likely partially the result of synergistic effects between the Pt metal and $CeO_2$ support. Additionally, adsorbed $O_2$ can react with gas-phase VOCs according to the Eley-Rideal mechanism. The supply of $O_2$ to the noble metal surface comes from the gas phase or spillover from the metal oxide. Similar mechanisms also likely occur on the metal oxide surface; however, the VOCs can react either with adsorbed oxygen or lattice oxygen.

Those of ordinary skill in the art will appreciate that methods, techniques, and components other than those specifically described herein can be employed in the practice of the invention without departing from its spirit scope. The following examples illustrate the invention and are in no way intended to limit its scope.

EXPERIMENTAL

A. Catalyst Synthesis

The doped $CeO_2$ and mixed-oxide catalysts in this invention can be prepared by methods known in the art, including coprecipitation, hydrothermal synthesis, calcination, washcoating, impregnation-deposition or ceramic processing. Methods of making the catalysts are described herein or are well known in the art, or readily adapted from the methods described herein or those methods well known in the art by one of ordinary skill in the art without undue experimentation. Such methods known in the art are described, for example, in Perego, C. and Villa, P., (1997) Catalysis Today, 34:281–305.

Preparation of Powder Supports

Many powder support materials were prepared by co-precipitation. In this procedure the metal nitrate precursors were dissolved in water (cerium-based) or methanol (zirconium-based) in the appropriate molar ratios. The concentration of the primary metal cation for each support (i.e. cerium and zirconium) before precipitation was approximately 0.4 M. Zirconyl nitrate had to be gently heated with stirring overnight in methanol for dissolution. The precipitant used may be $NH_4OH$, NaOH, KOH, $Na_2CO_3$, urea, $K_2CO_3$, sodium or potassium oxylate, or any other substance able to perform the desired precipitation. In the preparation of most of the powder supports the precipitant used was $NH_4OH$ in concentrations as low as 1 M. During precipitation, the mixture was stirred vigorously. Precipitant was added beyond the calculated stoichiometric equivalence point, until the supernatant liquid tested basic. The resulting precipitates were vacuum filtered and washed three times with room-temperature deionized water, then dried at 90–110° C. for several hours. The dried powders were finely ground and heated in air at temperatures of 200–900° C. for 2–12 hours to produce the metal oxide support. After oxidation, the powders were reground and passed through a 150-$\mu$m sieve.

Hydrothermal synthesis also involves the precipitation of the oxide from the precursor salts with a base; however, the reaction is carried out at temperatures between 100° and 350° C. in a sealed vessel. Preferably a pressure of less than 15 MPa is used, and the samples are aged for 5 to 60 minutes. Following crystallite formation, the crystallite powders are filtered, washed and dried. The hydrothermal process tends to produce ultra fine powders with a very narrow distribution of particle sizes and shapes.

As an example of a mixed oxide, wash-coated catalyst $CeO_2/ZrO_2$ in Table 1 was prepared by forming a suspension of $ZrO_2$ in a solution of $Ce(NO_3)_3$, followed by precipitation of the cerium, filtering, and oxidation in air as described above.

Alternatively, for the impregnation/decomposition method, 2 g of $ZrO_2$ was placed in a beaker, and an appropriate volume of a 0.2 M $Ce(NO_3)_3$ solution was added slowly with continuous stirring and gentle heating. Addition of the nitrate solution was slow enough that the mixture had a paste-like consistency with no standing liquid. After addition of the nitrate solution the mixture was dried at ~90° C. overnight, ground to a fine powder, then heated at 400° C. in air for four hours. After cooling to room temperature, the powder was again ground and passed through a 150 $\mu$m sieve.

For ceramic processing, a mixture of the oxides or carbonates in the appropriate stoichiometric ratios was ball milled for 24 hours, then passed through a 355-$\mu$m and a 90-$\mu$m sieve. The powder was then calcined in a ceramic crucible at 1200° C. for 6 hours. After cooling, the support powder was passed through a 150-$\mu$m sieve. This process eliminates problems associated with selective precipitation that might be encountered with coprecipitation; however, the high processing temperatures generally result in catalysts with much lower surface areas.

Incorporation of Pt and Pd

The catalyst metals Pt and Pd were added to the support powders primarily by incipient wetness/impregnation. For the impregnation method, three approaches were used. In the first approach, 1-mL increments of a 10-mg/mL Pt solution were added to the support powder creating a suspension. The suspension was gently heated and stirred until the water evaporated, followed by addition of another 1 mL of Pt solution. This process was repeated until the desired Pt loading was achieved. In the second approach, only a few drops of the Pt solution were added at a time, so that the solution was completely absorbed by the powder. As above, this process was repeated with occasional stirring until the desired metal loading was achieved. For the third approach, the desired volume of Pt precursor solution was mixed with the support powder and rotated under reduced pressure until dry. Following impregnation, the Pt was reduced in a furnace at 300° C. for 3 hours under $H_2$ flowing at 100–200 mL/min.

Several of the catalysts were prepared by adding platinum before the co-precipitation step. For this simultaneous addition method, the appropriate amount of platinum salt was added to the metal nitrate solution before precipitation with the $NH_4OH$ so that the Pt was incorporated into the precipitate rather than only on the support surface.

Catalyst Pretreatment

Prior to testing, all catalysts were heated at 100 to 200° C. under a flow of air overnight.

B. Catalyst Characterization

Catalysts were characterized using various methods, including B.E.T. surface area measurements, particle size measurement, metal particle dispersion, Fourier transform infrared absorption (FTIR), X-ray diffraction (XRD), energy dispersive X-ray spectroscopy (EDX), and scanning electron microscopy (SEM). Other methods, including oxygen temperature programmed desorption (TPD) may also be used.

Surface Area Analysis

Table 1 presents a summary of the surface area measurements for several of the catalysts investigated. The surface area analysis was performed using a Micromeritics ASAP-2000 surface area analyzer/porosimeter with nitrogen/helium mixtures. For this work, surface areas were determined from nitrogen volume/partial pressure isotherms using the B.E.T. method.

From the table the following can be seen: (i) the $ZrO_2$ and $ZrO_2$-containing support materials tended to have much higher surface areas than the $CeO_2$ analogs; (ii) incorporation of dopants into $CeO_2$ substantially increased the surface area, with Co and Cu giving the greatest increase; (iii) addition of Pt slightly increased the surface area of $CeO_2$ supports, decreased the surface area of $ZrO_2$ supports, and had no effect on the surface area of doped-$CeO_2$ supports.

Pore size distribution of catalysts was also determined from the multipoint nitrogen isotherm. Initially, it is assumed that adsorption can occur in the micropores of the particles. This behavior is manifested as BET-type adsorption at relatively low values of x, followed by a saturation-type (Langmuir) adsorption as the relative pressure is increased, and the pores fill with adsorbate. The adsorption isotherm in this case is expressed in terms of a quantity possessing units of length.

Particle Size Measurement

Catalyst particle size measurements were performed using a Shimadzu SALD-2001 Particle Size Analyzer. Measurements were obtained by dispersing catalyst powder in ultra-pure water, which was then passed through a flow cell. A collimated beam from a diode laser was directed through the flow cell and the light diffracted and scattered by the particles was detected by sensors in appropriate positions to detect light from all angles. This arrangement of sensors allows detection of light diffracted and scattered from large and small particles, which enables a particle size range of 0.03 $\mu$m to 700 $\mu$m to be measured. Laser beam intensity distributions were converted into particle size distributions using Shimadzu software that combines Fraunhofer, Mie and side-scatter processing methods. Information from this technique was used to correlate catalyst particle sizes and distributions to preparation methods and catalytic activity.

Metal Particle Dispersion

Group VIII metals used in this work generally adsorb $H_2$ and CO irreversibly at room temperature. The stoichiometry is approximately one H atom or one CO molecule per metal atom, which allows adsorption of these gasses to be used to calculate metal surface area. Based on the determined surface area of the metal and the known amount of metal present, the dispersion of metal particles can be calculated. However, two major factors regarding the catalysts in this work must be considered when interpreting such adsorption data. First, $CeO_2$ and presumably $CeO_2$-based materials adsorb $H_2$ (and $O_2$) which leads to erroneously high dispersion calculations. Second, $CeO_2$-supported Pt possibly will have some activity for the oxidation of CO to $CO_2$, even at low temperatures. This second consideration highlights a major factor leading to ambiguous results for dispersion measurements on supported metals, which is the effect of strong support-metal interactions. It has been demonstrated that such interactions produce unpredictable adsorption stoichiometry characteristics leading to inaccurate calculations of metal dispersion. This effect is particularly pronounced for metals deposited onto supports with reductive pretreatment.

More than one method may be used to determine metal dispersion. First, CO can be used as the probe molecule and a correction for the amount CO converted to $CO_2$ can be made based on mass spectrometer measurements. Second, transmission-electron microscopy can be used to image the metal particles on the support surface. Measurement of the particle diameters will yield a particle size distribution that can be correlated to particle dispersion by making assumptions about the particle shapes. Finally, XRD data can be used to estimate the metal particle sizes, t, according to the Scherrer equation, $$t=0.9\lambda/B \cos \theta_B \quad (5)$$

where $\lambda$ is the incident wavelength, B is the peak width at one half of the maximum intensity, and $\theta_B$ is Bragg angle. This method is only effective for small particle sizes, and is difficult to use at very low metal loading.

XRD. XRD analysis was performed on the support powders to confirm their anticipated crystal structures, and determine if the materials are single phase. Diffraction patterns were obtained using wither a Rigaku Miniflex X-ray Diffractometer (Model CN2005) or a Philips PW 1830 with $CuK_\alpha$ line radiation ($\lambda=1.5418$ Å).

Peak positions in the diffraction pattern are determined experimentally as $2\theta$ values. Using Bragg's law, the interplanar spacings, d, are determined. Using commercial software (Micro-Index, Materials Data, Inc.), the crystal lattice symmetry and lattice parameters are calculated from the interplanar spacing. This information allows correlation of catalyst powder activity with crystallographic structural parameters, and allows determination if the support materials are single phase or mixed oxides.

Figure 3:
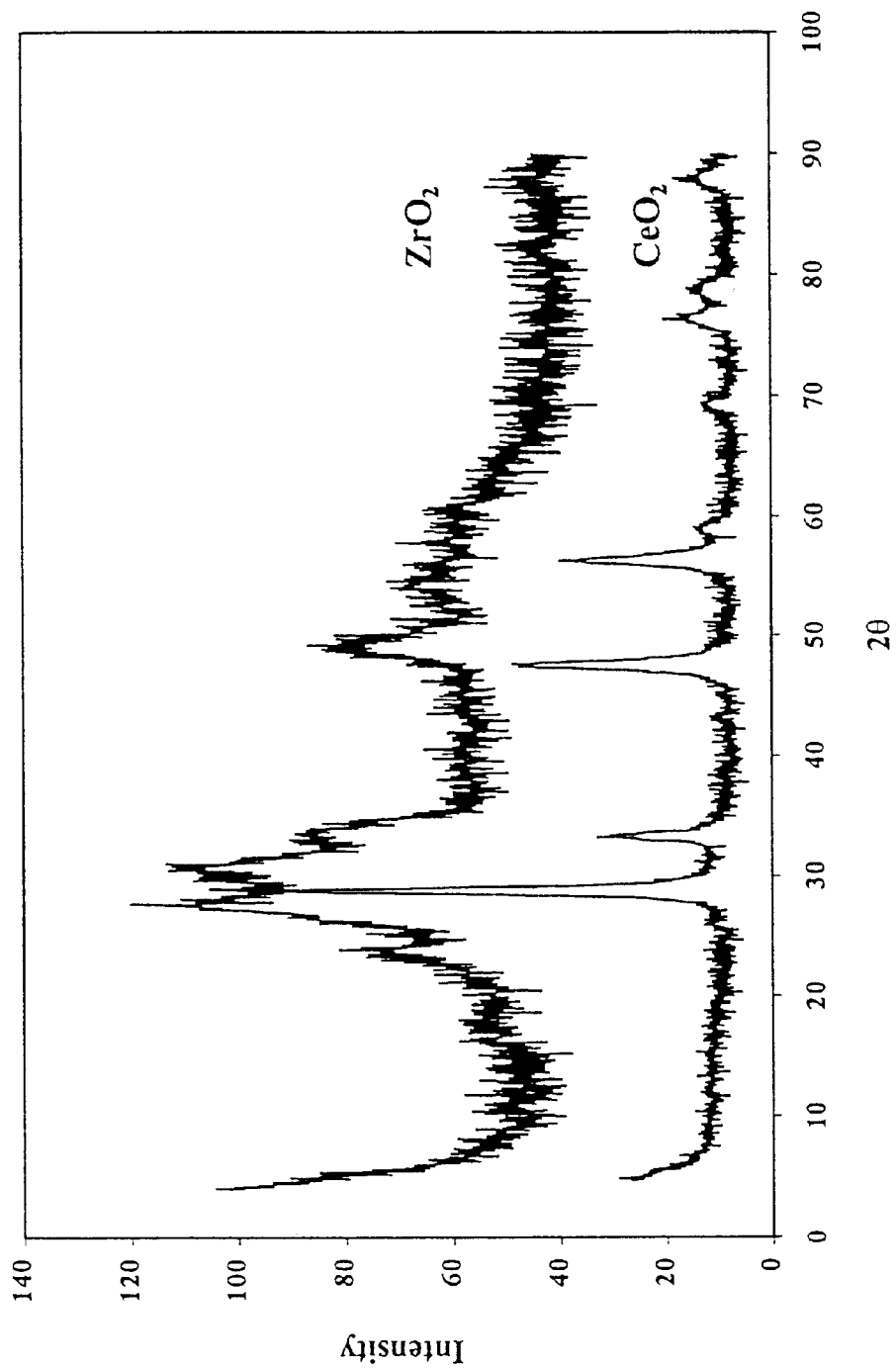
FIG. 3 shows XRD patterns for $ZrO_2$ and $CeO_2$.
Figure 4:
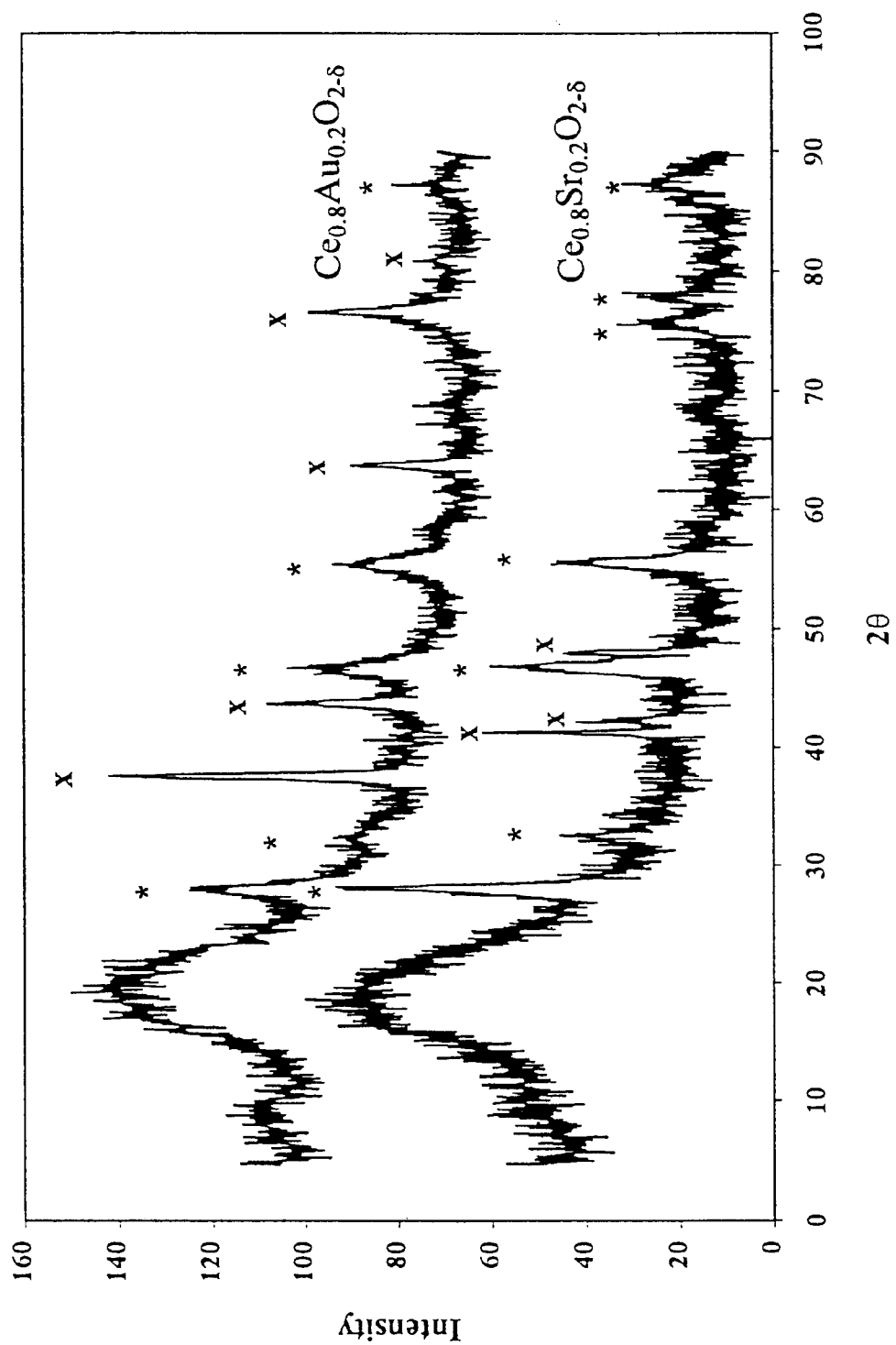
FIG. 4 shows XRD patterns for $Ce_{0.8}Sr_{0.2}O_{2-\delta}$ and $Ce_{0.8}Au_{0.2}O_{2-\delta}$.

FIG. 3 shows the XRD patterns for $CeO_2$ and $ZrO_2$, and indicates that the ceria is primarily a single-phase fluorite structure material, whereas the $ZrO_2$ is mostly amorphous. The majority of the doped $CeO_2$ support powders demonstrated XRD patterns like $CeO_2$, and were determined to be primarily single phase. Examples of these materials include $Ce_{0.8}Zr_{0.2}O_{2-\delta}$, $Ce_{0.8}Gd_{0.2}O_{2-\delta}$, $Ce_{0.8}Co_{0.2}O_{2-\delta}$, $Ce_{0.8}Cu_{0.2}O_{2-\delta}$, and $Ce_{0.8}Fe_{0.2}O_{2-\delta}$, $Ce_{0.48}Zr_{0.05}Mn_{0.48}O_{2-\delta}$, and $Ce_{0.45}Zr_{0.05}Mn_{0.45}Cu_{0.05}O_{2-\delta}$, However, examples of catalysts with significant multi-phase contributions include $Ce_{0.8}Sr_{0.2}O_{2-\delta}$ and $Ce_{0.8}Au_{0.22}O_{2-\delta}$, (shown in FIG. 4) as well as mixed oxide cataysts such as 10%$CuO/CeO_2$. The asterisks in FIG. 4 identify peaks from the fluorite phase and the x identifies other phases. The broad peak at $2\theta$ values less than 25 in FIG. 4 is a background signal from the sample holder used for small sample sizes. The second phase in the $Ce_{0.8}Au_{0.2}O_{2-\delta}$ powder is from metallic gold; however, the identity of the additional phase (s) in the pattern for $Ce_{0.8}Sr_{0.2}O_{2-\delta}$ is not clear. Comparison to XRD patterns for precursors and oxides indicated that the additional peaks were not from $SrCO_3$ or SrO.

Figure 5:
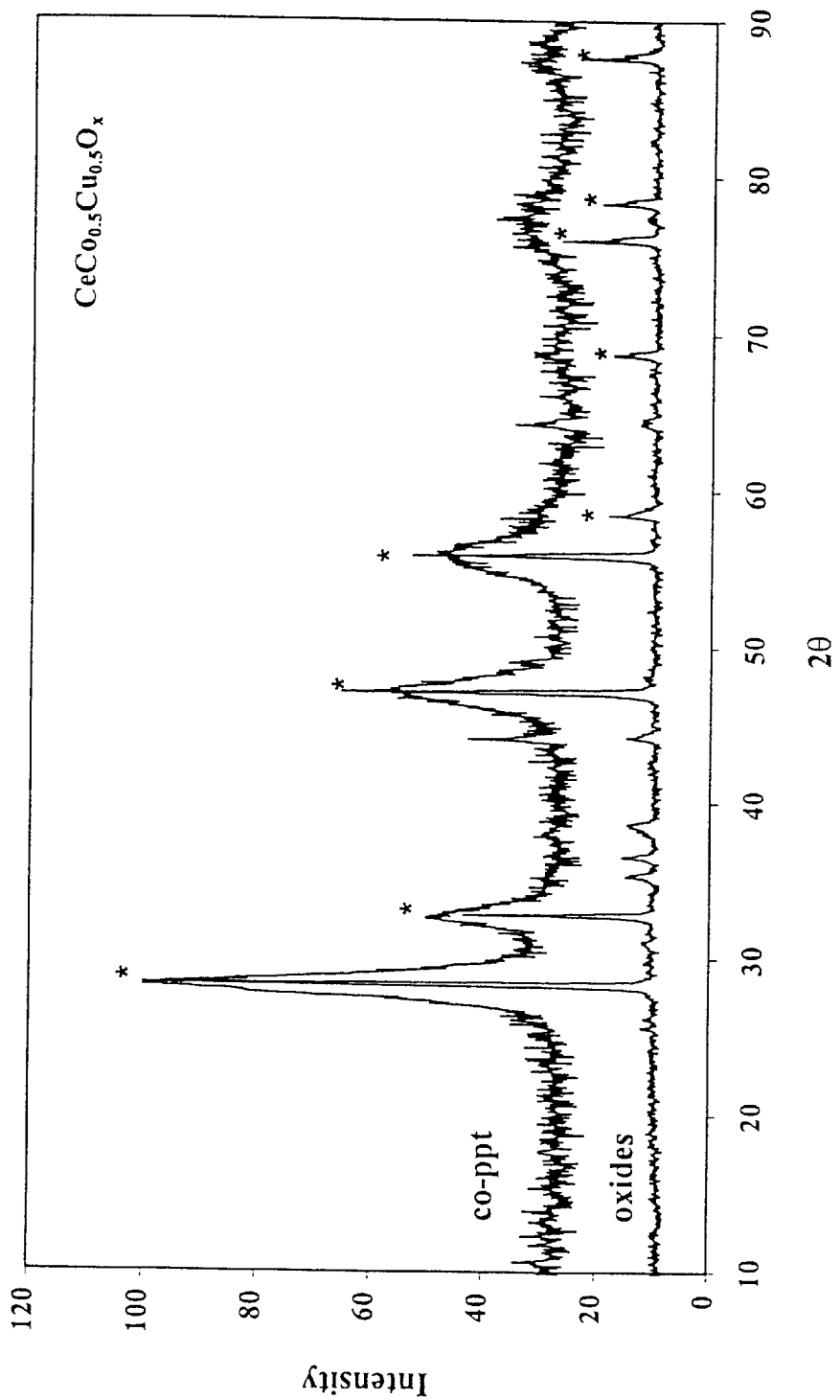
FIG. 5 shows XRD patterns for $CeCo_{0.5}Cu_{0.5}O_x$ prepared by co-precipitation and from the constituent oxides using ceramic processing.

FIG. 5 shows the XRD patterns for $CeCo_{0.5}Cu_{0.5}O_{2-\delta}$ prepared by co-precipitation from the metal nitrates, and from the metal oxides using ceramic processing. Both samples demonstrated primarily a fluorite structure (indicated with asterisks); however, the sample prepared from the oxides had much greater crystallinity resulting from the higher processing temperatures. Furthermore, contributions from other phases are clearly evident in the latter sample. Specifically, the peaks between $2\theta$ values of 30 and 50 are from $Co_3O_4$ and CuO.

TABLE 1

Support and Catalyst B.E.T. Surface Area Measurements

| Support Material | Pt or Pd Metal Loading | Surface Area ($m^2/g$) |
|---|---|---|
| $CeO_2$ | none | 24 |
| | 1% Pt | 33 |
| | 5% Pt | 36 |
| | 10% Pt | 35 |
| | 5% Pd | 66 |
| $ZrO_2$ | none | 125 |
| | 5% Pt | 74 |
| 25% $CeO_2/ZrO_2$ | none | 86 |
| 12% $CeO_2/ZrO_2$ | 1% Pt | 112 |
| $Ce_{0.8}Zr_{0.2}O_{2-\delta}$ | none | 107 |
| | 5% Pt | 101 |
| $CeCo_{0.5}Cu_{0.5}O_{2-\delta}$ (co-ppt.) | none | 98 |
| | 5% Pt | 97 |
| $CeCo_{0.5}Cu_{0.5}O_{2-\delta}$ (oxides) | none | 0.7 |
| $Ce_{0.9}Cu_{0.1}O_{2-\delta}$ | none | 89 |
| $Ce_{0.5}Cu_{0.5}O_{2-\delta}$ | none | 170 |
| $Ce_{0.9}Sr_{0.1}O_{2-\delta}$ | none | 66 |
| $Ce_{0.5}Sr_{0.5}O_{2-\delta}$ | none | 48 |
| $Ce_{0.8}Gd_{0.2}O_{2-\delta}$ | none | 80 |
| $Ce_{0.8}Fe_{0.2}O_{2-\delta}$ | none | 95 |
| $Ce_{0.8}Co_{0.2}O_{2-\delta}$ | none | 135 |
| 10% $CeO_2/CuO$ | none | 8 |
| 10% $CuO/CeO_2$ | none | 11 |
| 10% $CuO/CeO_2$ | none | 12 |
| 10% $CuO/CeO_2$ (higher surface area ceria) | none | 41 |
| 10% $CuO/CeO_2$ (higher surface area ceria) | none | 41 |
| $Ce_{0.9}Cu_{0.1}O_{1.9}$ | none | 85 |
| $Ce_{0.8}Cu_{0.2}O_{1.8}$ | none | 120 |
| $Ce_{0.7}Cu_{0.3}O_{1.7}$ | none | 125 |
| $Ce_{0.6}Cu_{0.4}O_{1.6}$ | none | 179 |
| $Ce_{0.5}Cu_{0.5}O_{1.5}$ | none | 172 |
| $Ce_{0.8}Cu_{0.2}O_{1.8}$ | none | 100 |
| $Ce_{0.6}Cu_{0.4}O_{1.6}$ | none | 119 |
| 10% $CeO_2/MnO_2$ | none | 12 |
| 10% $MnO_2/CeO_2$ | none | 12 |
| 10% $MnO_2/CeO_2$ | none | 12 |
| 10% $MnO_2/CeO_2$ (higher surface area ceria) | none | 36 |
| 10% $MnO_2/CeO_2$ (higher surface area ceria) | none | 32 |
| 10% $CeO_2/Fe_2O_3$ | none | 11 |
| 10% $Fe_2O_3/CeO_2$ | none | 19 |
| 10% $Fe_2O_3/CeO_2$ | none | 23 |
| 10% $CeO_2/Co_3O_4$ | none | 9 |
| 10% $Co_3O_4/CeO_2$ | none | 15 |

TABLE 1-continued

Support and Catalyst B.E.T. Surface Area Measurements

| Support Material | Pt or Pd Metal Loading | Surface Area (m$^2$/g) |
|---|---|---|
| 10% Co$_3$O$_4$/CeO$_2$ | none | 16 |
| 10% ZrO$_2$/CeO$_2$ | none | 18 |
| 10% ZrO$_2$/CeO$_2$ | none | 26 |
| 10% ZrO$_2$/10% CuO/CeO$_2$ | none | 27 |
| 10% ZrO$_2$/10% MnO$_2$/CeO$_2$ | none | 36 |
| 10% ZrO$_2$/10% Fe$_2$O$_3$/CeO$_2$ | none | 35 |
| 10% ZrO$_2$/10% Co$_3$O$_4$/CeO$_2$ | none | 33 |
| Ce$_{0.95}$Gd$_{0.05}$O$_{1.98}$ | none | 78 |
| Ce$_{0.8}$Gd$_{0.2}$O$_{1.9}$ | none | 73 |
| Ce$_{0.5}$Gd$_{0.5}$O$_{1.5}$ | none | 29 |
| Ce$_{0.95}$Sr$_{0.05}$O$_{1.95}$ | none | 77 |
| Ce$_{0.8}$Sr$_{0.2}$O$_{1.8}$ | none | 50 |
| Ce$_{0.95}$Co$_{0.05}$O$_{1.95}$ | none | 85 |
| Ce$_{0.8}$Co$_{0.2}$O$_{1.8}$ | none | 112 |
| Ce$_{0.5}$Co$_{0.5}$O$_{1.5}$ | none | 95 |
| Ce$_{0.95}$Mn$_{0.05}$O$_{1.95}$ | none | 102 |
| Ce$_{0.8}$Mn$_{0.2}$O$_{1.8}$ | none | 111 |
| Ce$_{0.5}$Mn$_{0.5}$O$_{1.5}$ | none | 120 |
| Ce$_{0.95}$Zr$_{0.05}$O$_{1.95}$ | none | 114 |
| Ce$_{0.8}$Zr$_{0.2}$O$_{1.8}$ | none | 64 |
| Ce$_{0.5}$Zr$_{0.5}$O$_{1.5}$ | none | 68 |
| Ce$_{0.75}$Zr$_{0.2}$Cu$_{0.05}$O$_{1.95}$ | none | 28 |
| CeO$_2$ | none | 44 |
| CuO | none | 5 |
| Co$_3$O$_4$ | none | 35 |
| MnO$_2$ (Mn$_2$O$_3$) | none | 16 |
| CeCo$_{0.5}$Cu$_{0.5}$O$_{2-\delta}$ | none | 103 |
| CeMn$_{0.5}$Cu$_{0.5}$O$_{2-\delta}$ | none | 109 |
| CeFe$_{0.5}$Cu$_{0.5}$O$_{2-\delta}$ | none | 144 |
| Ce$_{0.5}$Co$_{0.1}$Cu$_{0.4}$O$_{2-\delta}$ | none | 139 |
| Ce$_{0.5}$Mn$_{0.1}$Cu$_{0.4}$O$_{2-\delta}$ | none | 188 |
| Ce$_{0.5}$Fe$_{0.1}$Cu$_{0.4}$O$_{2-\delta}$ | none | 170 |
| Ce$_{0.95}$La$_{0.05}$O$_{2-\delta}$ | none | 87 |
| Ce$_{0.45}$La$_{0.05}$Mn$_{0.25}$Cu$_{0.25}$O$_{2-\delta}$ | none | 209 |
| Mn$_{0.95}$Ce$_{0.05}$O$_{2-\delta}$ | none | 25 |
| Ce$_{0.8}$Zr$_{0.05}$Mn$_{0.15}$O$_{2-\delta}$ | none | 94 |
| Ce$_{0.9}$Zr$_{0.05}$Mn$_{0.05}$O$_{2-\delta}$ | none | 87 |
| Ce$_{0.8}$Zr$_{0.05}$Mn$_{0.1}$Cu$_{0.05}$O$_{2-\delta}$ | none | 106 |
| Ce$_{0.45}$Zr$_{0.05}$Mn$_{0.45}$Cu$_{0.05}$O$_{2-\delta}$ | none | 76 |
| Ce$_{0.9}$Zr$_{0.025}$Mn$_{0.05}$Cu$_{0.025}$O$_{2-\delta}$ | none | 88 |
| Cr$_2$O$_3$ | none | 2 |
| Ce$_{0.8}$Zr$_{0.05}$Cu$_{0.15}$O$_{2-\delta}$ | none | 64 |
| Ce$_{0.48}$Zr$_{0.05}$Cu$_{0.48}$O$_{2-\delta}$ | none | 114 |

Figure 6:
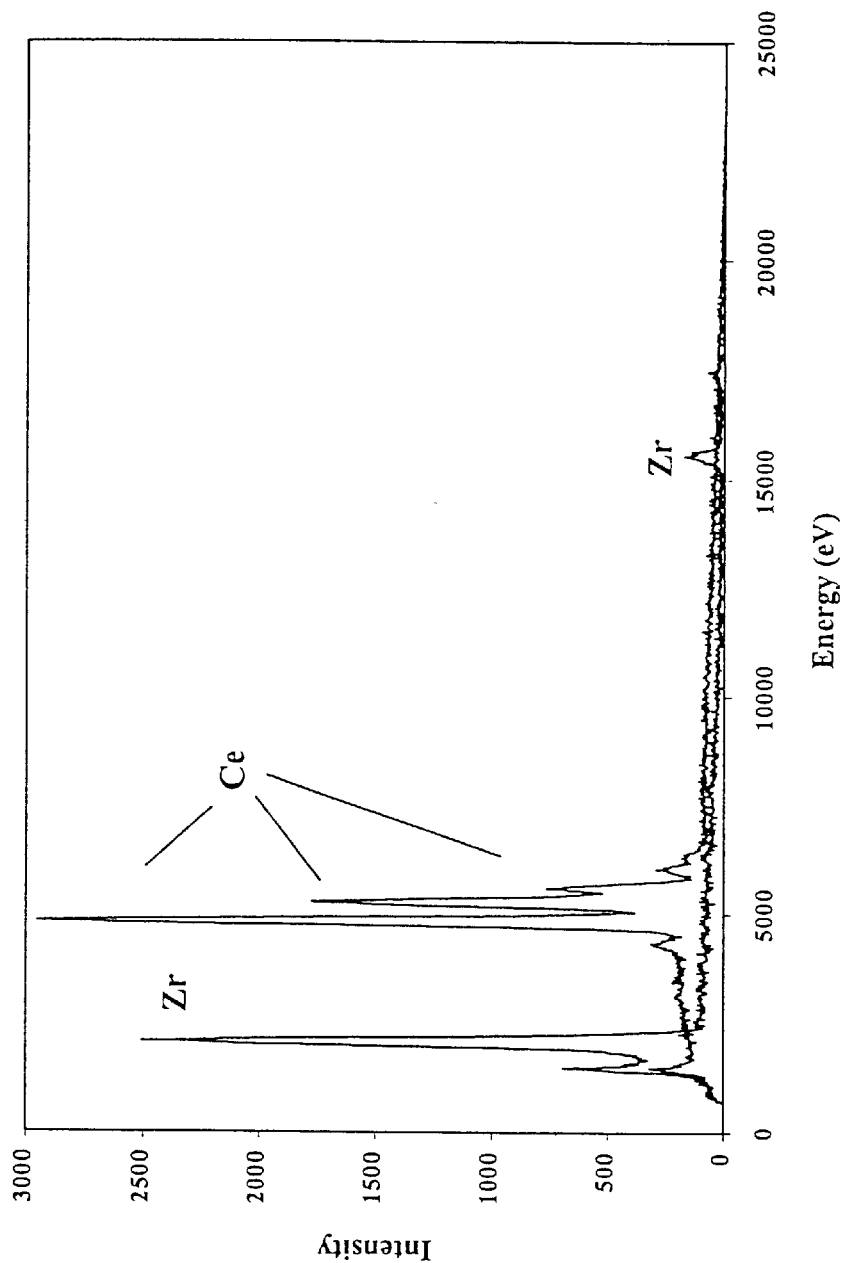
FIG. 6 shows an overlay of the EDX spectra for $CeO_2$ and $ZrO_2$.
Figure 7:
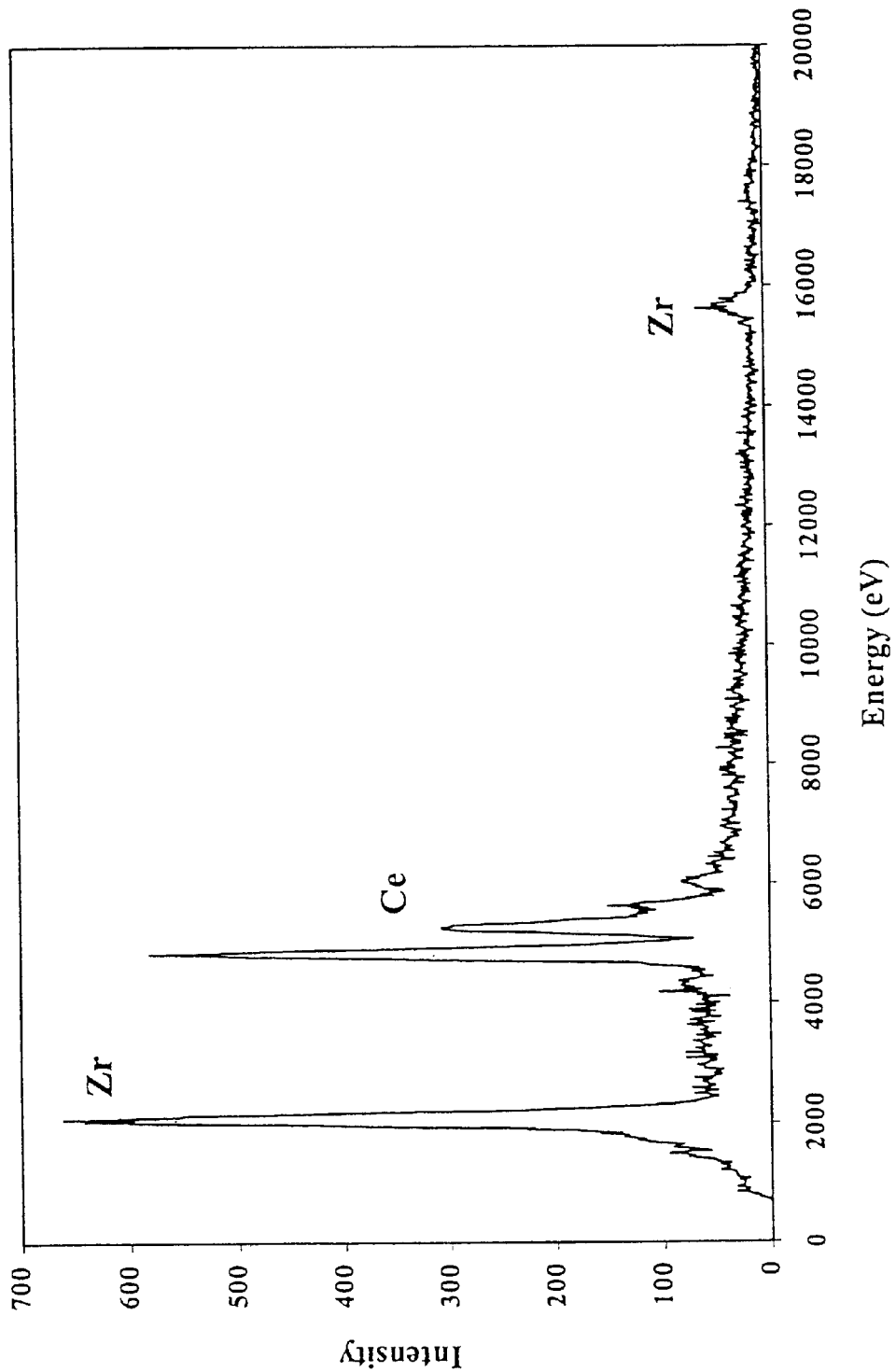
FIG. 7 shows the EDX spectra for $ZrO_2$ wash-coated with $CeO_2$ (25 wt. $\%CeO_2/ZrO_2$).
Figure 8:
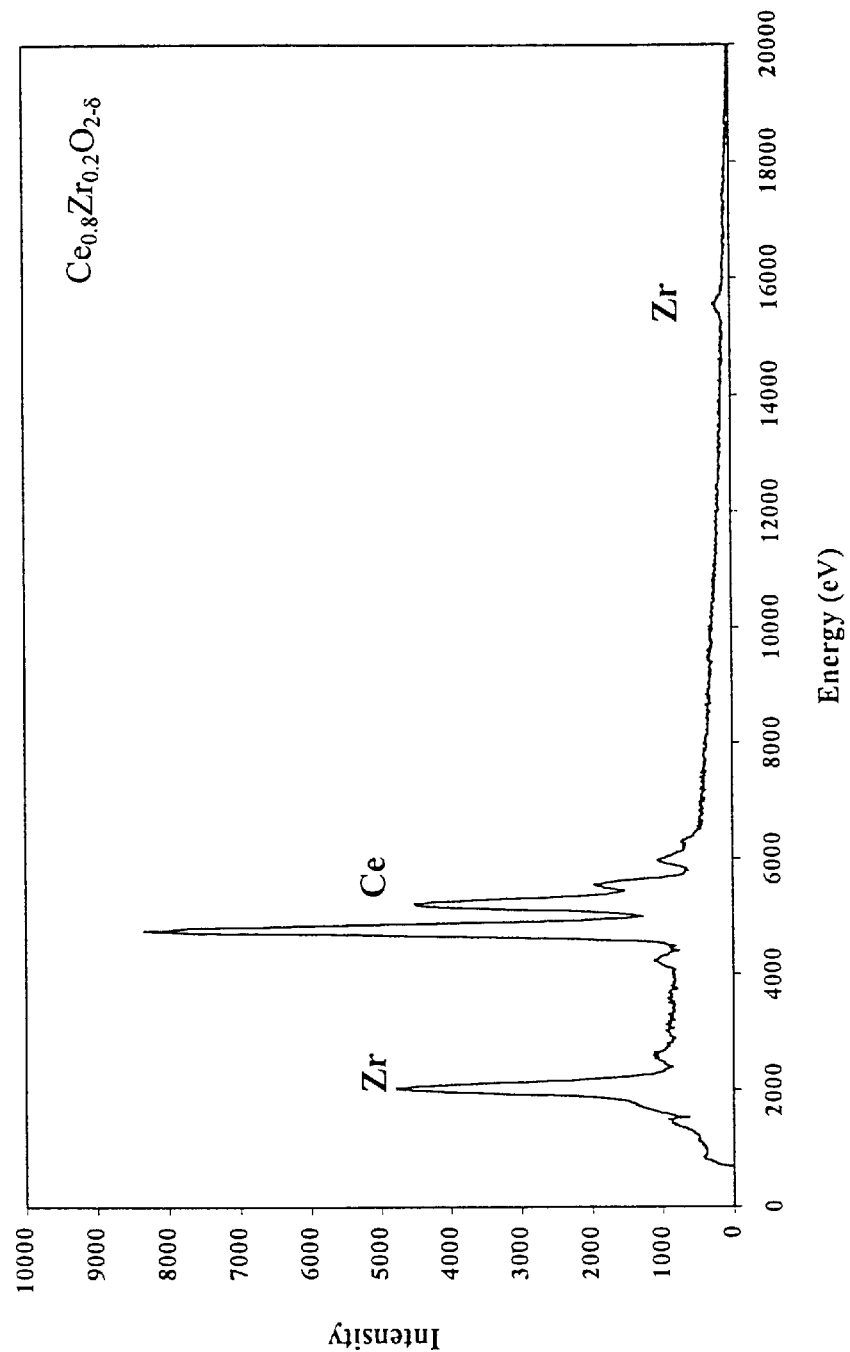
FIG. 8 shows the EDX spectra for $Ce_{0.8}Zr_{0.2}O_{2-\delta}$.

EDX. EDX measurements were obtained on a PGT (Princeton Gamma-Tech) X-ray fluorescence detector in combination with a JEOL JSM T200 Scanning Electron Microscope. FIG. 6 shows an overlay of the EDX spectra for CeO$_2$ and ZrO$_2$. For comparison, FIGS. 7 and 8 show the spectra for ZrO$_2$ wash-coated with CeO$_2$ (25 wt. %CeO$_2$/ZrO$_2$) and Ce$_{0.8}$Zr$_{0.2}$O$_{2-\delta}$, respectively. For the wash-coated sample, the CeO$_2$ covers the majority of the surface of the ZrO$_2$ particles, and the EDX spectra over most of the sample surface show peaks only for Ce. However, the spectrum in FIG. 7 is from a recess in the surface, and peaks from Zr also are present. The XRD pattern for this support powder (data not shown) shows broad peaks corresponding to the fluorite structure, but the crystallinity appears intermediate between the ZrO$_2$ and CeO$_2$ XRD patterns shown in FIG. 3, as would be expected. Alternatively, the EDX spectrum of CeO$_{0.8}$Zr$_{0.2}$O$_{2-\delta}$ shown in FIG. 8 generates peaks for both Ce and Zr over the entire surface, and the XRD pattern demonstrates a crystallinity equivalent to the undoped CeO$_2$. These results suggest successful doping of Zr into the CeO$_2$ lattice, and are indicative of the structural differences between the two materials.

Figure 9:
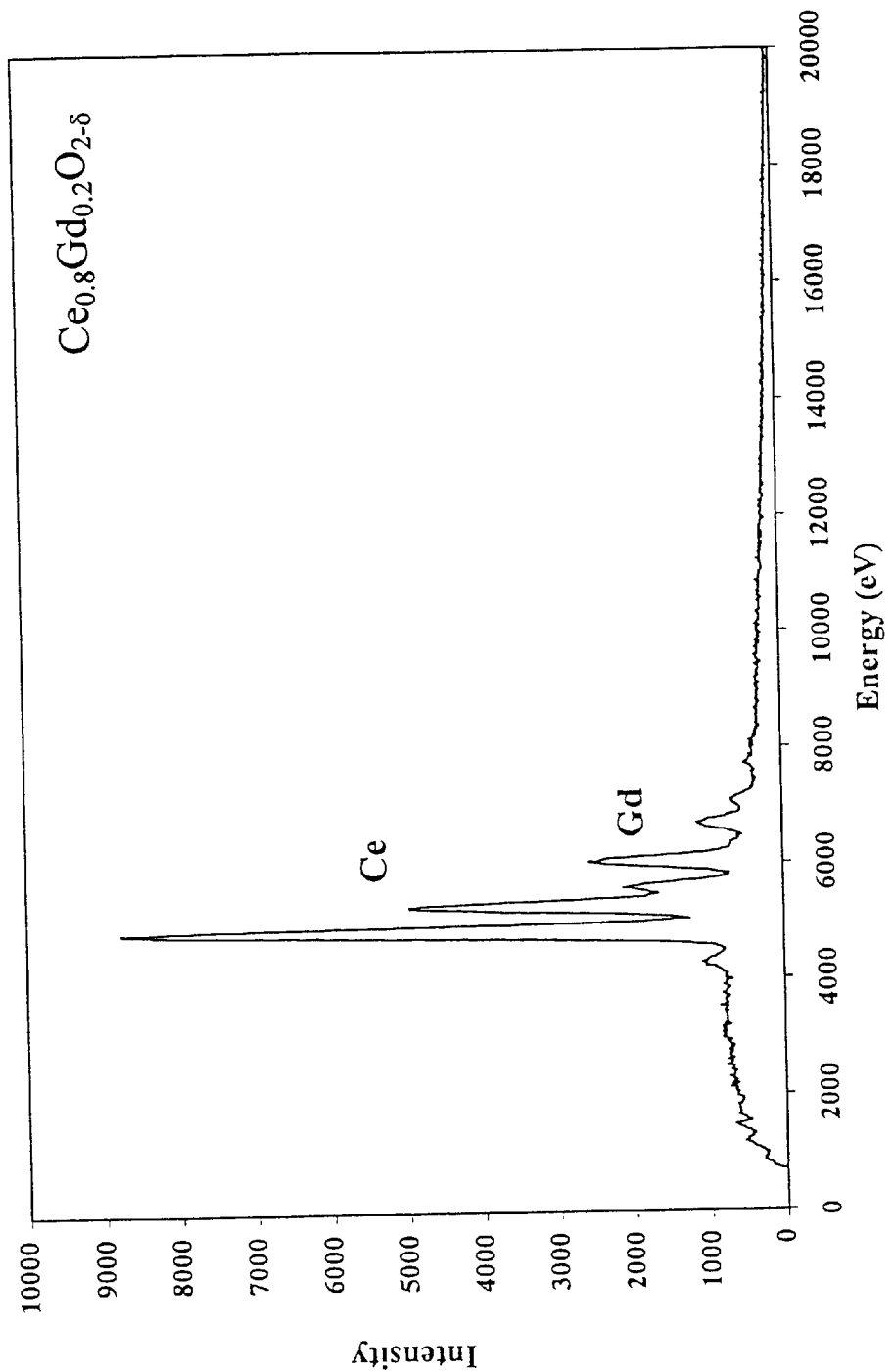
FIG. 9 contains the EDX spectra for $Ce_{0.8}Gd_{0.2}O_{2-\delta}$.

FIG. 9 contains the EDX spectra for Ce$_{0.8}$Gd$_{0.2}$O$_{2-\delta}$ and clearly indicates the dopants. EDX spectra for other conmpositions, such as Ce$_{0.8}$Cu$_{0.2}$O$_{2-\delta}$, Ce$_{0.8}$Au$_{0.2}$O$_{2-\delta}$, Ce$_{0.8}$Fe$_{0.2}$O$_{2-\delta}$, Ce$_{0.8}$Co$_{0.2}$O$_{2-\delta}$, Ce$_{0.48}$Zr$_{0.05}$Mn$_{0.48}$O$_{2-\delta}$, and Ce$_{0.45}$Zr$_{0.05}$Mn$_{0.45}$Cu$_{0.05}$O$_{2-\delta}$ are not shown, but also clearly indicate the dopants present. Since the XRD patterns for these materials corresponded to a single-phase fluorite structure (except for Ce$_{0.8}$Au$_{0.2}$O$_{2-\delta}$), it is assumed that incorporation of the dopants by co-precipitation was successful.

Figure 10:
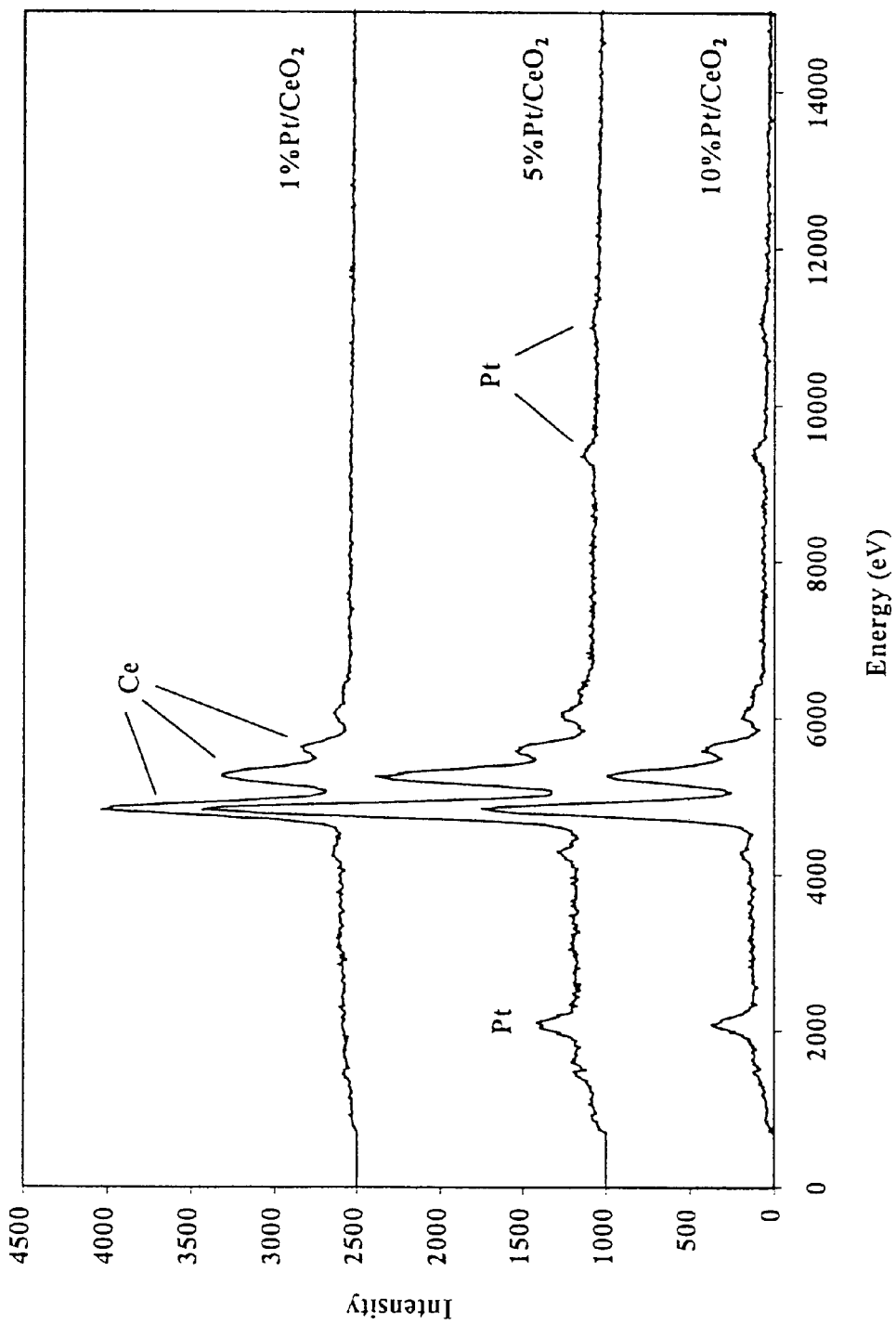
FIG. 10 shows an overlay of the EDX spectra for 1 wt.-%Pt, 5 wt.-%Pt, and 10 wt.-%Pt on $CeO_2$.

EDX also was used to qualitatively confirm the relative amounts of Pt loading on the support materials. FIG. 10 shows an overlay of the EDX spectra for 1 wt.-%Pt, 5 wt.-%Pt, and 10 wt.-%Pt on CeO$_2$. The baselines are offset for clarity. The peaks for Ce are visible in all three spectra, however, only the 5% and 10% Pt samples show peaks for Pt. The spectral intensities are not normalized, so a ratio of the most intense Ce peak, $I_{Ce}$, to the most intense Pt peak, $I_{Pt}$, in each spectrum was used to compare the metal loading. From this data, the $I_{Pt}/I_{Ce}$ for the 10%Pt/CeO$_2$ catalysts was more than 1.5 times the value for the 5%Pt/CeO$_2$ catalyst, which suggests the incipient wetness/impregnation method for incorporation of Pt was successful.

FTIR. The FTIR system used was a Nicolet Impact 410 spectrometer. This system employs a mid-IR source, a Michelson interferometer, and a deuterated triglycine sulfate (DTGS) detector. Calibration of the FTIR for peak height, area, and position was accomplished using 38.1- and 76.2-$\mu$ polystyrene films. The catalyst samples were prepared for FTIR analysis by grinding approximately 1 mg of catalyst powder with 75 mg of KBr and pressing the mixture into a pellet. The spectrum of a pellet with KBr only was subtracted from the background of all spectra.

Figure 11:
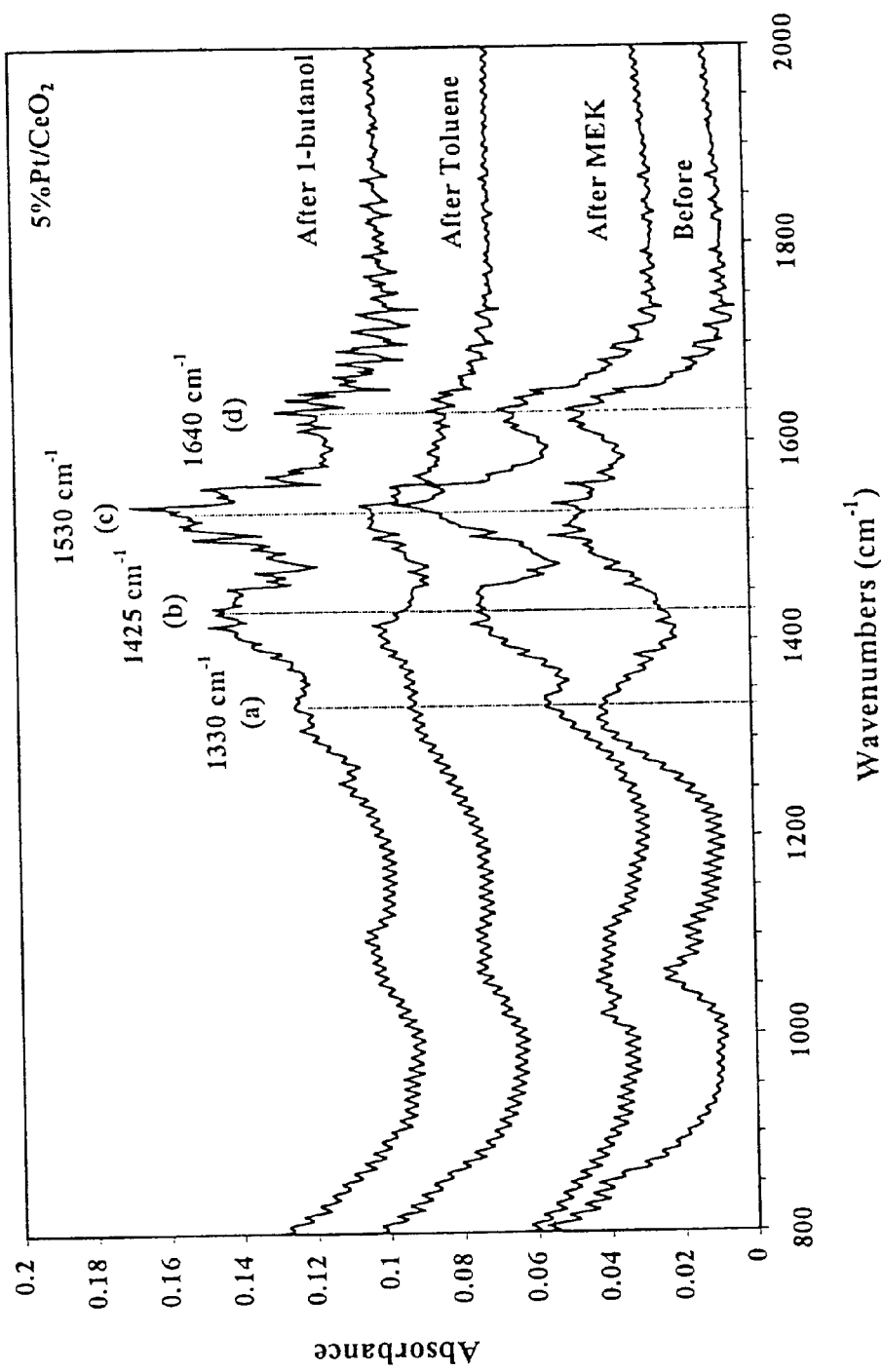
FIG. 11 shows typical FTIR spectra of a catalyst before exposure to VOCs, and after screening with MEK, toluene, and 1-butanol at temperatures below 100° C.

FIG. 11 shows typical FTIR spectra of a catalyst (here, 5% Pt/CeO$_2$) before exposure to VOCs, and after screening with MEK, toluene, and 1-butanol at temperatures well below 100° C. The features in the spectra were very broad, which made identification of specific vibrational bands difficult. The spectra are characterized by absorbance bands between 1250–1402 cm$^{-1}$ (a), 1480–1590 cm$^{-1}$ (c), and 1580–1680 cm$^{-1}$ (d). After screening with VOCs, a peak between 1350–1480 cm$^{-1}$ (b) grows in, and this peak is present regardless of the VOC used. Essentially the same spectrum has been observed by Haruta et al. for Au/TiO$_2$ catalysts exposed to CO (Haruta, M. et al. (1993) J. Catal. 144:175–192) In Haruta's work, peaks (a) and (c) are attributed to carboxylate species that accumulated during the experiment. However, in the present work, peaks in the same region are present even before exposure to VOCs. Peak (b) also can be attributed to symmetric CO$_2$ stretching, however, one would then expect it to correlate with peaks (a) and (c), and be present also before exposure to VOCs. Alternatively, peak (b) could be a combination of methylene CH$_2$ scissoring and CH$_3$ asymmetric bending, and aromatic ring stretching could contribute to both peaks (b) and (c). Peak (a) is from water and also is observed in the spectrum of KBr alone. But peak (a) is much stronger in the spectra of the samples than the background, as is the OH stretching between 3000–3600 cm$^{-1}$ (not shown). Additionally, catalysts exposed to toluene and 1-butanol sometimes show bands at 2930 and 2850 cm$^{-1}$ from aliphatic CH$_2$ stretching. In total, spectra were acquired on seven different catalysts before and after screening with VOCs and all samples showed peak (b) after screening. For comparison, spectra were acquired on bare CeO$_2$ and ZrO$_2$ before and after screening with toluene. The bare supports, which were not active at 100° C., showed no difference in spectra before and after screening, and did not show peak (b).

Figure 12:
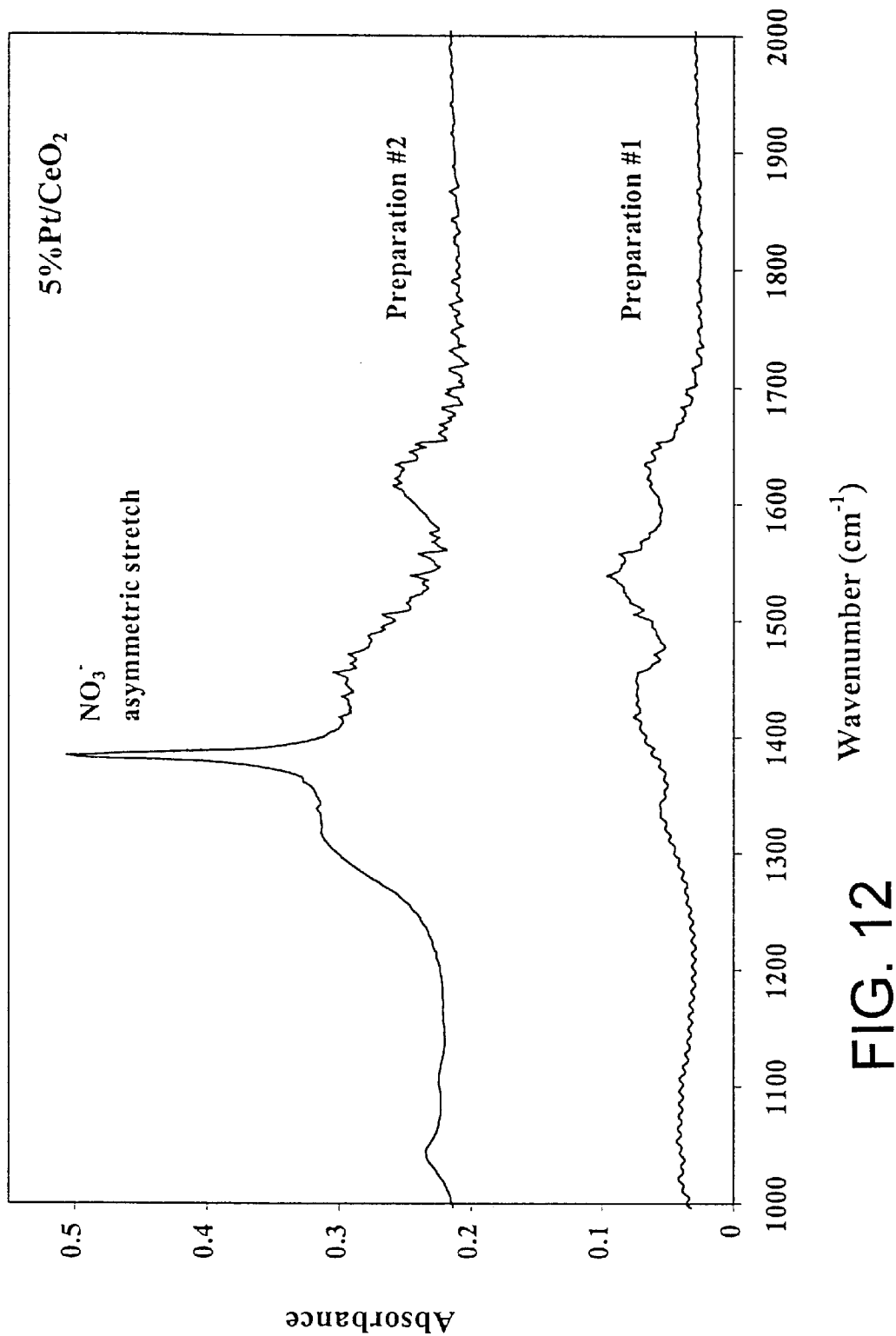
FIG. 12 shows FTIR spectra of $5\%Pt/CeO_2$ prepared by different methods.

An additional peak from NO$_3^-$ asymmetric stretching at ~1380 cm$^{-1}$ was observed in the FTIR spectra of many of the support powders and catalysts. FIG. 12 shows FTIR spectra of 5%Pt/CeO$_2$ prepared under thorough (Preparation #1) and moderate (Preparation #2) Pt reduction conditions. Preparation #2 shows the NO$_3^-$ asymmetric stretching peak and Preparation #1 does not. It was determined that the presence of this peak was indicative of incomplete thermal decomposition of residual nitrates from the precursors, which also resulted in much lower catalytic activity. Once this fact was determined, several of the catalysts were reproduced under more-thorough heat treatment, and those catalysts demonstrated dramatic improvements in activity relative to their earlier analogs. The presence or absence of this peak in the FTIR spectra of catalysts may be used to assess the quality of the catalyst preparation.

C. Performance Testing and Optimization of Heterogeneous Catalysts

Screening Apparatus

Figure 13:
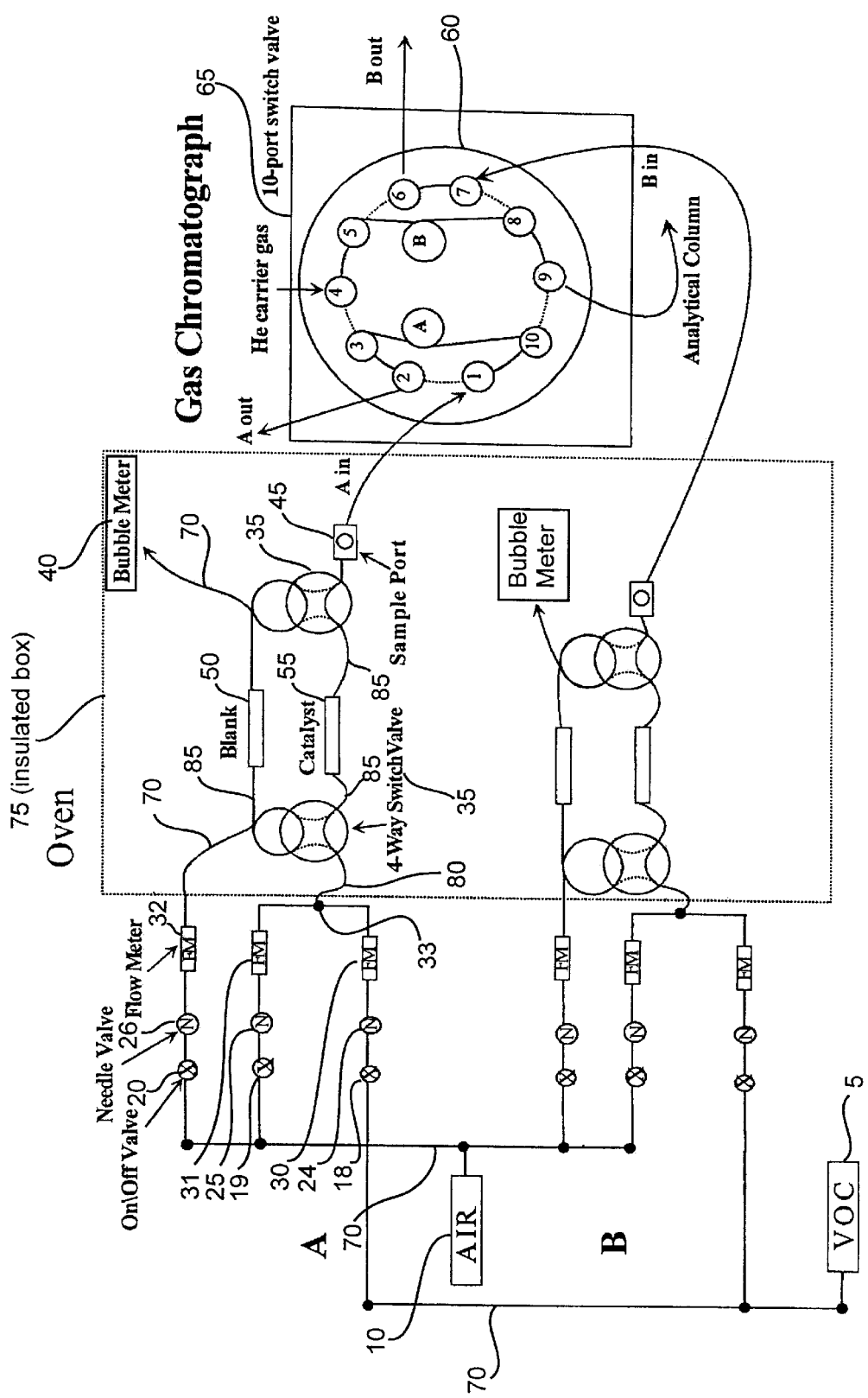
FIG. 13 shows one apparatus useful in screening catalysts.

Performance testing of the catalysts was accomplished using the apparatus shown in FIG. 13. The apparatus shown in FIG. 13 illustrates two channels for testing in the same apparatus. The following description describes the operation of one channel (A), however the same description applies to channel B, which is identical to channel A.

VOC gas cylinder (5) is connected to on/off valve (18) through connecting tubing (70). On/off valve (18) is connected to needle valve (24) through connecting tubing (70). Needle valve (24) is connected to flow meter (30) through connecting tubing (70). Air cylinder (10) is connected to on/off valve (19) through connecting tubing (70). On/off valve (19) is connected to needle valve (25) through connecting tubing (70). Needle valve (25) is connected to flow meter (31) through connecting tubing (70). Flowmeters (30 and 31) are connected to port (33) by connecting tubing (70). Connecting tubing (80) connects port (33) to 4-way switch valve (35). 4-way switch valve (35) is inside insulated box (75). 4-way switch valve (35) is connected to catalyst chamber (55) through connecting tubing (85). Catalyst chamber (55) is connected to another 4-way switch valve (35) through connecting tubing (85). 4-way switch valve (35) is connected through connecting tubing (85) to sample port (45). Sample port (45) is connected to gas chromatograph (65) through through ten-port switch valve (60) which enables alternating on-line GC measurements between the A and B sides of the catalyst screening apparatus.

Air cylinder (10) is also connected to on/off valve (20) through connecting tubing (70). On/off valve (20) is connected to needle valve (26) through connecting tubing (70). Needle valve (26) is connected to flow meter (32) through connecting tubing (70). Flowmeter (32) is connected to 4-way switch valve (35) through connecting tubing (70). 4-way switch valve (35) is connected to blank reactor (50) which contains no catalyst through connecting tubing (85). Blank reactor (50) is connected to another 4-way switch valve (35) through connecting tubing (85). 4-way switch valve (35) is connected through connecting tubing (85) to sample port (45). Bubble meter (40) is attached to 4-way switch valve (35) through connecting tubing (70).

In operation, gas from VOC gas cylinder (5) containing a selected concentration of VOC (typically 200 ppm VOC in a balance of air) flows through connecting tubing (70) to on/off valve (18), needle valve (24) and flow meter (30). Air from air cylinder (10) flows through connecting tubing (70) to on/off valve (19), needle valve (25) and flow meter (31). The VOC and air streams pass through port (33) into insulated box (75) through connecting tubing (80). The concentration of VOC is controlled by mixing the effluent from the VOC cylinder with an appropriate amount of air. The mixture flows through 4-way switch valve (35) into the catalyst reaction chamber (a 10-cm long by 0.4-cm i.d. tubular quartz cell (55) containing approximately 0.2 g of catalyst was used for each run, which created a 1-cm catalyst column in the reactor), which was packed between two pads of quartz wool, and held in place with two narrower inner tubes. After passing through catalyst reaction chamber (55), the gas flows through connecting tubing (85) into 4-way switch valve (35) into sample port (45). Sample port (45) allows passage of the sample into gas chromatograph (65) through ten-port switch valve (60) which enables alternating on-line GC measurements between the A and B sides of the catalyst screening apparatus. Air from air cylinder (10) also passes through on/off valve (20), needle valve (26) and flow meter (32) into insulated box (75) through tubing (70), where the air is passed through blank reactor (70) which contains no catalyst. Bubble meter (40) is attached to 4-way switch valve (35) through connecting tubing (70). Flow rates through the catalyst and blank lines were confirmed using a bubble meter (40), and equilibrated by varying the packing density of quartz wool in the blank.

Comparison of the gas mixture through the blank reactor to the catalyst reactor allows determination of the amount of VOC removal. The majority of the apparatus is enclosed in an insulated box and heated with heat tape for temperature control. External gas lines are also wrapped in heat tape to minimize condensation of VOCs.

The online GC (Shimadzu GC-14A) is equipped with a flame ionization detector (FID) for analysis of the unreacted VOC as well as other hydrocarbon reaction products. Sampling ports are installed on the exit of the system for analysis of CO$_2$ product from the catalytic destruction. The CO$_2$ was analyzed on a second CC (Hewlett-Packard 5890) equipped with a thermal conductivity detector (TCD).

For determining the concentrations of VOCs, generally calibration curves of peak height and area as a function of VOC concentration were prepared over the range of 1 to 200 ppm. Concentrations were controlled by mixing effluent from the 200 ppm VOC/air cylinder (5) with air from a second line (10), shown in the apparatus diagram. For CO$_2$ calibration, a cylinder of 1000 ppm CO$_2$ was used to prepare a calibration curve over the concentration range of 5 to 1000 ppm. Detection limits for the FID GC were below 1 ppm and for the TCD GC were below 5 ppm.

Space velocities, $V_s$, were calculated based on the volume of the catalyst in the reactor and the gas stream flow rate, L, according to the equation, $$V_s = \frac{4L}{\pi D^2 H} \tag{3}$$

where D is the inner diameter of the reactor tube, and H is the height of the catalyst bed. Typically, 0.2 g of catalyst were used for each analysis, which produces a catalyst bed ~1 cm long in a 0.4-cm-diameter reactor tube. Flow rates across the catalyst were typically between 2 and 20 mL/min which produced space velocities between 1000 and 15,000 hr$^{-1}$.

Alternatively, each channel may be enclosed in a separate heater to control the temperature of each reactor individually enabling different measurement temperatures or separate experiments to be conducted simultaneously. Different gases may be used. Poisons may be added to determine their effect on the catalysts. Other embodiments of the testing apparatus may also be used, as easily determined by one of ordinary skill in the art without undue experimentation.

Performance Testing of Pt- or Pd-containing Catalysts

Table 2 contains a summary of the performance evaluation for some of the catalysts investigated that contain Pt or Pd. The following VOCs were tested: toluene, methyl ethyl ketone (MEK) and 1-butanol. The VOC concentrations on the inlet stream typically were between 50–200 ppm in air, and the space velocities were between 1000–7000 hr$^{-1}$.

TABLE 2

Performance Evaluation for Some Catalysts Containing Pt and Pd*

| | | | \% Conversion of VOC to $CO_2$ at: | | | | | |
|---|---|---|---|---|---|---|---|---|
| | Catalyst Composition | VOC | 200° C. | 150° C. | 130° C. | 100° C. | 80° C. | 60° C. |
| 1 | 1% Pt/$ZrO_2$ | Toluene | | 12 | | 0 | | |
| 2 | 5% Pt/$ZrO_2$ | Toluene | | 84 | | 41 | 49 | |
| | | MEK | | | | | 0 | |
| | | 1-Butanol | | | | | 0 | |
| 3 | 1% Pt/$CeO_2$ | Toluene | | 100 | | 40 | | |
| | | MEK | | | | | 0 | |
| | | 1-Butanol | | | | | | 11 |
| 4 | 5% Pt/$CeO_2$ | Toluene | | 80 | | 88 | 37 | |
| | | MEK | | | | | 73 | 29 |
| | | 1-Butanol | | | | | 89 | 95 |
| 5 | 1% Pd/$ZrO_2$ | Toluene | | 76 | | 1 | | |
| 6 | 1% Pd/$CeO_2$ | Toluene | | 73 | | 2 | | |
| 7 | 5% Pd/$ZrO_2$ | Toluene | 8 | 2 | | 0.3 | | |
| 8 | 5% Pd/$CeO_2$ | Toluene | 100 | 88 | | 4 | | |
| | | MEK | | | | | 35 | |
| 9 | 1% Pd/$ZrO_2$ | Toluene | | 50 | | 7 | | |
| 10 | 1% Pd/$CeO_2$ | Toluene | | 76 | | 0.3 | | |
| 11 | 5% Pd/$ZrO_2$ | Toluene | | | | 6 | | |
| 12 | 5% Pd/$CeO_2$ | Toluene | | | | 7 | | |
| 13 | 1% Pt/12% $CeO_2$/$ZrO_2$ | Toluene | | | | 94 | 45 | 4 |
| | | MEK | | | | | 23 | |
| | | 1-Butanol | | 74 | | 16 | 10 | 6 |
| 14 | 5% Pt/12% $CeO_2$/$ZrO_2$ | Toluene | | | | 48 | 0 | |
| | | 1-Butanol | | 69 | | 20 | 14 | |
| 15 | 1% Pd/12% $CeO_2$/$ZrO_2$ | Toluene | | | 10 | 10 | | |
| 16 | 5% Pd/12% $CeO_2$/$ZrO_2$ | Toluene | | | | 0 | | |
| 17 | 1% Pt/12% $CeO_2$/$ZrO_2$ (sim. addn.) | Toluene | | | | 2 | | |
| 18 | 5% Pt/12% $CeO_2$/$ZrO_2$ (sim. addn.) | Toluene | | | 4 | 0 | | |
| 20 | 5% Pd/12% $CeO_2$/$ZrO_2$ (sim. addn.) | Toluene | | | | 0 | | |
| 21 | 1% Pt/25% $CeO_2$/$ZrO_2$ | Toluene | | | | 0 | | |
| 22 | 5% Pt/25% $CeO_2$/$ZrO_2$ | Toluene | | | | 0 | | |
| 23 | 1% Pt/$Ce_{0.8}Gd_{0.2}O_{2-\delta}$ | Toluene | | | | 0 | | |
| | | MEK | | 39 | | 12 | | |
| 24 | 5% Pt/$Ce_{0.8}Gd_{0.2}O_{2-\delta}$ | Toluene | | | 12 | 0.1 | | |
| | | MEK | | 78 | | 14 | | |
| 25 | 1% Pt/$Ce_{0.8}Sr_{0.2}O_{2-\delta}$ | Toluene | | | | 0 | | |
| | | MEK | | 90 | | 14 | | |
| 26 | 5% Pt/$Ce_{0.8}Sr_{0.2}O_{2-\delta}$ | Toluene | | | 93 | 53 | 11 | |
| | | MEK | | | | | 0 | |
| | | 1-Butanol | | | | | | 6 |
| 27 | 1% Pt/$Ce_{0.8}Cu_{0.2}O_{2-\delta}$ | Toluene | | | 55 | 17 | 4 | |
| | | MEK | | 93 | | 20 | | |
| 28 | 5% Pt/$Ce_{0.8}Cu_{0.2}O_{2-\delta}$ | Toluene | | | | 87 | 35 | 6 |
| | | MEK | | | | | 14 | |
| | | 1-Butanol | | | | | | 0 |
| 29 | 1% Pt/$Ce_{0.8}Au_{0.2}O_{2-\delta}$ | Toluene | | | | 2 | | |
| | | MEK | | 85 | | 20 | | |
| 30 | 5% Pt/$Ce_{0.8}Au_{0.2}O_{2-\delta}$ | Toluene | | | 73 | 38 | 11 | |
| | | MEK | | | | | 0 | |
| 31 | 1% Pt/$Ce_{0.8}Fe_{0.2}O_{2-\delta}$ | Toluene | | | | 0 | | |
| | | MEK | | 80 | | 15 | | |
| 32 | 5% Pt/$Ce_{0.8}Fe_{0.2}O_{2-\delta}$ | Toluene | | | 14 | 0.4 | | |
| | | MEK | | 70 | | 13 | | |
| 33 | 1% Pt/$Ce_{0.8}Co_{0.2}O_{2-\delta}$ | Toluene | | | 21 | 14 | 2 | |
| | | MEK | | 61 | | 14 | | |
| 34 | 5% Pt/$Ce_{0.8}Co_{0.2}O_{2-\delta}$ | Toluene | | | 15 | 0.3 | | |
| 36 | 10% Pt/$CeO_2$ | MEK | | 77 | | 40 | 4 | |
| 37 | 5% Pt/$Ce_{0.8}Zr_{0.2}O_{2-\delta}$ | MEK | | 92 | | 8 | 5 | |
| 38 | 5% Pt/$CeO_2$ (reproduced) | 1-Butanol | | 67 | | 30 | | |
| 39 | 5% Pt/$CeCo_{0.5}Cu_{0.5}O_{2-\delta}$ | Toluene | | 100 | | 67 | 11 | |
| 40 | 5% Pt/$CeO_2$ (reproduced) | Toluene | | 85 | | 68 | 30 | |
| | | MEK | | 100 | | 43 | | |
| 41 | 5% Pt/$Ce_{0.8}Sr_{0.2}O_{2-\delta}$ | Toluene | | 76 | | 13 | | |

TABLE 2-continued

Performance Evaluation for Some Catalysts Containing Pt and Pd*

| | Catalyst Composition | VOC | 200° C. | 150° C. | 130° C. | 100° C. | 80° C. | 60° C. |
|---|---|---|---|---|---|---|---|---|
| | (reproduced) | MEK | | 100 | | | 35 | |
| 42 | 5% Pt/Ce$_{0.8}$Cu$_{0.2}$O$_{2-\delta}$ | Toluene | | 99 | | | 61 | 16 |
| | (reproduced) | MEK | | 97 | | | 39 | 22 |
| 43 | 5% Pt/Ce$_{0.8}$Fe$_{0.2}$O$_{2-\delta}$ | Toluene | | | | | 26 | 2 |
| | (reproduced) | MEK | | | | | 35 | 28 |
| 44 | 5% Pt/Ce$_{0.8}$Co$_{0.2}$O$_{2-\delta}$ | Toluene | | | | | 10 | |
| | (reproduced) | MEK | | | | | 25 | |
| 45 | 5% Pt/CeCo$_{0.5}$Cu$_{0.5}$O$_{2-\delta}$ (oxides) | Toluene | | 85 | | | 3 | |
| | | MEK | | 100 | | | 12 | |
| 46 | 5% Pt/Ce$_{0.9}$Cu$_{0.1}$O$_{2-\delta}$ | Toluene | | 51 | | | 4 | |
| | | MEK | | 77 | | | 15 | |
| 47 | 5% Pt/Ce$_{0.5}$Cu$_{0.5}$O$_{2-\delta}$ | Toluene | | 69 | | | 2 | |
| | | MEK | | 49 | | | 23 | |
| 48 | 5% Pt/Ce$_{0.9}$Sr$_{0.1}$O$_{2-\delta}$ | Toluene | | 55 | | | 9 | |
| | | MEK | | 83 | | | 38 | |
| 49 | 5% Pt/Ce$_{0.5}$Sr$_{0.5}$O$_{2-\delta}$ | Toluene | | 70 | | | 9 | |
| | | MEK | | 87 | | | 28 | |
| 50 | CeO$_2$ | Toluene | 45 | 7 | | 0 | | |
| 51 | ZrO$_2$ | Toluene | 27 | 4 | | 0 | | |
| 52 | CeCo$_{0.5}$Cu$_{0.5}$O$_x$** | Toluene | | 40 | | 4 | 0 | |

*VOC concentrations were between 100–200 ppm in air, and space velocities were between 1000–7000 hr$^{-1}$.
**This composition is most likely a combination of Ce$_{1-x}$Cu$_x$O$_{2-\delta}$ and CuO.

Comparison of CeO$_2$ and ZrO$_2$ Supports

From Table 2, most of the catalysts from #1–12 gave greater that 70% conversion of toluene to CO$_2$ at 150° C., and the Pt-based catalysts generated between 40 and 88% conversion at 100° C. Furthermore, the 5% Pt/ZrO$_2$ and 5% Pt/CeO$_2$ catalysts produced between 40 and 50% conversion at 80° C. For the bare support materials (absent Pt or Pd) CeO$_2$ produced 45% conversion of toluene to CO$_2$ at 200° C., and 7% conversion at 150° C. However, despite having a much higher surface area, ZrO$_2$ produced only 27% conversion at 200° C., and 4% conversion at 150° C.

Figure 14:
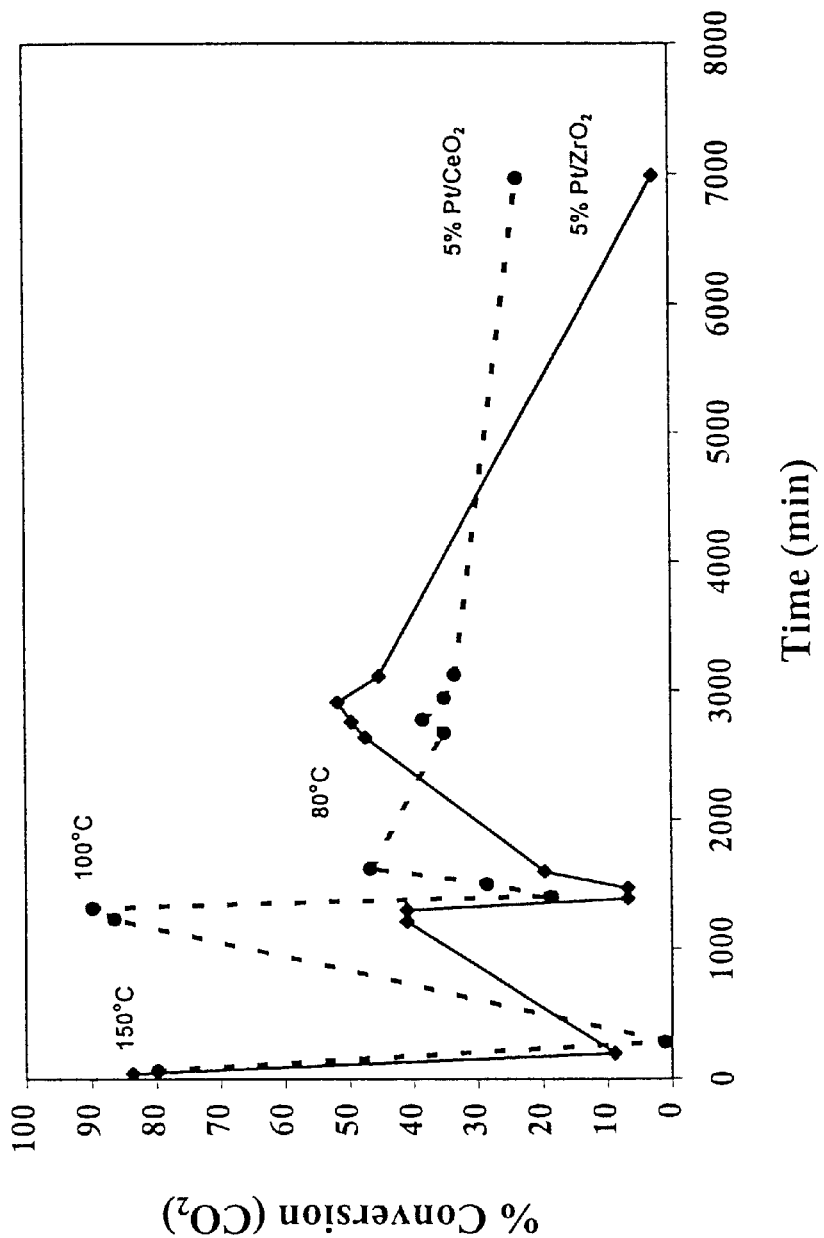
FIG. 14 shows a plot of percent conversion of toluene to $CO_2$ for 5% Pt on $CeO_2$ and $ZrO_2$.

FIG. 14 demonstrates the effect of the CeO$_2$ versus the ZrO$_2$ support materials on the catalytic behavior as a function of time for 5% Pt-loaded catalysts at several temperatures. The space velocity was about 2000 hr$^{-1}$. The first points for each line were obtained at 150° C., and the activity was established within the first 15 to 30 minutes. The temperature was then dropped to 100° C., which is concurrent with the drop in % conversion to less than 10% for second set of data points. However, over the next several hundred minutes activity was reestablished, which is seen with the third and fourth data points for each line. The temperature was then reduced to 80° C. At 80° C., activity was again established and the drop-off in the curve with time is from the deactivation of the catalyst. The induction period necessary to reach full activity is apparent in FIG. 14 for 100° C. and 80° C. Once activity had stabilized, a reduction in temperature caused the activity to drop off, followed by reestablishment of activity. The time period for stabilization generally was longer at lower temperatures, which is also visible in FIG. 14.

The 5% Pt/CeO$_2$ catalyst demonstrated good agreement for toluene destruction based on toluene removal and CO$_2$ production, with an approximate difference of 10%. The toluene removal percentage generally followed the same trend for CO$_2$ production with the 5% Pt/CeO$_2$ catalyst, but did not demonstrate an induction period after reducing the temperature. The 5% Pt/ZrO$_2$ catalyst showed a greater than 95% toluene removal throughout the duration of the experiment This is compared with the much lower values based on CO$_2$ production. Despite this large difference in values between the two curves for 5% Pt/Zro$_2$, no other product species were identified in the chromatograms. The disparity of values of % toluene removal and CO$_2$ production is likely due to the facilitation of adsorption and retention of toluene as well as the production of nonvolatile material on the ZrO$_2$ catalysts by the high surface area of the 5% Pt/ZrO$_2$ catalyst. In fact, the catalyst deactivation at 80° C. is much steeper for the ZrO$_2$-supported Pt than the CeO$_2$-supported Pt (see FIG. 14). Furthermore, although observed only qualitatively, upon ramping the catalyst materials back up to 100° C. large amounts of toluene were liberated from the ZrO$_2$ catalyst relative to the CeO$_2$.

Comparison of Pt and Pd

Figure 15:
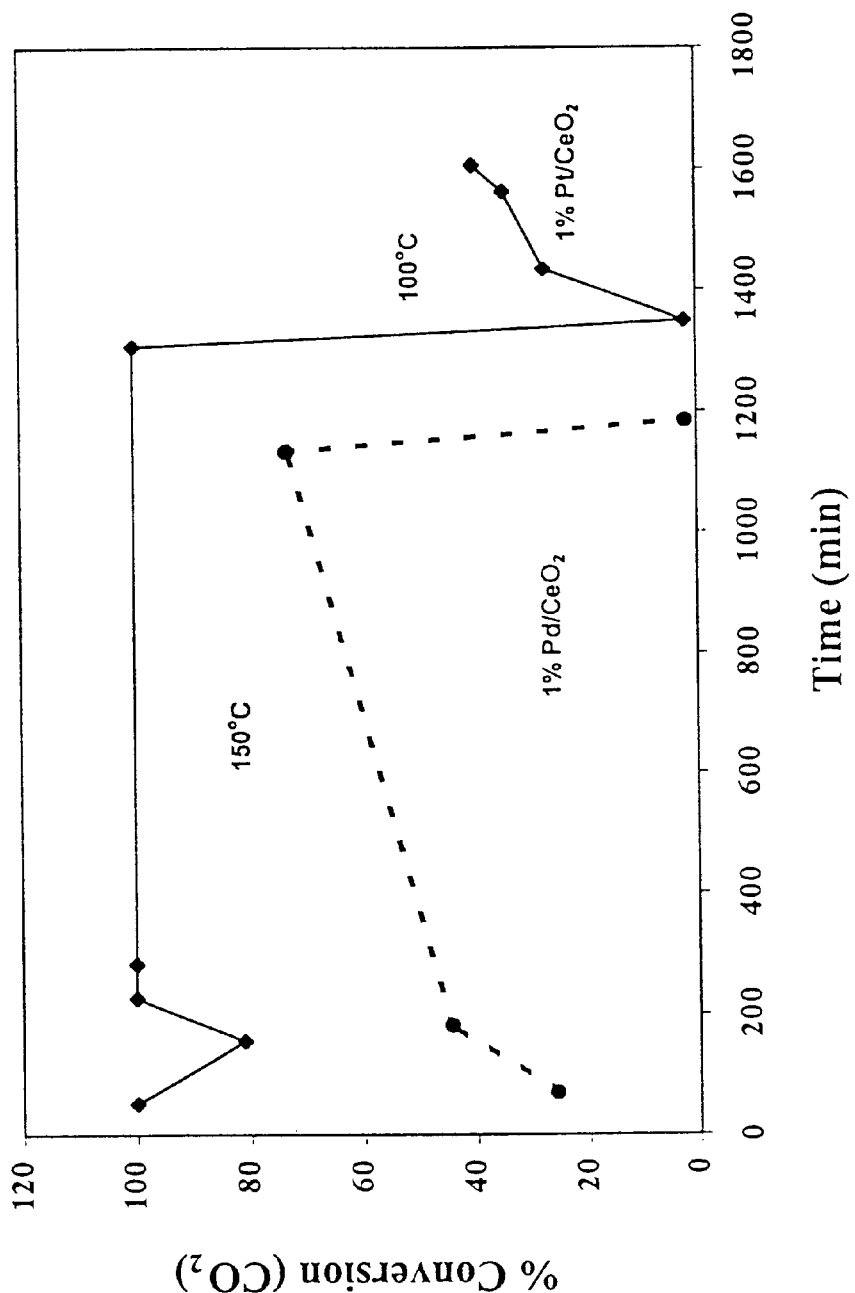
FIG. 15 is a comparison of the percent conversion of toluene to $CO_2$ by 1% Pt and 1% Pd on $CeO_2$.

FIG. 15 is a comparison of the percent conversion of toluene to CO$_2$ by 1% Pt and 1% Pd on CeO$_2$. For the Pt catalyst, activity was established immediately at 150° C., whereas the Pd catalyst increased in activity slowly over the first day of testing. As in FIG. 14, reducing the temperature to 100° C. dropped the activity to only a few percent. Testing was not continued beyond this point for the Pd catalyst, but the activity for the Pt catalyst was reestablished to almost 40%.

This trend is also observed when comparing the 1%Pt/12%CeO$_2$/ZrO$_2$ and 5%Pt/12%CeO$_2$/ZrO$_2$ catalysts to the 1%Pd/12%CeO$_2$/ZrO$_2$ and 5%Pd/12%CeO$_2$/ZrO$_2$ catalysts in Table 2 (#13–16). For example, at 100° C. the 1%Pt/12%CeO$_2$/ZrO$_2$ generated nearly complete conversion of toluene to CO$_2$, whereas the 1%Pd/12%CeO$_2$/ZrO$_2$ generated only 10% conversion.

Comparison of Preparation Methods

By far the most significant step in the catalyst preparation procedure was determined to be associated with the exact conditions during the reduction of the catalytic metals (Pt and Pd) on the support powder. It is critical that the conditions are carefully controlled to ensure that a thoroughly reductive environment and adequate temperatures are maintained. It was determined that the catalysts with the highest activity were being reduced in a low-volume furnace with very even heating profiles, and no potential sources for leaks to the exterior atmosphere. Conversely, the catalysts with low activity were reduced in a furnace with opposite qualities.

With this knowledge, the 5%Pt/$CeO_2$ catalyst in addition to several doped-$CeO_2$ catalysts were re-synthesized and screened for both toluene and MEK destruction. These materials are in Table 2 as catalysts #39–44. The first catalyst in the series (5%Pt/$CeCo_{0.5}Cu_{0.5}O_x$) showed only minor improvements, i.e. 67% conversion of toluene to $CO_2$ at 100° C. compared to 52% for the original analog. However, most of the other catalysts demonstrated more significant improvements. Specifically, the original 5%Pt/$CeO_2$ (#4) catalyst demonstrated high activity for destruction of toluene, 1-butanol and MEK. However attempts to reproduce those results with batches prepared in a different reduction furnace failed (see batch 38 in Table 2). However, once the problem was identified, the results were reproduced and are shown in Table 2 for batch #40. The 5%Pt/$Ce_{0.8}Sr_{0.2}O_{2-\delta}$ catalyst (#26 and #41) showed only modest improvement in toluene destruction, but the MEK destruction went from 0% to 35% at 80° C. Similarly, the 5%Pt/$Ce_{0.8}Cu_{0.2}O_{2-\delta}$ catalyst (#28) previously demonstrated 35% and 14% conversion of toluene and MEK to $CO_2$ at 80° C., respectively; whereas, the resynthesized analog (#42) demonstrated 61% conversion of toluene and 39% conversion of MEK. The Fe-doped catalyst previously demonstrated negligible activity at 100° C. (#31). However, the resynthesized batch (#43) had significant activity for both toluene and MEK destruction at 80° C., and for MEK destruction at 60° C. Finally, the first batch of the 5%Pt/$Ce_{0.2}Co_{0.2}O_{2-\delta}$ catalysts (#33) gave only 2% conversion of toluene to $CO_2$ at 80° C., whereas the resynthesized batch (#44) gave 10% conversion of toluene, and 25% conversion of MEK at 80° C. In addition to the fact that the catalysts reduced in the preferred furnace demonstrated greater activity for VOC destruction, these catalysts also did not show $NO_3^-$ asymmetric stretching in the FTIR spectra.

Nearly all of the catalysts presented were prepared by coprecipitation. As mentioned earlier, this method results in much higher surface area materials, and therefore a greater number of catalytically active sites. However, with coprecipitation it is possible that some of the components are selectively precipitated to a greater extent than others, and the resulting material composition might not be what was intended. In Table 2, the activity of 5%Pt/$CeCo_{0.5}Cu_{0.5}O_{2-\delta}$ prepared by coprecipitation (#39) can be compared to the same material prepared by ceramic processing from the constituent oxides (#45) for the destruction of toluene. At 150° C., the catalyst from coprecipitation gave 100% conversion to $CO_2$ compared to 85% for the material from the oxides. At 80° C., the coprecipitated and oxide-generated materials gave 11% and 3% conversion, respectively. Given the large differences in the material surface areas, the resulting catalytic activities are surprisingly similar.

The method of metal addition to the support materials also was briefly investigated for Pt and Pd on the 12%$CeO_2$/$ZrO_2$ supports. In the first method, which was used almost exclusively in this project, the Pt and Pd was added to the support powder from the appropriate Pt or Pd salt solution as described above. In the second method (simultaneous addition), the Pt or Pd nitrate was dissolved in the Ce nitrate solution before co-precipitation onto the $ZrO_2$. Based on results reported in the literature, in was anticipated that the simultaneous addition method would result in greater metal particle dispersion, and thus greater activity (Haruta, et al. (1989) J. Catal. 115:301–309). However, as evident in Table 2 (catalysts #13–20), the first method resulted in much higher activity. It is likely that the simultaneous method results in a relatively large quantity of the Pt or Pd being buried in the $CeO_2$ wash coat, and therefore not available for interaction with VOCs in the gas stream.

Metal Loading

To investigate the effect of Pt loading on $CeO_2$ for the oxidation of VOCs, catalysts composed of 1%, 5%, and 10%Pt/$CeO_2$ were prepared and screened under identical conditions. The EDX data for all three catalysts were presented earlier in FIG. 10, and demonstrated a relative increase in peak intensity for Pt as a function of loading. Table 3 shows the results for % conversion of MEK to $CO_2$ as a function of Pt loading for 80° C. and 60° C., and demonstrates a maximum in activity for 5% Pt. This reduction in activity at higher Pt loading is probably the result of a decrease in Pt dispersion.

TABLE 3

Comparison of catalytic activity for MEK destruction as a function of Pt loading for a Pt/$CeO_2$ support.*

| | % conversion MEK to $CO_2$ | |
|---|---|---|
| wt % Pt Loading | 80° C. | 60° C. |
| 1 | 0 | — |
| 5 | 73 | 29 |
| 10 | 40 | 4 |

*The MEK concentration was ~100 ppm in air and the space velocity was ~1000 $hr^{-1}$.

However, a different trend is observed for Pt on a 12%$CeO_2$/$ZrO_2$ support as demonstrated in Table 4. For this catalyst, significantly higher % conversions of toluene to $CO_2$ were observed for only 1% Pt loading at both 100° C. and 80° C. Furthermore, Table 5 demonstrates that the dependence of catalytic activity on metal loading is dependent on the specific VOC. In this case, the exact same catalysts screened in Table 4 were screened for destruction of 1-butanol, and maximum activity was observed for the 5% Pt loading.

TABLE 4

Comparison of catalytic activity for toluene destruction as a function of Pt loading for a Pt/12% $CeO_2$/$ZrO_2$ support.*

| | % conversion of toluene to $CO_2$ | |
|---|---|---|
| wt % Pt Loading | 100° C. | 80° C. |
| 1 | 94 | 45 |
| 5 | 48 | 0 |

*The toluene concentration was ~100 ppm in air and the space velocity was ~1000 $hr^{-1}$.

TABLE 5

Comparison of catalytic activity for 1-butanol destruction as a function of Pt loading for a Pt/12% $CeO_2$/$ZrO_2$ support.*

| wt % Pt Loading | % conversion of 1-butanol to $CO_2$ | |
| --- | --- | --- |
| | 100° C. | 80° C. |
| 1 | 16 | 10 |
| 5 | 20 | 14 |

*The 1-butanol concentration was ~100 ppm in air and the space velocity was ~1000 hr$^{-1}$.

Generally, activity reaches a maximum between 3% and 5% loading by weight.

Toluene and MEK Mixtures

Figure 16A:
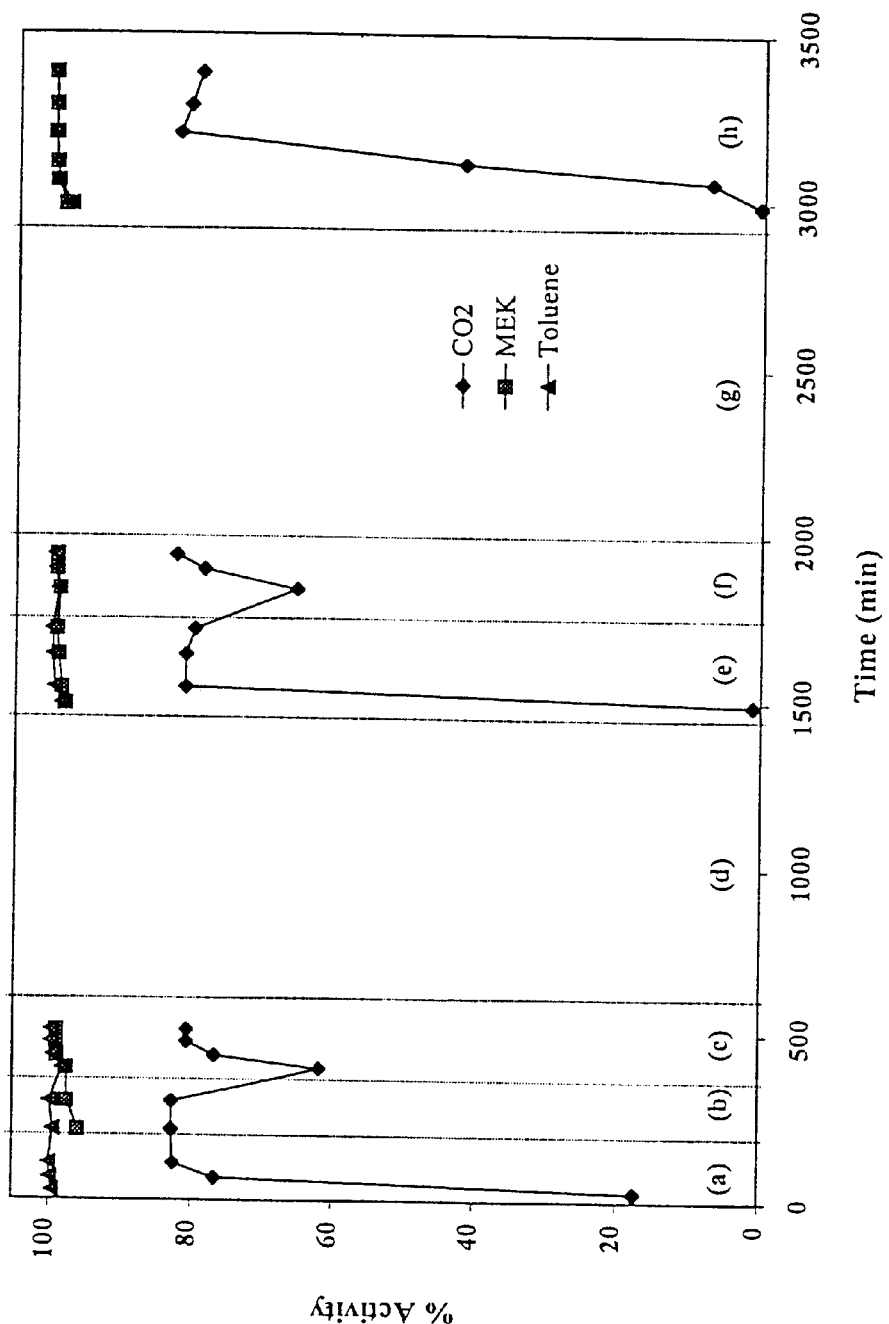
FIGS. 16A and 16B show the percent removal of toluene and MEK, and the percent conversion of VOCs to $CO_2$ at 150° C.
Figure 16B:
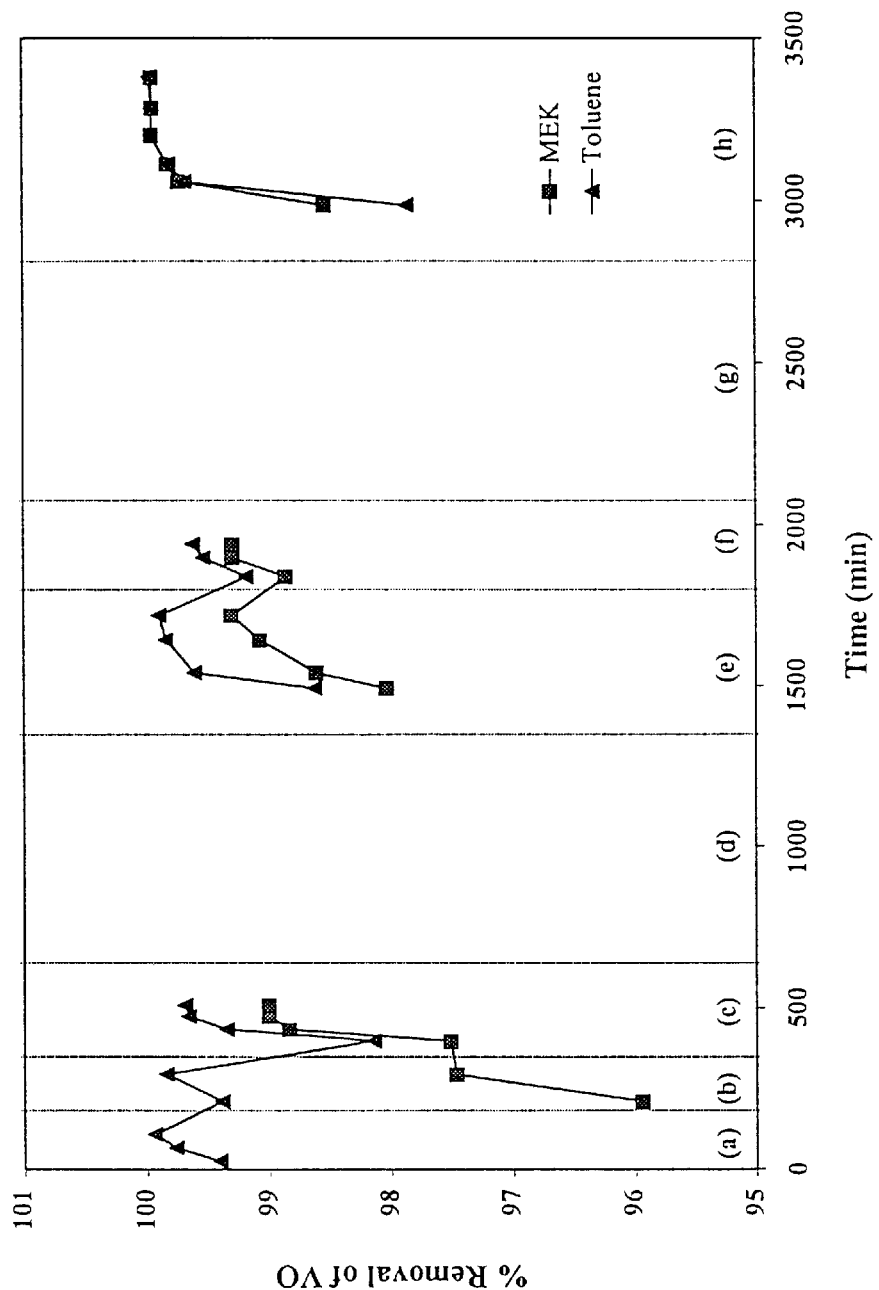

To investigate catalytic activity toward mixtures of VOCs, an experiment was performed that followed the simultaneous decomposition of toluene and MEK, and the results are shown in FIGS. 16A and 16B. For this experiment the toluene concentration was held roughly constant, and the MEK concentration was gradually increased while monitoring the removal of both VOCs and the production of $CO_2$. In actuality, dilution of the toluene stream occurred significantly at the higher MEK concentrations. This problem is somewhat unavoidable if a constant total flow rate is to be maintained using ball-type flow meters. This problem may be alleviated by using bubble flow meters. This experiment was run at 150° C. with the 5%Pt/$CeO_2$ catalyst. The figures are divided into eight sections (a through h) that differ in the toluene and MEK concentrations as follows: (a) toluene ~212 ppm, MEK ~0 ppm, (b) toluene ~205 ppm, MEK ~0.9 ppm, (c) toluene ~203 ppm, MEK ~2.6 ppm, (d) overnight heating with air only, (e) toluene ~199 ppm, MEK ~7.5 ppm, (f) toluene ~177 ppm, MEK ~19 ppm, (g) overnight heating with air only, (h) toluene ~132 ppm, MEK ~56 ppm. The percent activity was calculated based on the removal of each VOC, and from the conversion of the total VOC concentration to $CO_2$. The small dips in the curves for $CO_2$ in sections (c) and (f) are the result of bypass measurements. In order to determine the toluene and MEK concentrations entering the reactor, the flow was diverted to a bypass line and replaced with a flow of air over the catalyst. Thus, reestablishment of VOC flow over the catalyst resulted in a small induction period to regain activity. Similarly, the catalysts were maintained at 150° C. under a flow of air overnight, which resulted in greater induction periods at the beginning of the day in sections (a), (e), and (f).

FIG. 16A shows that the total percent conversion of toluene and MEK to $CO_2$ reaches a maximum of greater than 80% for each set of concentrations. This experiment used a sample of catalyst prepared under non-optimal reduction conditions. The % conversion would be greater if the catalyst was prepared under optimal reduction conditions. Additionally, the percent removal of toluene and MEK remains above 95% for each set of concentrations.

The curves for toluene and MEK removal are shown expanded in FIG. 16B. The data in FIG. 16B also show an induction period for each set of concentrations, and suggest that there is a slightly larger percent removal of toluene than MEK. The difference in percent removal of these two VOCs appears to decrease as the difference in their concentrations is reduced.

Despite the relatively high temperature of this experiment (150° C.) there remains about a 16% difference between the activity based on VOC removal and $CO_2$ production. At most, a few percent of this difference can be attributed to other oxidation products observed in the chromatograms during the early part of the experiment (sections b, c, and e in FIGS. 16A and 16B). However, the identity of the other oxidation products varied between chromatograms. Based only on retention times, some of the other products may to be acetone, benzene, and hexanone.

Catalyst Preconditioning

Figure 17:
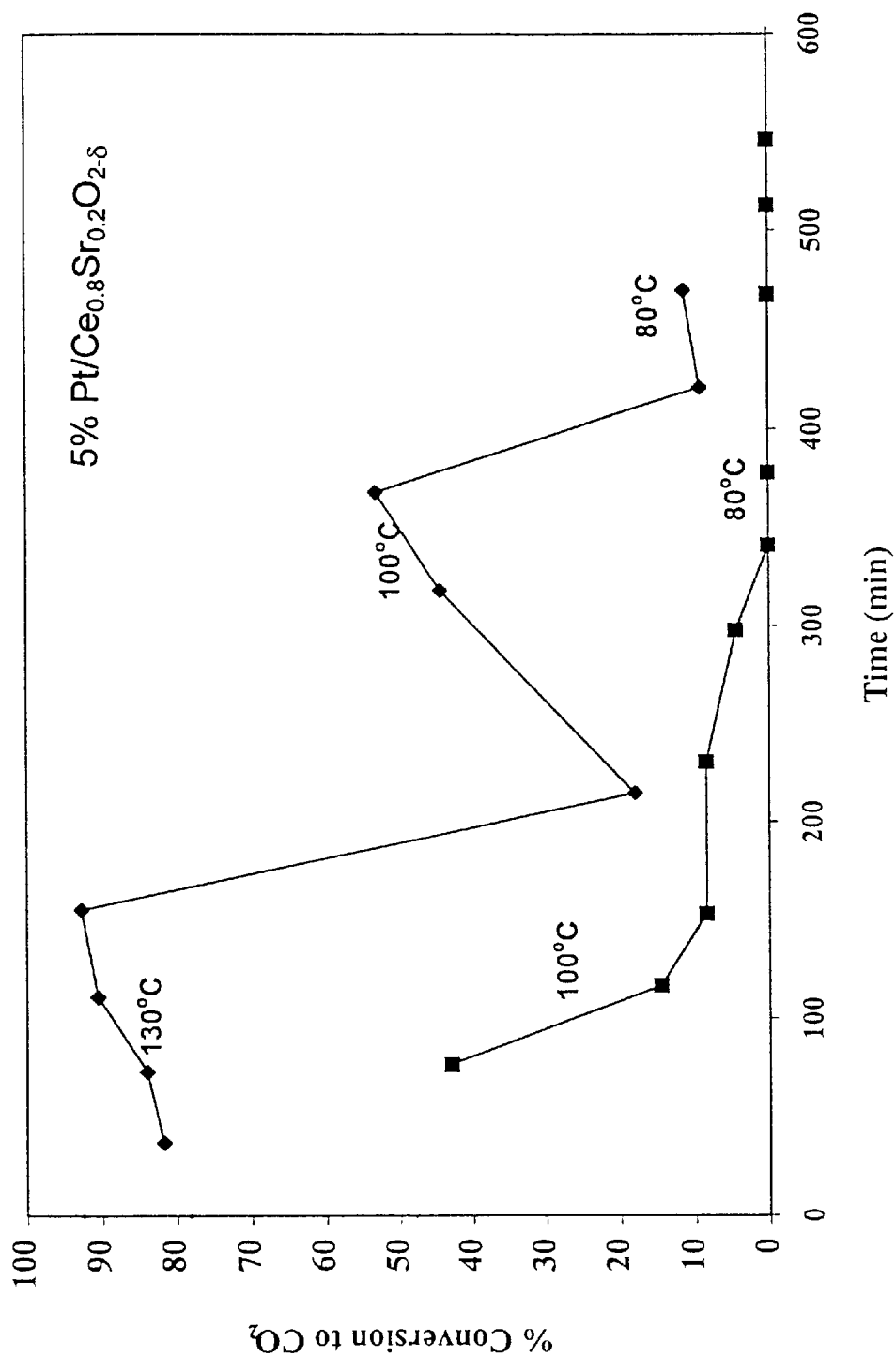
FIG. 17 is a plot of percent conversion of toluene to $CO_2$ versus time for $5\%Pt/Ce_{0.8}Sr_{0.2}O_{2-\delta}$.

FIG. 17 demonstrates the effect of preconditioning the catalysts at elevated temperatures before screening. The upper and lower curves both correspond to activity based on conversion of toluene to $CO_2$ for the 5%Pt/$Ce_{0.8}Sr_{0.2}O_{2-\delta}$ catalyst. The difference between the two curves is that the catalyst for the upper curve was screened at 130° C. for almost 200 minutes under a flow of toluene before the temperature dropped to 100° C. For the lower curve, the catalyst screening was started at 100° C. The activity for the experiment in the upper curve is substantially higher, and shows the characteristic induction period at each temperature. This same trend also was observed for the catalysts 1%Pt/12%$CeO_2$/$ZrO_2$ and 1%Pt/$Ce_{0.8}Cu_{0.2}O_{2-\delta}$. For 1%Pt/12%$CeO_2$/$ZrO_2$, starting the catalyst screening at 100° C. greater than 90% conversion to $CO_2$, and reducing the temperature to 80° C. produced greater than 45% conversion. However, for the same catalyst started at 80° C., the highest achievable conversion was only 17%. Similarly, for 1%Pt/$Ce_{0.8}Cu_{0.2}O_{2-\delta}$ starting at 130° C. gave greater than 50% conversion, and reducing to 100° C. still gave greater than 17% conversion. The same catalysts started at 100° C. gave a maximum activity of only 9% conversion to $CO_2$. Therefore, the data from the screening of these three catalysts suggest that to optimize activity at lower temperatures, the catalysts should be first exposed to temperatures high enough to obtain significant conversion to $CO_2$.

Figure 18:
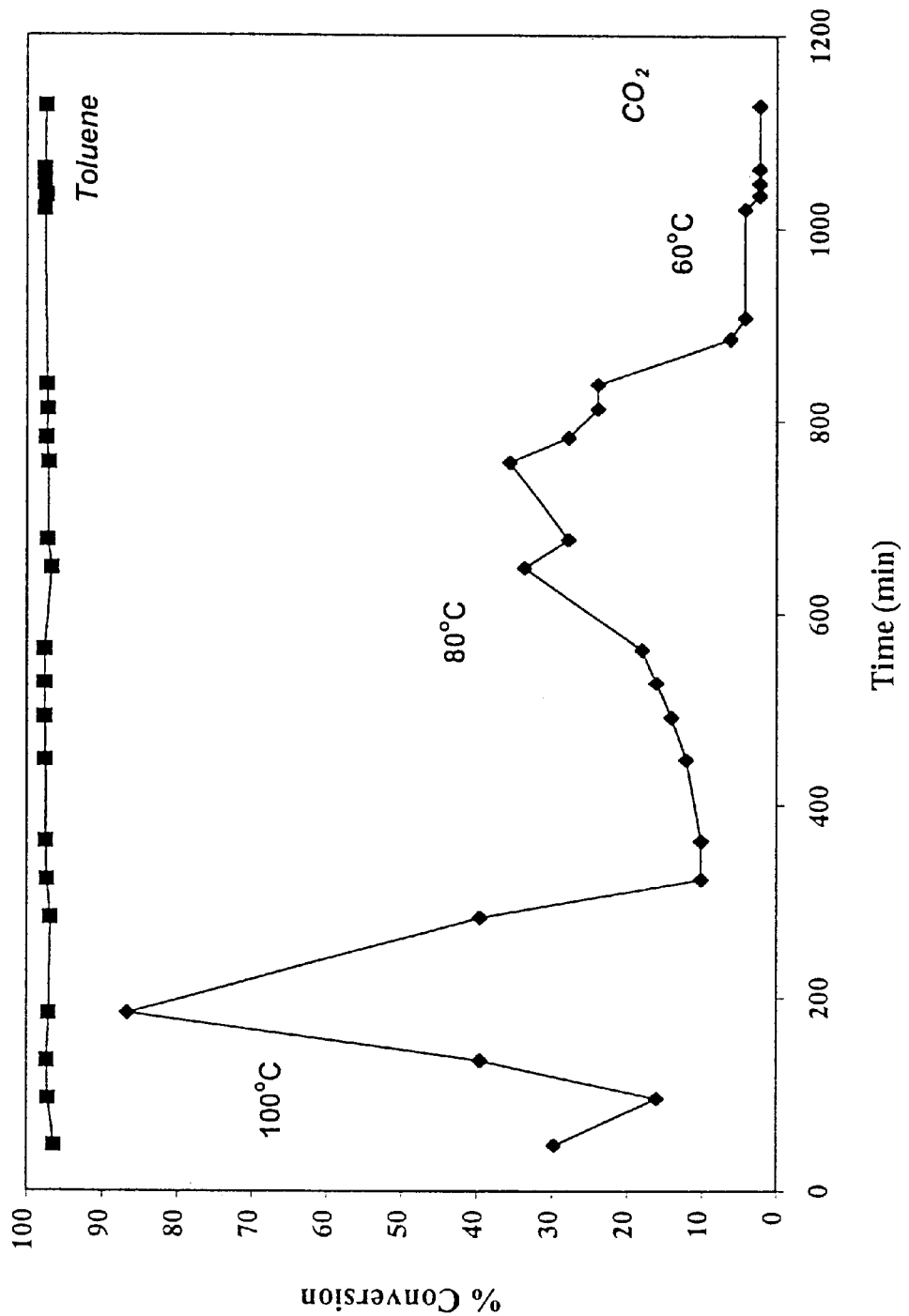
FIG. 18 is a plot of catalyst activity as a function of time for $5\%Pt/Ce_{0.8}Cu_{0.2}O_{2-\delta}$.

The significance of the catalyst preconditioning is underscored by the data for MEK destruction by 5%Pd/$CeO_2$ shown in FIG. 18. This plot shows the preconditioning at 150° C. under a flow of MEK, followed by screening at 80° C. (the induction period for 80° C. is not shown). The activity at 80° C. dies off slowly over 2844 minutes (~2 days) from 28% to 11%. However, heating the catalyst at 150° C. for 288 minutes under a flow of MEK (break in the plot) restored activity and resulted in even higher conversions to $CO_2$ of 35%. During the reconditioning cycle initial $CO_2$ concentrations greater than 2000 ppm were observed, followed by a rapid decrease. These results suggest that deactivation of the catalyst results from build up of organic material that can be removed from the catalyst surface by high temperature cycling.

The data shown in FIGS. 17 and 18 demonstrated that pretreating the catalysts at elevated temperatures under a flow of VOCs resulted in much higher catalytic activity. Based on these results, it is possible that an activated intermediate necessary for the complete destruction of VOCs is being generated more quickly at the higher temperatures, which then facilitates the catalytic combustion when the temperature is reduced. To test this possibility, the experiments were repeated, but the catalyst conditioning was performed in a flow of air only. It was determined that conditioning in air had the same beneficial effect as conditioning in a VOC flow, and that catalytic activity could be restored after deactivation by heating in air at 150° C. Therefore, it is likely that the heat treatment is simply oxidizing and desorbing hydrocarbons, oxidation products, and water, that are occupying active sites on the catalyst. In fact, a fresh catalyst sample was heated at 180° C. for several hours under air, and liberated ~50 ppm of $CO_2$ initially, which gradually dropped off to zero after about 2.5 hours. FTIR results supporting these conclusions are not shown.

Effect of Dopant Concentration

Figure 19:
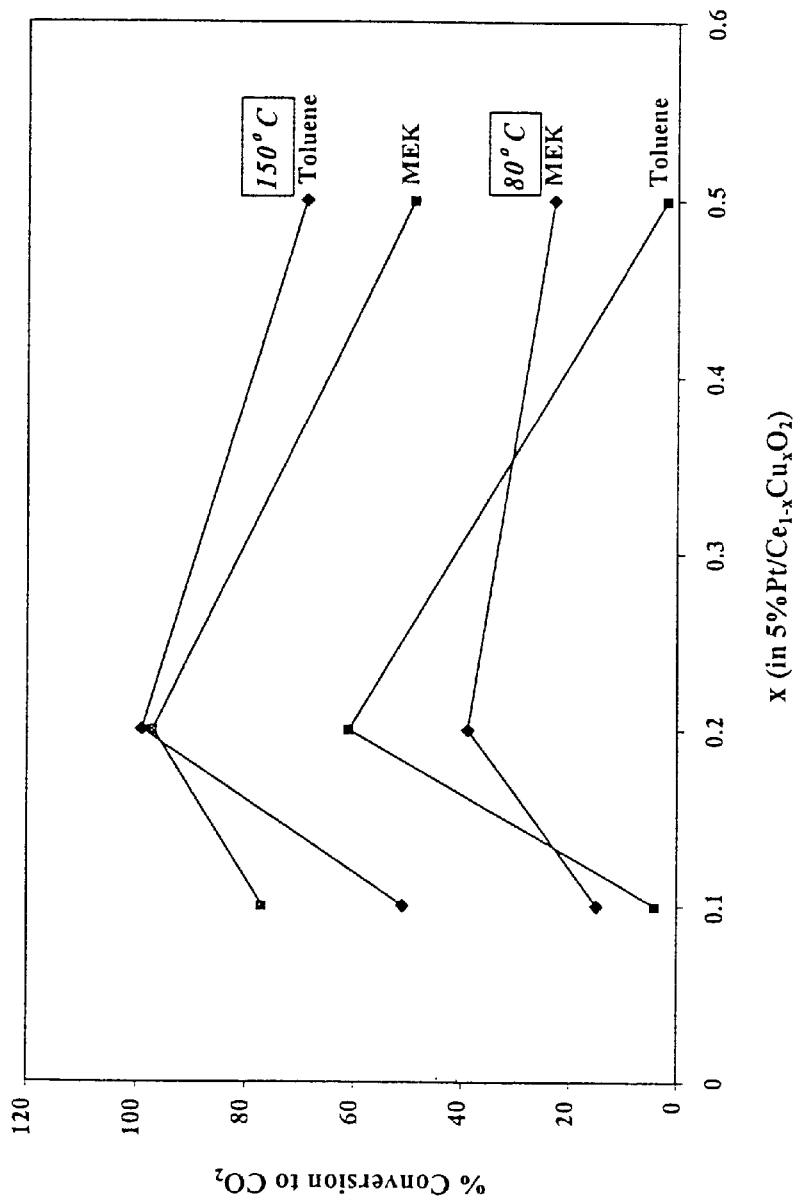
FIG. 19 is a plot showing the effect of Cu doping level on the activity for conversion of toluene and MEK to $CO_2$.
Figure 20:
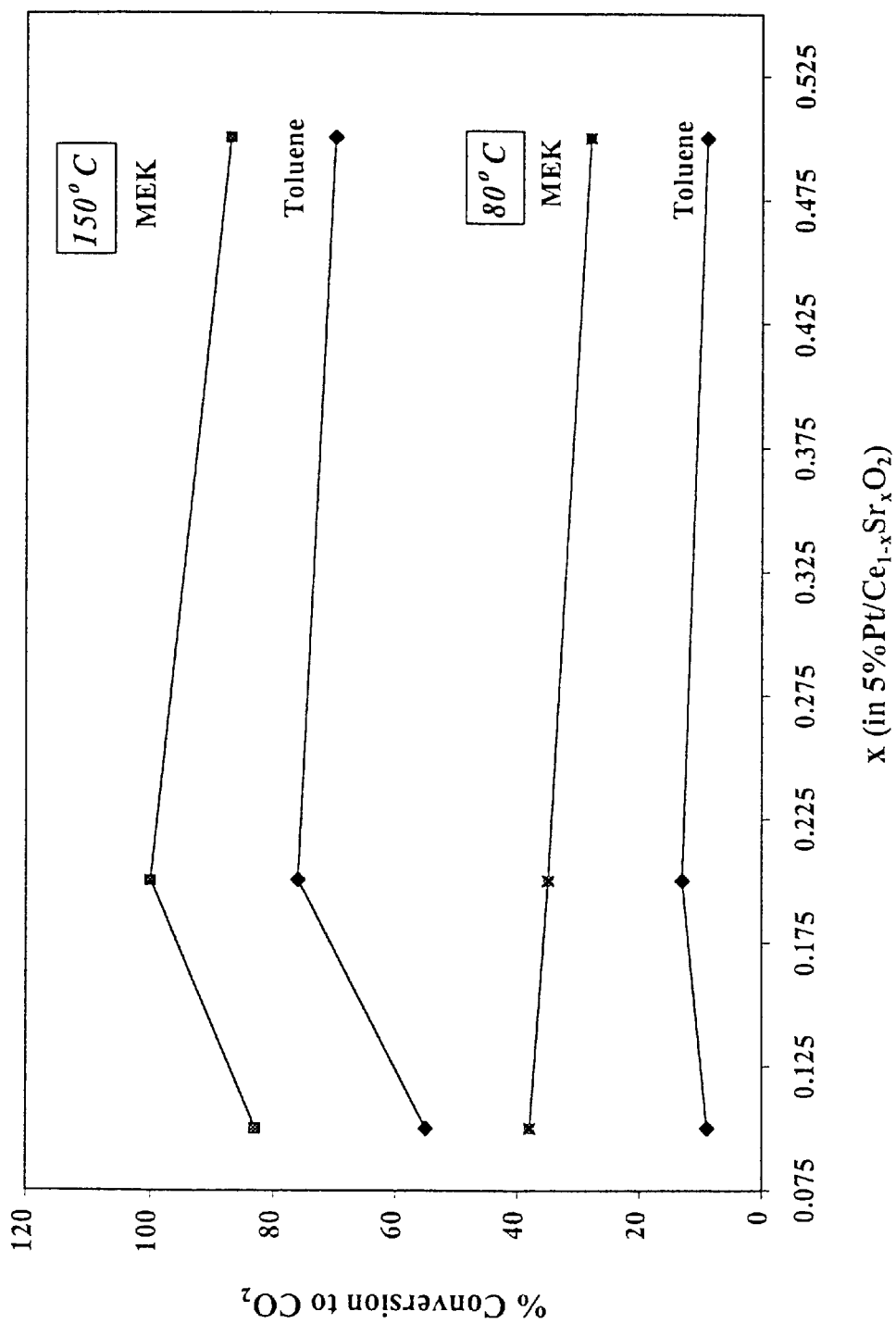
FIG. 20 is a plot showing the effect of Sr doping level on the activity for conversion of toluene and MEK to $CO_2$.

The effect of the dopant concentration on the catalytic activity for $CeO_2$-based supports was determined for both Cu and Sr dopants, and the results are presented in FIGS. 19 and 20, respectively.

FIG. 19 shows the % conversion of toluene and MEK to $CO_2$ at both 150° C. and 80° C. for $5\%Pt/Ce_{1-x}Cu_xO_{2-\delta}$, where x=0.1, 0.2, and 0.5. A direct comparison between the toluene and MEK data was not possible since the toluene runs were performed at a space velocity of ~4000 $hr^{-1}$, and the MEK runs were performed at ~2600 $hr^{-1}$. However, for each curve the maximum activity was obtained with the $5\%Pt/Ce_{0.8}Cu_{0.2}O_{2-\delta}$ catalyst. Similarly, FIG. 20 shows the results for $5\%Pt/Ce_{1-x}Sr_xO_{2-\delta}$ with x=0.1, 0.2, and 0.5. Although the difference between the catalysts was not a great as for the Cu-doped catalysts, the $5\%Pt/Ce_{0.8}Sr_{0.2}O_{2-\delta}$ had generally greater activity.

For 1-butanol, the $5\%Pt/CeO_2$ catalyst gave 95% conversion to $CO_2$ at only 60° C., with demonstrated light-off temperatures between 60° C. and 80° C. For toluene, which is typically more difficult to oxidize, the light-off temperature was between 80° C. and 100° C. However, doping the $CeO_2$ with small amounts of Cu resulted in over 60% conversion of toluene to $CO_2$ at 80° C. Additionally, a catalyst with only 1% Pt loading on a mixed $CeO_2/ZrO_2$ support generated near light-off conversion of toluene at 80° C., and near complete conversion at 100° C.

Three major factors affecting the activity of noble metal containing catalysts were determined: 1) there is a temperature-dependent induction period for these materials to reach full activity for conversion of the representative VOCs to $CO_2$, 2) the catalysts should be pre-conditioned at temperatures of approximately 150° C. or greater under either oxidizing or reducing conditions, and 3) the exact conditions during the reduction of the catalytic metals (Pt and Pd) must be carefully controlled to ensure that a thoroughly reductive environment and adequate temperatures are maintained. These factors were not appreciated during the screening of all of the catalysts, and the conversion values for many of them do not represent optimal conditions. Specifically, catalysts #1–12 in Table 2 were prepared under adequate conditions, and they were inadvertently preconditioned by screening at relatively high temperatures. However, once conversion rates substantially above the light-off value were achieved the temperature was reduced. This factor explains why higher conversion values are reported at lower temperatures for several of the materials (catalysts #2 and #4, in Table 2, for example). The reported conversion values for the block of catalysts from #13–34 in Table 2 are likely well below the optimal values, since none of the above three factors were considered in the screening.

Performance Testing of Metal Oxide Catalysts without Noble Metals

Table 6 contains a summary of some of the catalysts screened that did not contain noble metals. For each catalyst, the table contains the composition, preparation method, and percent conversion of 100 ppm toluene (in air) to $CO_2$ at 200° C. and a space velocity of approximately 6,000 $hr^{-1}$. The percent conversion values are averages from steady state conditions over an approximately 24-hour period. Except where noted, these catalysts maintained activity over the duration of the tests. Most of the mixed oxide catalysts in the table used commercial metal oxides as the support (e.g $CeO_2$, CuO, $Fe_2O_3$, etc.), and have BET surface areas below 40 $m^2/g$. However, as indicated, several of the mixed oxide catalysts used $CeO_2$ prepared by precipitation of the corresponding nitrate, and these materials have higher surface areas.

The first ten catalysts listed in Table 6 are either mixed Cu and Ce oxides or Cu-doped $CeO_2$. The first two catalysts compare the effect of using either CuO or $CeO_2$ as the support. Although the 10%$CeO_2$/CuO (No. 1) produced a higher mean activity (33%), this catalyst was one of only two that showed significant deactivation over the test period. Alternatively, 10%CuO/$CeO_2$ (No. 2) demonstrated a very stable conversion rate of 19%. Catalysts No. 2 through 5 all had the same composition, except the surface areas and preparation methods differed. Catalysts No. 2 and 3 compared the effect of preparation method on the lower surface area materials, and demonstrated that ppt/dep produced about twice the activity for toluene destruction as imp/dec. Catalysts No. 4 and 5 compared the effect of preparation method on the higher surface area materials, and demonstrated the reverse behavior. In this case the preparation method was much more significant, and the imp/dec catalyst (No. 4) gave 100% conversion of toluene to $CO_2$. It is possible that for the higher surface area $CeO_2$ support powder, the precipitant ($NH_4OH$) did not effectively penetrate the crevasses of the surface roughness features. Subsequent washing of the precipitate would have removed excess nitrate, and resulted in less CuO in contact with the $CeO_2$ support after the oxidation step.

The $Ce_{1-x}Cu_xO_{2-\delta}$ catalysts (No. 6 through 10) had the highest surface areas and overall highest activity. It should be noted that the FTIR spectra of $Ce_{0.8}Cu_{0.2}O_{1.8}$ indicated the presence of $NO_3^-$, which was determined to inhibit catalyst activity. Finally, X-ray diffraction (XRD) analysis of this series of catalysts on very small sample sizes with a low-resolution instrument showed the characteristic pattern for $CeO_2$ without contributions from CuO.

A comparison of catalysts containing Mn also was performed (No. 11 through 14). As with the Cu-containing catalysts, No. 11, 12, and 13 compared the effect of using $CeO_2$ versus $MnO_2$ as the support ($MnO_2$ is actually a combination of $Mn^{3+}$ and $Mn^{4+}$). Each catalyst was stable, but the $CeO_2$-supported $MnO_2$ (No. 12 and 13) had much higher activity. Furthermore, the 10%$MnO_2$/$CeO_2$ catalyst prepared by imp/dec (No. 12) was more active and much more stable than the analog prepared by ppt/dep (No. 13). Finally, the higher surface area analog of 10%$MnO_2$/$CeO_2$ (No. 14) prepared by ppt/dep was significantly less active than the lower surface area versions prepared by ppt/dep and imp/dec. A higher surface area 10%$MnO_2$/$CeO_2$ catalyst has been prepared by imp/dec.

The Fe-, Co-, and Zr-containing catalysts (No. 15 through 22) were much less active than the Cu and Mn analogs. Also, the 10%$ZrO_2$/10%$MeO_x$/$CeO_{2-\delta}$ catalysts, where Me is Cu, Mn, Fe, or Co, all had low or negligible activity (No. 23 through 26). Lastly, a Gd-doped ceria catalysts has been screened (No. 27) and demonstrated an 80% conversion.

TABLE 6

Summary of Catalyst Screening of Catalysts without Noble Metals

| No. | Composition | BET Surface Area ($m^2$/g) | Preparation Method* | % conversion of Toluene to $CO_2$ at 200° C.** |
|---|---|---|---|---|
| 1 | 10% $CeO_2$/CuO | 8 | Imp/Dec | 33 (deactivated) |
| 2 | 10% CuO/$CeO_2$ | 11 | Imp/Dec | 19 |
| 3 | 10% CuO/$CeO_2$ | 12 | Ppt/Dep | 44 |
| 4 | 10% CuO/$CeO_2$ (higher surface area ceria) | 41 | Imp/Dec | 100 |

TABLE 6-continued

Summary of Catalyst Screening of Catalysts without Noble Metals

| No. | Composition | BET Surface Area ($m^2/g$) | Preparation Method* | % conversion of Toluene to $CO_2$ at 200° C.** |
|---|---|---|---|---|
| 5 | 10% $CuO/CeO_2$ (higher surface area ceria) | 41 | Ppt/Dep | 8 |
| 6 | $Ce_{0.9}Cu_{0.1}O_{1.9}$ | 85 | Co-ppt | 91 (sv > 12,000 $hr^{-1}$) |
| 7 | $Ce_{0.8}Cu_{0.2}O_{1.8}$ | 120 | Co-ppt | 31 |
| 8 | $Ce_{0.7}Cu_{0.3}O_{1.7}$ | 125 | Co-ppt | 48 |
| 9 | $Ce_{0.6}Cu_{0.4}O_{1.6}$ | 179 | Co-ppt | 100 |
| 10 | $Ce_{0.5}Cu_{0.5}O_{1.5}$ | 172 | Co-ppt | 100 |
| 11 | 10% $CeO_2/MnO_2$ | 12 | Imp/Dec | 7 |
| 12 | 10% $MnO_2/CeO_2$ | 12 | Imp/Dec | 62 |
| 13 | 10% $MnO_2/CeO_2$ | 12 | Ppt/Dep | 58 (slowly deactivated) |
| 14 | 10% $MnO_2/CeO_2$ (higher surface area ceria) | 32 | Ppt/Dep | 16 |
| 15 | 10% $CeO_2/Fe_2O_3$ | 11 | Imp/Dec | 4 |
| 16 | 10% $Fe_2O_3/CeO_2$ | 19 | Imp/Dec | 46 |
| 17 | 10% $Fe_2O_3/CeO_2$ | 23 | Ppt/Dep | negligible |
| 18 | 10% $CeO_2/Co_3O_4$ | 9 | Imp/Dec | 23 |
| 19 | 10% $Co_3O_4/CeO_2$ | 15 | Imp/Dec | negligible |
| 20 | 10% $Co_3O_4/CeO_2$ | 16 | Ppt/Dep | negligible |
| 21 | 10% $ZrO_2/CeO_2$ | 18 | Imp/Dec | negligible |
| 22 | 10% $ZrO_2/CeO_2$ | 26 | Ppt/Dep | negligible |
| 23 | 10% $ZrO_2$/10% $CuO/CeO_2$ | 27 | Imp/Dec | 19 |
| 24 | 10% $ZrO_2$/10% $MnO_2/CeO_2$ | 36 | Imp/Dec | negligible |
| 25 | 10% $ZrO_2$/10% $Fe_2O_3/CeO_2$ | 35 | Imp/Dec | 15 |
| 26 | 10% $ZrO_2$/10% $Co_3O_4/CeO_2$ | 33 | Imp/Dec | negligible |
| 27 | $Ce_{0.95}Gd_{0.05}O_{1.98}$ | 78 | Co-ppt | 80 |

*imp/dec = impregnation decomposition; ppt/dep = precipitation/deposition; co-ppt = coprecipitation.
**Toulene concentration was approximately 100 ppm in air, and the space velocity was approximately 6,000 $hr^{-1}$, except where noted. Screening period was at least 24 hours.

Table 7 contains a data indicating the activity of some metal oxide catalysts screened for conversion of toluene to $CO_2$ at 150° C. The concentration of toluene was ~100 ppm in air, the space velocity was at least 6,000 $hr^{-1}$, and the temperature was 150° C. Additive-free $CeO_2$ and $MnO_2$ are included in the graph for comparison. Many of the catalysts had activity between or below $CeO_2$ and $MnO_2$; however, $Ce_{0.8}Mn_{0.2}O_{2-\delta}$ and $Ce_{0.5}Fe_{0.1}Cu_{0.4}O_{2-\delta}$ demonstrated significant improvements with 50% and 75% conversion of toluene to $CO_2$, respectively. These conversion values were very stable over the 48-hour test period.

TABLE 7

Summary of screening data for catalytic conversion of toluene to $CO_2$ for various catalyst compositions.

| Catalyst composition | % Conversion of toluene to $CO_2$ at 150° C. |
|---|---|
| $CeO_2$ | 7 |
| $MnO_2(Mn_2O_3)$ | 33 |
| $Ce_{0.8}Mn_{0.2}O$ | 50 |
| $Ce_{0.5}Mn_{0.5}O_{2-\delta}$ | 13 |
| $Ce_{0.95}Zr_{0.05}O_{2-\delta}$ | 28 |
| $Ce_{0.8}Zr_{0.2}O_{2-\delta}$ | 2 |
| $Ce_{0.5}Co_{0.1}Cu_{0.4}O_{2-\delta}$ | 6 |
| $Ce_{0.5}Mn_{0.1}Cu_{0.4}O_{2-\delta}$ | 12 |
| $Ce_{0.5}Fe_{0.1}Cu_{0.4}O_{2-\delta}$ | 75 |

TABLE 7-continued

Summary of screening data for catalytic conversion of toluene to $CO_2$ for various catalyst compositions.

| Catalyst composition | % Conversion of toluene to $CO_2$ at 150° C. |
|---|---|
| $Ce_{0.95}La_{0.05}O_{2-\delta}$ | 7 |
| $Ce_{0.45}La_{0.05}Mn_{0.25}Cu_{0.25}O_{2-\delta}$ | 4 |

A series of catalysts also were screened for conversion of 1-butanol to $CO_2$, and these results are shown in Table 8. Again, the temperature was 150° C., the concentration of 1-butanol was ~100 ppm in air, and the space velocity was at least 6,000 $hr^{-1}$. Each of these catalysts gave high activity for destruction of 1-butanol, but the results for $Ce_{0.48}Zr_{0.05}Mn_{0.45}O_{2-\delta}$ were particularly good. In addition to generating 100% conversion at 150° C., this catalyst gave 42% conversion at 100° C., and 15% conversion at only 80° C. Moreover, the 15% conversion achieved at 80° C. was very stable over a 96-hour test period. The results for $Ce_{0.48}Zr_{0.05}Mn_{0.45}O_{2-\delta}$ are summarized in Table 9.

TABLE 8

Summary of screening data for catalytic conversion of 1-butanol to $CO_2$ for various catalyst compositions.

| Catalyst composition | % Conversion of 1-butanol to $CO_2$ at 150° |
|---|---|
| $Mn_{0.95}Ce_{0.05}O_{2-\delta}$ | 58 |
| $Ce_{0.8}Zr_{0.05}Mn_{0.15}O_{2-\delta}$ | 45 |
| $Ce_{0.48}Zr_{0.05}Mn_{0.48}O_{2-\delta}$ | 100 |
| $Ce_{0.9}Zr_{0.05}Mn_{0.05}O_{2-\delta}$ | 14 |
| $Ce_{0.8}Zr_{0.05}Mn_{0.1}Cu_{0.05}O_{2-\delta}$ | 64 |
| $Ce_{0.45}Zr_{0.05}Mn_{0.45}Cu_{0.05}O_{2-\delta}$ | 100 |
| $Ce_{0.8}Zr_{0.05}Cu_{0.15}O_{2-\delta}$ | 100 |
| $Ce_{0.48}Zr_{0.05}Cu_{0.48}O_{2-\delta}$ | 100 |

TABLE 9

Percent conversion of 1-butanol to $CO_2$ as a function of temperature for $Ce_{0.48}Zr_{0.05}Cu_{0.48}O_{2-\delta}$.*

| Temperature (° C.) | % conversion of 1-butanol to $CO_2$ |
|---|---|
| 80 | 15 |
| 100 | 42 |
| 150 | 100 |
| 200 | 100 |

*The 1-butanol concentration was 100 ppm in air, the space velocity was at least 6,000 $hr^{-1}$, and the temperature was 150° C.

Performance Testing of $CeO_2$-Based Catalysts Incorporating Cu

Activity Measurements and Characterization

The catalyst screening results for conversion of toluene to $CO_2$ are shown in Table 10 for a series of $CeO_2$-based catalyst incorporating Cu. The catalysts were either Cu-doped $CeO_2$, or mixed Cu and Ce oxides. The results are presented for both Pt-free and Pt-containing analogs. The concentration of toluene in the feedstream was approximately 100 ppm (in air) and the space velocity was approximately 6000 $hr^{-1}$. Table 10 contains the catalyst compositions and percent conversion of toluene to $CO_2$ at each temperature. Most of the catalysts were prepared by coprecipitation of the constituent metal nitrates using $NH_4OH$; however, as indicated in the table, an analog of $Ce_{0.6}Cu0.4O_{1.6}$ also was precipitated using NaOH. Incorporation of Pt was performed by incipient wetness impregnation.

TABLE 10

Summary of Screening Results for Ce/Cu-Based Catalysts*

| Composition | % Conversion of Toluene to $CO_2$ at: | | | |
|---|---|---|---|---|
| | 200° C. | 150° C. | 100° C. | 80° C. |
| $Ce_{0.9}Cu_{0.1}O_{1.9}$ | 91 | | | |
| $Ce_{0.8}Cu_{0.2}O_{1.8}$ | 31 | | | |
| $Ce_{0.7}Cu_{0.3}O_{1.7}$ | 48 | | | |
| $Ce_{0.6}Cu_{0.4}O_{1.6}$ | 100 | | | |
| $Ce_{0.5}Cu_{0.5}O_{1.5}$ | 100 | | | |
| $Ce_{0.6}Cu_{0.4}O_{1.6}$ (NaOH ppt) | 38 | | | |
| 10% $CuO/CeO_2$ | 100 | | | |
| CuO | negligible | | | |
| 1% Pt-Loaded Analogs | | | | |
| 1% $Pt/Ce_{0.9}Cu_{0.1}O_{1.9}$ | | 84 | 1 | 0 |
| 1% $Pt/Ce_{0.8}Cu_{0.2}O_{1.8}$ | | 49 | | 0 |
| 1% $Pt/Ce_{0.7}Cu_{0.3}O_{1.7}$ | | 100 | 32 | 3 |
| 1% $Pt/Ce_{0.6}Cu_{0.4}O_{1.6}$ | | 27 | | 0 |
| 1% $Pt/Ce_{0.5}Cu_{0.5}O_{1.5}$ | | 55 | negligible | negligible |
| 1% Pt/10% $CuO/CeO_2$ | | 62 | | negligible |

*Toluene concentration was 100 ppm. Space velocity at least 6,000 $hr^{-1}$.

For most of the catalysts in Table 10 there was a clear increase in activity upon addition of 1% Pt. The most active catalyst in Table 10 was 1%$Pt/Ce_{0.7}Cu_{0.3}O_{1.7}$, which produced a very stable 32% conversion of toluene to $CO_2$ at 100° C. For the Pt-free materials there was a dip in activity for the 20% and 30% Cu doped catalysts, in contrast to 5% Pt-loaded $Ce_{1-x}Cu_xO_{2-d}$. However, for the 1% Pt-loaded catalyst, there was no discernable trend in activity. These observations likely are the result of subtle differences in the Pt addition step that result in incongruities in the exact Pt loading and dispersion between samples.

Figure 21:
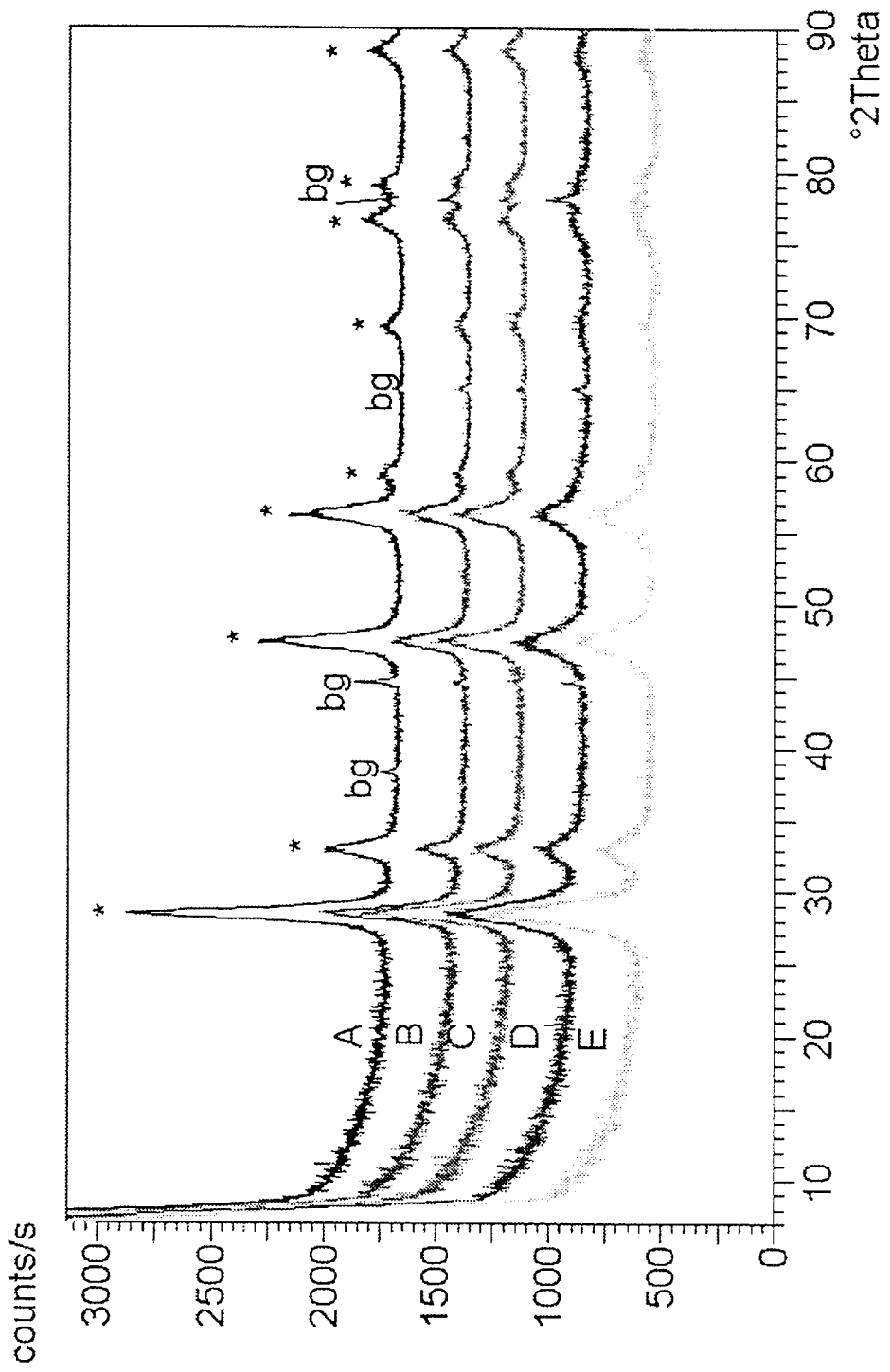
FIG. 21 shows XRD results for $Ce_{1-x}Cu_xO_{2-\delta}$ without Pt, where x is 0.1 (A), 0.2 (B), 0.3 (C), 0.4 (D), and 0.5 (E).

To gain insight into properties of the Cu-doped $CeO_2$ catalysts, the catalysts were characterized by X-ray diffraction (XRD), Fourier-transform infrared (FTIR) spectroscopy, and energy dispersive X-ray spectroscopy (EDX). The XRD results are shown in FIG. 21 for $Ce_{1-x}Cu_xO_{2-\delta}$ without Pt, where x is 0.1 (A), 0.2 (B), 0.3 (C), 0.4 (D), and 0.5 (E). The catalysts were prepared by coprecipitation using $NH_4OH$. The peaks marked with an asterisk are due to the $CeO_2$ fluorite structure and the peaks marked bg are background from the aluminum sample holder. As the Cu content increases from x=0.1 to x=0.5, there is a broadening of the peaks indicating a reduction in crystallinity. However, there is no shift in peak positions, so it is not clear if Cu is being incorporated into the $CeO_2$ lattice, or if it is in the form of the oxide (CuO or $Cu_2O$).

The XRD patterns (not shown) for the Pt-loaded $Ce_{1-x}Cu_xO_{2-\delta}$ analogs over the narrow range of $39° \leq 2\theta \leq 41°$, show the peak for Pt at approximately 39.8°.

The EDX spectra (not shown) for the Pt-free $Ce_{1-x}Cu_xO_{2-\delta}$ catalysts showed large peaks for Ce, but peaks for Cu were only visible once a doping level of 40% was reached. The height ratio of the most intense Cu peak to the most intense Ce peak for 40% and 50% Cu doping was approximately the same (Cu/Ce ~0.11).

The FTIR spectrum for the Pt-free $Ce_{0.9}Cu_{0.1}O_{1.9}$ catalyst shows a majority of the peaks in the spectrum from carbonate species, which are located at approximately 850, 1058, 1350, 1530, and 1640 $cm^{-1}$. Also, there was a broad weak peak for chemisorbed CO centered at ~2050 $cm^{-1}$. An intense broad peak between ~2700 to 3700 $cm^{-1}$ was mostly from undissociated water, but OH stretching from hydrogen bonding also was seen at ~3400 $cm^{-1}$ and ~3600 $cm^{-1}$. The most significant peak in the FTIR spectra for the catalysts was the $NO_3^-$ asymmetric stretching located at 1385 $cm^{-1}$. It was determined that the presence of $NO_3^{-31}$ resulted in a dramatic decrease in oxidation activity for Pt-loaded catalysts. The $NO_3^-$ peak was most intense for $Ce_{0.8}Cu_{0.2}O_{1.8}$, so this factor might have contributed to the reduced activity of that catalyst. However, $Ce_{0.9}Cu_{0.1}O_{1.9}$ was rather active and, as shown in the figure, also had a substantial $NO_3^-$ peak. The $Ce_{0.6}Cu_{0.4}O_{1.6}$ and $Ce_{0.5}Cu_{0.5}O_{1.5}$ catalysts had the weakest $NO_3^-$ peaks and had the highest activity. Based on these results, in the future the oxidation step during catalyst syntheses will be performed at higher temperatures or for longer periods of time to ensure complete decomposition of the nitrate precursors.

Comparison of $NH_4OH$ and NaOH Precipitants

Figure 22:
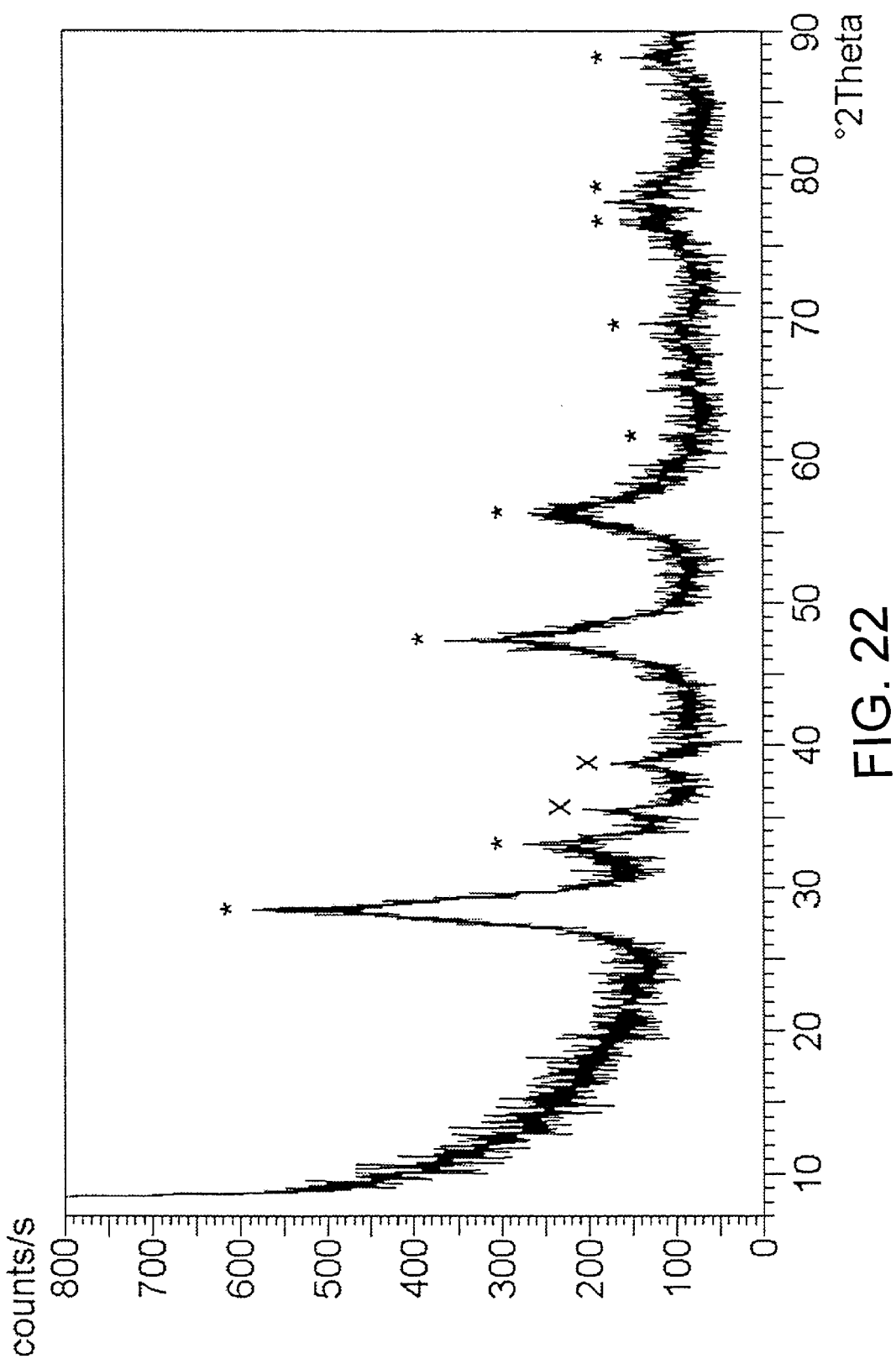
FIG. 22 shows the XRD pattern for $Ce_{0.6}Cu_{0.4}O_{1.6}$ precipitated with NaOH.

The amount of Cu in the catalysts prepared by coprecipitation using $NH_4OH$ might be overestimated due to complex formation between $NH_4^+$ and $Cu^{2+}$. This expectation was qualitatively confirmed by the deep blue color of the filtrate after precipitation. To circumvent this problem, an analog of $Ce_{0.6}Cu_{0.4}O_{1.6}$ was prepared using NaOH as the precipitant. In this case, the filtrate was very pale blue indicating much more Cu was precipitated with NaOH than $NH_4OH$. Further confirmation was attained by comparing the XRD patterns for the two analogs. FIG. 22 shows the XRD pattern for $Ce_{0.6}Cu_{0.4}O_{1.6}$ precipitated with NaOH, and the pattern for the version precipitated with $NH_4OH$ was shown in FIG. 21. In both figures the characteristic fluorite peaks are visible; however, in FIG. 22 two peaks for CuO also are present (marked with an X), which is expected for 40% Cu doping. Moreover, the EDX spectra for both materials (not shown) indicates a higher relative amount of Cu for the analog prepared using NaOH (Cu/Ce ~0.31) compared to the one prepared using $NH_4OH$ (Cu/Ce ~0.11). Referring back to Table 10, the analog prepared using NaOH produced only 38% conversion of toluene to $CO_2$ at 200° C. compared to 100% for the analog prepared using $NH_4OH$. Therefore, although NaOH results in much greater precipitation of Cu, high levels of Cu result in a suppression of catalytic activity. Furthermore, residual sodium must be thoroughly rinsed from the precipitate when using NaOH.

Performance Testing of Ce/Zr-Based Catalysts

Table 11 contains a summary of some of the Ce/Zr-based catalysts studied with and without Pt. The activity of the Pt-free analogs were comparable the Pt-free Cu-doped $CeO_2$ catalysts. However, the FTIR spectra (not shown) of these catalysts showed evidence of large amounts of residual nitrates, and even greater activity will be achieved by oxidizing the materials

TABLE 11

Summary of Screening Results for Ce/Zr-Based Catalysts*

| Composition | % Conversion of Toluene to $CO_2$ at: | | | |
|---|---|---|---|---|
| | 200° C. | 150° C. | 100° C. | 80° C. |
| $Ce_{0.95}Zr_{0.05}O_{2-\delta}$ | 100 | 28 | | |
| $Ce_{0.8}Zr_{0.2}O_{2-\delta}$ | 38 | negligible | | |
| $Ce_{0.5}Zr_{0.5}O_{2-\delta}$ | 67 | 4 | | |
| Pt-Loaded Analogs | | | | |
| 0.5% $Pt/Ce_{0.95}Zr_{0.05}O_{2-\delta}$ | | 100 | 20 | 5 |
| 1% $Pt/Ce_{0.95}Zr_{0.05}O_{2-\delta}$ | | 100 | 54 | 8 |
| 3% $Pt/Ce_{0.95}Zr_{0.05}O_{2-\delta}$ | | 100 | 91 | 16 |
| 5% $Pt/Ce_{0.95}Zr_{0.05}O_{2-\delta}$ | | 100 | 82 | 22 |

TABLE 11-continued

Summary of Screening Results for Ce/Zr-Based Catalysts*

| | % Conversion of Toluene to $CO_2$ at: | | | |
|---|---|---|---|---|
| Composition | 200° C. | 150° C. | 100° C. | 80° C. |
| 1% Pt/$Ce_{0.8}Zr_{0.2}O_{2-\delta}$ | | 100 | 13 | negligible |
| 1% Pt/$Ce_{0.5}Zr_{0.5}O_{2-\delta}$ | | 100 | — | 2 |

*Toluene concentration was 100 ppm. Space velocity at least 6,000 $hr^{-1}$.

at higher temperatures. The Pt-loaded Ce/Zr catalysts were much more active than the Cu-doped catalysts. All of the Pt/Ce/Zr catalysts produced complete destruction of toluene at 150° C., and had very high activity at 100° C. Furthermore, measurable and sustainable activity was achieved at 80° C. for the 3% and 5% Pt-loaded analogs. These results are shown in Table 12. At 100° C., activity is at a maximum for 3% Pt loading, whereas at 80° C. the activity is maximized at 5% loading.

TABLE 12

Catalyst activity as a function of Pt loading for a Pt/$Ce_{0.95}Zr_{0.05}O_{2-\delta}$ support.

| | % conversion of toluene to $CO_2$ | |
|---|---|---|
| wt % Pt Loading | 100° C. | 80° C. |
| 0.5 | 20 | 5 |
| 1 | 54 | 8 |
| 3 | 91 | 16 |
| 5 | 82 | 22 |
| 8 | 87 | 13 |

Performance Testing of Additional Catalysts

Table 13 contains a summary of some of the additional catalysts screened. For the Pt-free analogs in this table, the $CeO_2$-based catalysts doped with Co or Mn demonstrated the greatest activity, generating complete destruction at 200° C. The catalyst $CeCo_{0.5}Cu_{0.5}O_{2-\delta}$ had the highest activity at 150° C., generating 22% destruction of toluene. Undoped $CeO_2$ prepared by coprecipitation also showed significant activity (89% destruction), however, $CeO_2$ prepared by hydrothermal synthesis was not very active (33% destruction). The most active Pt-free catalyst in this table was $MnO_2$, which produced 33% destruction of toluene at 150° C. Most of the Pt-loaded analogs generated 100% conversion of toluene to $CO_2$ at 150° C., and the 1%Pt/$Ce_{0.95}La_{0.05}O_{1.95}$ generated 20% destruction at 100° C.

As with the Ce/Cu and Ce/Zr catalysts, many of the Pt-free analogs contained residual nitrates from the corresponding precursors. Greater activity will be seen from these materials after oxidation under more severe conditions.

TABLE 13

Summary of Catalyst Screening Results for Additional Catalysts*

| | % Conversion of Toluene to $CO_2$ at: | | | |
|---|---|---|---|---|
| Composition | 200° C. | 150° C. | 100° C. | 80° C. |
| $Ce_{0.95}Gd_{0.05}O_{1.98}$ | 80 | | | |
| $Ce_{0.8}Gd_{0.2}O_{1.9}$ | negligible | | | |
| $Ce_{0.5}Gd_{0.5}O_{1.5}$ | negligible | | | |
| $Ce_{0.95}Sr_{0.05}O_{1.95}$ | negligible | | | |
| $Ce_{0.8}Sr_{0.2}O_{1.8}$ | 58 | | | |
| $Ce_{0.5}Sr_{0.5}O_{1.5}$ | negligible | | | |
| $Ce_{0.95}Co_{0.05}O_{1.95}$ | 22 | | | |
| $Ce_{0.8}Co_{0.2}O_{1.8}$ | 100 | 18 | | |
| $Ce_{0.5}Co_{0.5}O_{1.5}$ | 26 | | | |
| $Ce_{0.95}Mn_{0.05}O_{1.95}$ | 81 | | | |
| $Ce_{0.8}Mn_{0.2}O_{1.8}$ | 96 | 15 | | |
| $Ce_{0.5}Mn_{0.5}O_{1.5}$ | 38 | | | |
| $Ce_{0.75}Zr_{0.2}Cu_{0.05}O_{1.95}$ | negligible | | | |
| $CeO_2$ | 89 | | | |
| $CeO_2$ (hydrothermal) | 33 | | | |
| CuO | negligible | | | |
| $Co_3O_4$ | 55 | | | |
| $MnO_2$ ($Mn_2O_3$) | 100 | 33 | 1 | |
| $CeCo_{0.5}Cu_{0.5}O_{2-\delta}$ | 100 | 22 | | |
| $CeMn_{0.5}Cu_{0.5}O_{2-\delta}$ | 75 | 5 | | |
| 1% Pt-Loaded Analogs | | | | |
| 1% Pt/$Ce_{0.95}Gd_{0.05}O_{2-\delta}$ | | 57 | | |
| 1% Pt/$Ce_{0.8}Co_{0.2}O_{1.8}$ | | 25 | | |
| 1% Pt/$Ce_{0.95}Mn_{0.05}O_{1.95}$ | | 100 | 8 | 2 |
| 1% Pt/$Ce_{0.8}Mn_{0.2}O_{1.8}$ | | 44 | 9 | |
| 1% Pt/$Ce_{0.75}Zr_{0.2}Cu_{0.05}O_{1.95}$ | | negligible | | |
| 1% Pt/$CeO_2$ | | 100 | 17 | |
| 1% Pt/$MnO_2$ | | 100 | 5 | 0 |
| 1% Pt/$CeCo_{0.5}Cu_{0.5}O_{2-\delta}$ | | 100 | 11 | |
| 1% Pt/$CeMn_{0.5}Cu_{0.5}O_{2-\delta}$ | | negligible | | |
| 1% Pt/$CeFe_{0.5}Cu_{0.5}O_{2-\delta}$ | | 50 | | |
| 1% Pt/$Ce_{0.5}Co_{0.1}Cu_{0.4}O_{2-\delta}$ | | 100 | | 2 |
| 1% Pt/$Ce_{0.5}Mn_{0.1}Cu_{0.4}O_{2-\delta}$ | | 40 | | |
| 1% Pt/$Ce_{0.5}Fe_{0.1}Cu_{0.4}O_{2-\delta}$ | | 100 | 0 | 0 |
| 1% Pt/$Ce_{0.95}La_{0.05}O_{1.95}$ | | 100 | 20 | 1 |

*Toluene concentration was ~100 ppm.
Space velocity at least 6,000 $hr^{-1}$.

Catalysts Incorporated into Ceramic Monoliths

Figure 23:
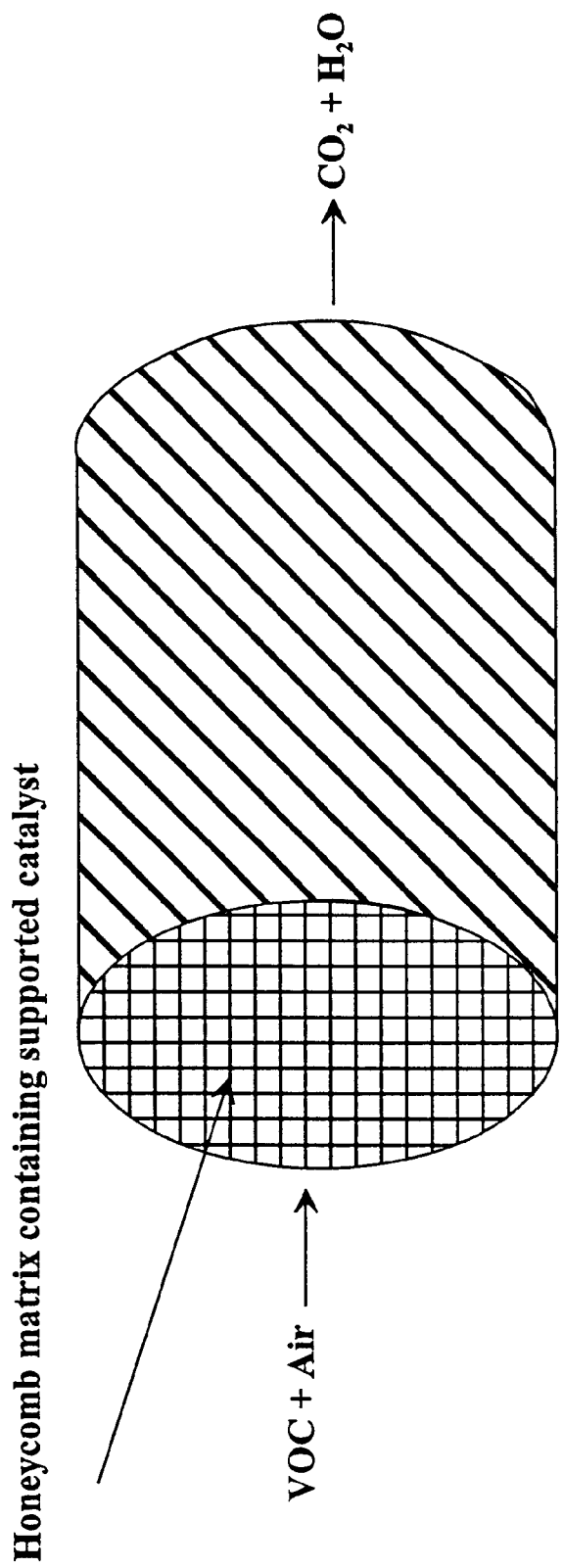
FIG. 23 shows a schematic diagram of a catalytic monolith for low-temperature oxidation of VOCs.

In order to incorporate catalysts into an air decontamination device, the active materials must be structurally supported in a way that allows adequate exposure of the catalyst to the contaminated air stream, without producing excessive back pressure. This condition is diagramed in FIG. 23 for the destruction of VOCs on a catalyst-coated monolith. The monolith contains narrow channels running parallel to the length of the tube. Coating the interior walls of the monolith with catalyst provides a compromise between high VOC-catalyst contact and high flow rates. The goal for supporting the catalysts will be to produce an evenly-distributed high-surface area catalyst coating without plugging the pores of the support. The following support techniques may be used: a) ceramic monoliths, b) pellets, and c) irregular porous clusters. As with the catalyst powders discussed above, several techniques for incorporating the catalysts with the supports, and for preactivating the supported catalysts may be used. Overall, activity per gram of catalyst will determine the optimum supported configuration.

Preparation and Evaluation of Supported Catalysts
a. Monolith Supports

Ceramic Cordierite monoliths were obtained from commercial sources (Corning) with a cell density of 400/$in^2$. Sections of the monolith blocks were cut to fit inside a 13.8-mm i.d. quartz tube, and the tube was incorporated into the reactor assembly described above. The length of the monolith (catalyst bed depth) was approximately 25 mm.

Figure 24:
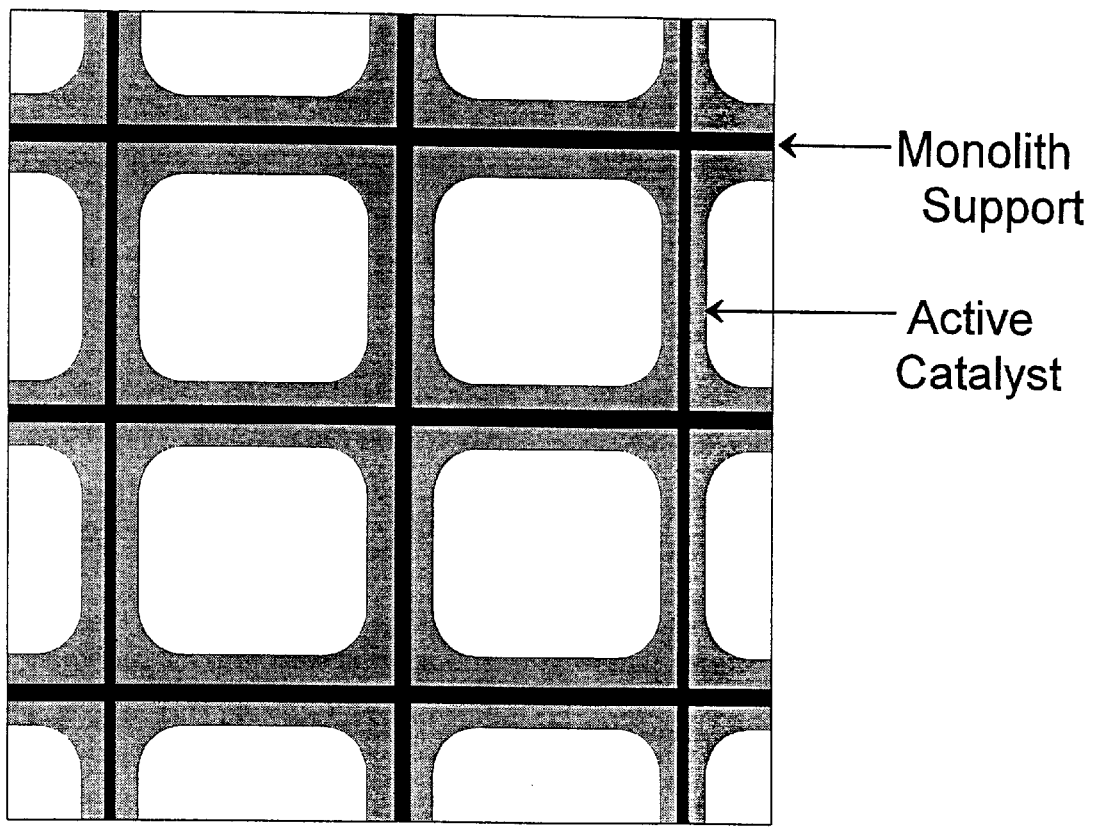
FIG. 24 shows a schematic illustration of a ceramic honeycomb monolith coated with active catalyst.

Coating of the ceramic monoliths with catalyst may be performed by four methods, 1) dip-coating the monolith in a slurry of the catalyst in a solvent, 2) decomposition of metal precursors onto the monolith, 3) precipitation-deposition of catalyst onto the monolith, and 4) washcoating the monolith with nano-scale dispersions of catalysts. The objective is to form an evenly-distributed catalyst layer on the inside of the monolith cells as diagramed in FIG. 24, without creating a prohibitive pressure drop. More detailed morphological and compositional information may be obtained using SEM and EDX. The catalyst loading is determined by weighing the monolith sections before and after deposition.

Slurry Coating

For slurry coating, 0.2 g of the catalyst powder was mixed with several drops of 1,2-butanediol. The 1,2-butanediol had sufficient viscosity to maintain suspension of the catalyst particles, while allowing thorough coating of the monolith surface. The slurry was added dropwise to one end of the monolith and allowed to flow through the monolith lengthwise. Between additions, the slurry-coated monolith was dried in air at 120° C. for several hours. After drying, the coated monolith was calcined in air at 300° C. for 4 hours.

This method resulted in a very uneven and unstable catalyst coating, and after calcining, the catalyst was easily removed from the monolith with gentle tapping. The calcination temperature was kept low to avoid sintering of the catalyst; however, sintering at higher temperatures likely would have resulted in a more stable coating.

Decomposition of the Nitrate Precursors

For this method, a section of the monolith was completely submerged for 15 seconds in a ~0.5 M solution of $CC(NO_3)_3$, then dried in air at 120° C. for several hours. This process was repeated until a 50 wt. % loading of $Ce(NO_3)_3$ relative to the weight of the monolith was achieved. The coated monolith was then calcined in air at 1000° C. for 3 hours resulting in a very stable 23 wt.-% loading of $CeO_2$. Next, one end of the coated monolith was dipped into 1 mL of a 10-mg/mL Pt solution causing the solution to wick into the monolith. The monolith was dried at 100° C., then reduced under $H_2$ at 300° C. for 3 hours, resulting in a Pt loading of 1% relative to the weight of $CeO_2$. The resulting catalyst layer was very evenly distributed and relatively rugged.

Precipitation-Deposition

This method will combine the metal precursor-decomposition technique above, with the coprecipitation technique described above. Specifically, the monolith will be submerged in a 1 M solution of the appropriate metal precursors in the necessary stoichiometric ratio. Next, a precipitating reagent will be added to produce the metal hydroxides. Decomposition at elevated temperatures in air will generate a metal oxide coating on the monolith surface. As with the above method, the catalyst metal can be incorporated with the original precursor solution, or added in a second step. It is anticipated that adding the metal in a second step will reduce the amount enveloped by the metal oxide layer, and lead to higher activity at lower metal loading This method should yield surface structure and particle size characteristics similar to the coprecipitated powders.

Wash Coating

The wash coating technique described above may also be used to coat the ceramic monolith.

b. Ceramic Pellets

Figure 25:
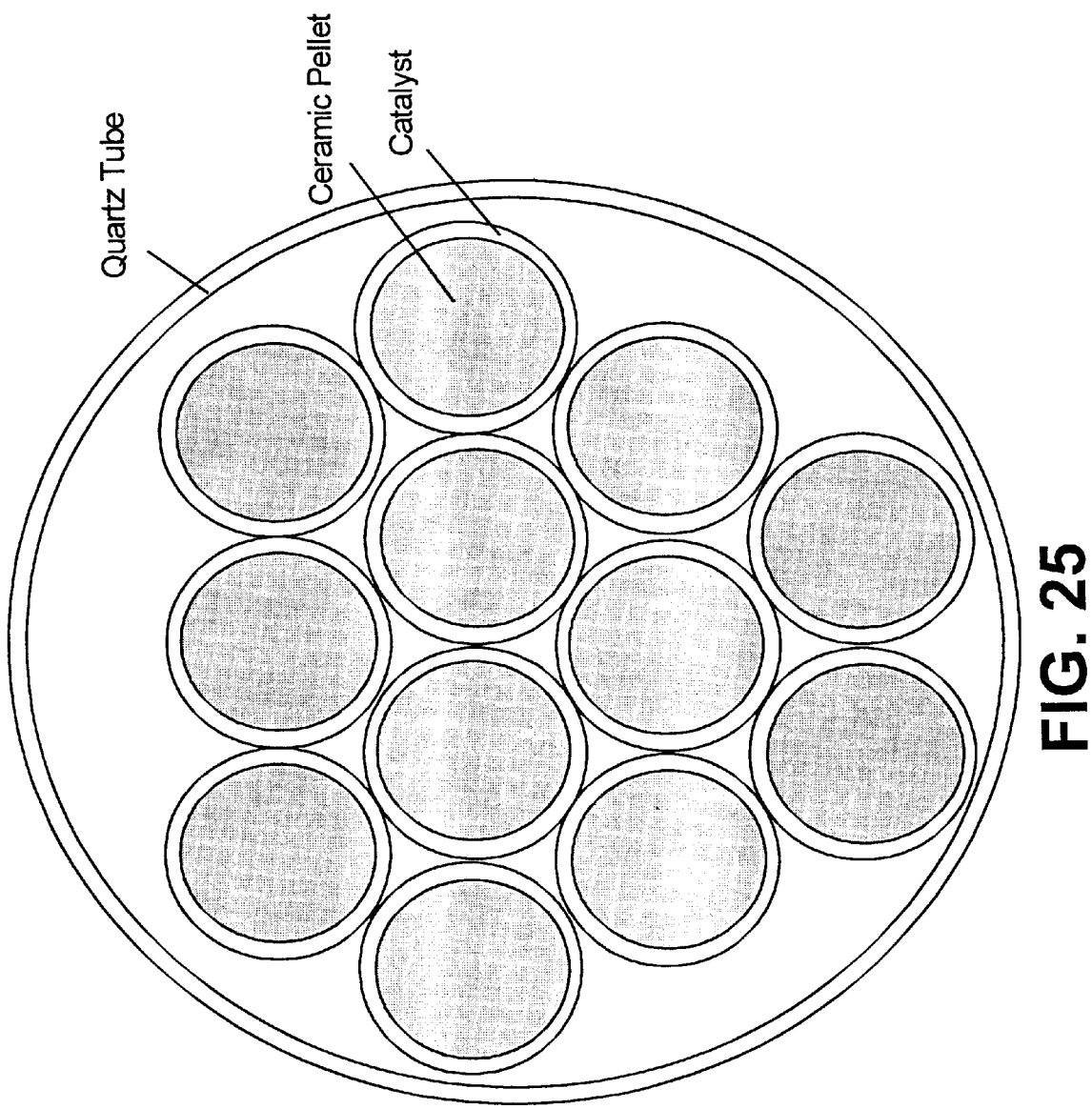
FIG. 25 shows a cross-section diagram of a quartz reactor tube packed with catalyst-coated pellets.

Catalyst pellets can be prepared either by pressing the catalyst material into a ceramic body of the desired shape, or by coating the outside of pre-pressed pellets with catalyst. The former type will have greater structural integrity; however most of the catalyst material is incorporated on the inside of the pellet and is not contributing to the activity. The later pellet configuration will be more susceptible to degradation from loss of catalyst from the surface; however, much less catalyst is required, which is more desirable for catalysts containing precious metals. Two types of pellet configurations will be investigated, although others are possible. For the first type of pellet configuration, inert pellets of alumina and silica with approximately 6-mm particle diameters will be obtained from commercial sources and coated with catalyst for use as large-grain structural supports. Smaller grain pellets will be prepared by crushing and sieving the 6-mm diameter pellets to 4- and 2-mm diameters. The method of incorporation of the catalyst onto the pellets likely will be critical to the resulting activity, stability, and pressure drops observed for the system. Therefore, the exact same methods described for coating the monolith supports also will be compared for coating pellets. As with the monoliths, the objective is to obtain a well-distributed, reproducible layer of catalyst on the pellet surface. The resulting catalyst-coated pellets will be loosely packed in a quartz tube to form a structure similar to the coated monolith, as shown in FIG. 25. From the figure, it is evident that the size of the pellets will be an important variable to overall performance. Pellets that are to large will lead to bypassing and channeling of the gas stream; whereas pellets that are too small might lead to impractical pressure drops in the reactor.

The second type of pellet configuration will involve preparing pellets from the active powder supports, then depositing the catalytic precious metal(s) on the exterior of the pellet. The pellets will be formed by mixing approximately 1 g of powder support with 1 to 3 wt-% of a ceramic binder (e.g. methylcellulose) and drying in an oven. The resulting powder will be introduced into a pellet press and pressed at 25,000 to 60,000 psi for 1 to 5 minutes. The green pellets of each material will be sintered in a bed of the same material in alumina or zirconia crucibles. Sintering temperatures of 1200° C. to 1900° C. will be used to achieve greater than 90% of the theoretical density, as determined from unit cell volumes calculated from the XRD patterns. Once the pellets are centered, they will be ground to the desired size range, and immersed into a solution of the catalytic metal precursor, followed by drying and heating under a flow of $H_2$ at 300° C. for 3 hours. The high sintering temperatures will be used to achieve high material densities, which will be desirable to minimize the amount of metal precursor that wicks into the support. However, is should be pointed out that the high temperatures required for sintering will not be compatible with many of the doped $CeO_2$ materials in this program due to insolubility of the phases.

c. Catalyst Clusters

Catalyst clusters will be prepared by spreading out a layer of active support in a Pyrex dish, and spraying a fine mist of catalytic metal precursor over the powder using an air brush paint sprayer. Mechanical agitation of the dish during the spraying process will result in clustering of the catalyst. The degree of metal loading in the clusters will be controlled by varying the concentration and amount of precursor solution applied to the powder. The resulting clusters will be oven dried, and sintered to produce structural rigidity. Then, the catalytic metal will be reduced under a flow of $H_2$ at 300° C. for 3 hours. The exact sintering conditions will be determined experimentally. Again, if high temperatures are required to attain acceptable integrity, this method might not be compatible with the doped $CeO_2$ materials.

Results for Catalytic Monoliths

Figure 26:
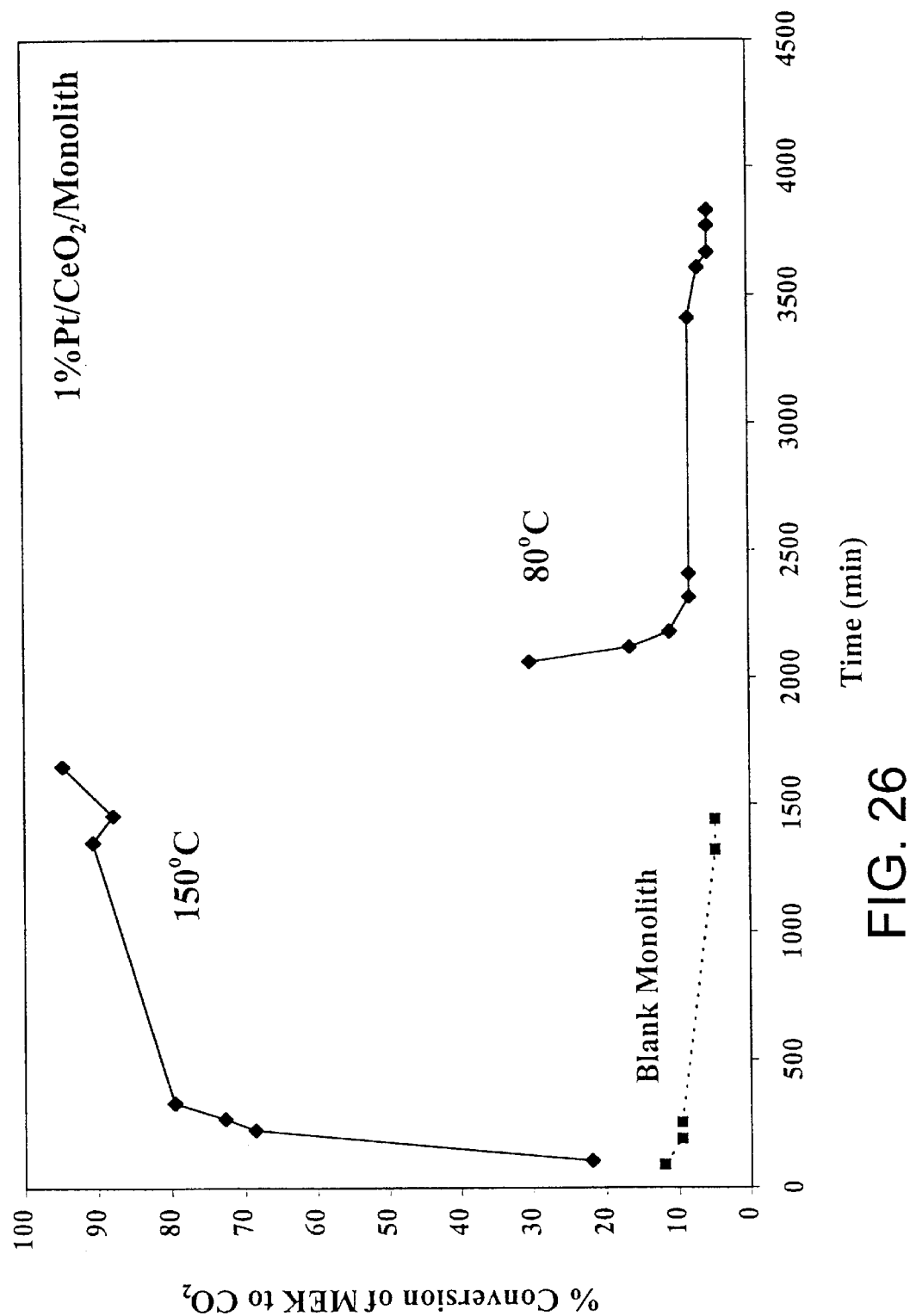
FIG. 26 is a plot showing the % conversion of MEK to $CO_2$ for a monolith coated with $1\%Pt/CeO_2$. The solid line is for the catalyst-coated monolith, and the dashed line is for a blank (no catalyst) monolith.

The results for screening monolith-supported 1%Pt/$CeO_2$ with MEK are presented in FIG. 26. The concentration of MEK was ~150 ppm in air, and the flow rate through the section of monolith (with dimensions described above) was ~9 mL/min. At 150° C., there was an increase in conversion over 1600 minutes to ~95%. The supported catalyst was then heated at 150° C. under a flow of air for several hours, and the temperature was dropped to 80° C. Initially, a conversion rate of 30% was achieved, but the conversion dropped over ~400 minutes to a steady value of ~8%. This conversion rate was maintained for ~1000 minutes before gradually dropping to 6%. For comparison, the results for a bare monolith (no catalyst) run in parallel under the exact same conditions also is shown in the figure. At 80° C., the blank monolith did not decompose any MEK.

Other catalyst compositions and structural supports may be used to optimize the conversion of VOCs using the methods described herein, or by modification of the methods described herein, or the methods well known to the art.

Although the description above contains many specificities, these should not be construed as limiting the scope of the invention but as merely providing illustrations of some of the presently-preferred embodiments of the invention. For example, other methods of preparing catalysts may be used. Also, different metals than described in the Examples may be incorporated. Thus, the scope of the invention should be determined by the appended claims and their legal equivalents, rather than by the examples given.

All references cited herein are hereby incorporated by reference to the extent not inconsistent with the disclosure herein.

We claim:

1. A catalyst composition for destruction of VOCs in a gas comprising one or more first metals selected from the group consisting of Ce and Zr and at least one of:
   (a) one or more second metals selected from the group consisting of: Gd, La, Sr and Sc; or
   (b) one or more third metals selected from the group consisting of: Ti, V, Mn, Fe, Co, Cr, Ni, Au, Ag and Cu; and optionally
   (c) one or more fourth metals selected from the group consisting of: Pt, Pd, Rh, Ru, Re, Os and Ir with the formula:

$nN/Ce_{1-x}Zr_cA_aA'_{a'}A''_{a''}B_bB'_{b'}B''_{b''}O_{2-\delta}$ wherein
   n is a percentage from 0 to 25;
   N is selected from the group consisting of fourth metals and mixtures thereof;
   x=a+a'+a''+b+b'+b''+c;
   a, a', a'', b, b', b'' and c are each, independently of one another, 0 to 0.9;
   δ is a number which renders the composition charge neutral;
   A, A' and A'' are independently selected from the group consisting of second metals;
   B, B' and B'' are independently selected from the group consisting of third metals;
   and provided that when n is zero, at least one of a, a', a'', b, b', b'' or c is nonzero.

2. The catalyst composition of claim 1, wherein N is selected from the group consisting of Pt and Pd and mixtures thereof.

3. The catalyst composition of formula:

$Ce_{1-f}Cu_fO_{2-\delta}$ wherein f is about 0.001 to about 0.5 and δ is a number which renders the composition charge neutral.

4. The catalyst composition of claim 3 of formula:

$Ce_{0.9}Cu_{0.1}O_{2-\delta}$ wherein δ is a number which renders the composition charge neutral.

5. The catalyst composition of claim 3 of formula:

$Ce_{0.8}Cu_{0.2}O_{2-\delta}$ wherein δ is a number which renders the composition charge neutral.

6. The catalyst composition of claim 1 of formula:

$Ce_{1-g}Mn_gO_{2-\delta}$ wherein g is about 0.001 to about 0.8 and δ is a number which renders the composition charge neutral.

7. The catalyst composition of claim 6 of formula $Ce_{0.8}Mn_{0.2}O_{2-\delta}$.

8. The catalyst composition of claim 6 of formula $Ce_{0.5}Mn_{0.5}O_{2-\delta}$.

9. The catalyst composition of claim 6 which is a multi-phase material.

10. The catalyst composition of claim 1 of formula $Ce_{0.5}Fe_{0.1}Cu_{0.4}O_{2-\delta}$.

11. The catalyst composition of claim 1 of formula $Ce_{0.475}Zr_{0.05}Mn_{0.475}O_{2-\delta}$.

12. The catalyst composition of claim 1 of formula:

$Ce_{0.45}Zr_{0.05}Mn_{0.45}Cu_{0.05}O_{2-\delta}$ wherein δ is a number which renders the composition charge neutral.

13. The catalyst composition of claim 1 of formula:

$Ce_{0.8}Zr_{0.05}Cu_{0.15}O_{2-\delta}$ wherein δ is a number which renders the composition charge neutral.

14. A catalyst composition for destruction of VOCs in a gas comprising:
   one or more first metals selected from the group consisting of: Ce and Zr and further comprising:
      (a) one or more second metals selected from the group consisting of: Gd, La, Sr and Sc; or
      (b) one or more third metals selected from the group consisting of: Ti, V, Mn, Fe, Co, Cr, Ni, Au, Ag and Cu; and optionally
      (c) one or more fourth metals selected from the group consisting of: Pt, Pd, Rh, Ru, Re, Os and Ir having formula:

$nN/mCe_{1-x}A_aA'_{a'}B_bB'_{b'}O_{2-\delta}/Zr_{1-z}A''_{a''}A'''_{a'''}B''_{b''}B'''_{b'''}O_{2-\delta}$ wherein
   n is a percentage from 0 to 15;
   m is a percentage greater than 0;
   N is selected from the group consisting of fourth metals and mixtures thereof;
   x=a+a'+b+b';
   z=a''+a'''+b''+b''';
   a, a', a'', a''', b, b', b'' and b''' are each, independently of one another, 0 to 0.5;
   δ is a number which renders the composition charge neutral;
   A, A', A'' and A''' are independently selected from the group consisting of second metals;
   B, B', B'' and B''' are independently selected from the group consisting of third metals;

provided that when n is zero, at least one of a, a', a", a'", b, b', b" or b'" is nonzero.

15. The catalyst composition of claim 14 wherein N is one or metals selected from the group consisting of: Pt and Pd and mixtures thereof.

16. The catalyst composition of claim 14, wherein n is a percentage from 0.01 to 10.

17. The catalyst composition of claim 14 wherein n is a percentage from 0.01 to 5.

18. The catalyst composition of claim 14 wherein n is a percentage from 0.01 to 2.

19. The catalyst composition of claim 14 of formula 1% $Pt/12\% CeO_2/ZrO_2$.

20. A catalyst composition for destruction of VOCs in a gas comprising:
   one or more first metals selected from the group consisting of: Ce and Zr and further comprising:
   (a) one or more second metals selected from the group consisting of: Gd, La, Sr and Sc; or
   (b) one or more third metals selected from the group consisting of: Ti, V, Mn, Fe, Co, Cr, Ni, Au, Ag and Cu; and optionally
   (c) one or more fourth metals selected from the group consisting of: Pt, Pd, Rh, Ru, Re, Os and Ir having formula:

$nN/m(CeO_2)/p(A_a A'_{a'} A''_{a''} A'''_{a'''} B_b B'_{b'} B''_{b''} O_{2-\delta})/q(A'''_{a'''} A''''_{a''''} A'''''_{a'''''} B'''_{b'''} B''''_{b''''} B'''''_{b'''''} O_{2-\delta})$ wherein
   n, p and q are percentages from 0 to 50;
   m is a percentage greater than 0;
   N is one or more metals selected from the group consisting of fourth metals;
   a, a', a", a'", a"", a""', b, b', b", b'", b"" and b""' are each, independently of one another, 0 or 1;
   δ is a number which renders the composition charge neutral;
   A, A', A", A'", A"" and A""' are independently selected from the group consisting of second metals;
   B, B', B", B'", B"" and B""' are independently selected from the group consisting of third metals;
   provided that when n is zero, at least one of p and q is nonzero and at least one of a, a', a", a'", a"", a""', b, b', b", b'", b"" and b""' is nonzero.

21. The catalyst composition of claim 20, wherein N is selected from the group consisting of Pt and Pd and mixtures thereof.

22. The catalyst composition of claim 20 with formula $CeO_2/10\% CuO$.

23. The catalyst composition of claim 20 with formula $CeO_2/10\% MnO_2$.

24. A catalyst composition for destruction of VOCs in a gas with the formula: $Ce_{1-x}Mn_b CO_{2-\delta}$, where x=b+b', x is less than or equal to 0.95 and greater than or equal to 0.05, b and b' are, independently of one another, 0.01 to 0.9, and δ is a number which renders the composition charge neutral.

25. The catalyst composition of claim 24 wherein x is greater than 0.5.

26. A catalyst composition with formula $Ce_{0.3}Mn_{0.6}Co_{0.1}O_{2-\delta}$.

27. A catalyst composition for destruction of VOCs in a gas with the formula: $Ce_{1-x}Mn_b Zr_c O_{2-\delta}$, where x=b+c; c is less than or equal to 0.1; x is less than or equal to 0.95 and greater than or equal to 0.05, and δ is a number which renders the composition charge neutral.

28. The catalyst composition of claim 27 wherein (1−x) is greater than or equal to 0.3 and less than or equal to 0.7.

29. A catalyst composition with formula $Ce_{0.53}Mn_{0.41}Zr_{0.06}O_{2-\delta}$.

* * * * *

UNITED STATES PATENT AND TRADEMARK OFFICE
CERTIFICATE OF CORRECTION

PATENT NO. : 6,458,741 B1
DATED : October 1, 2002
INVENTOR(S) : Roark et al.

It is certified that error appears in the above-identified patent and that said Letters Patent is hereby corrected as shown below:

Column 2,
Line 16, replace "∈-alumina" with -- α-alumina --.

Column 3,
Line 34, replace "Jr" with -- Ir --.

Column 4,
Line 8, replace "15 N" with -- 15; N --.
Line 26, replace "5Pt/$Ce_{0.8}Au_{0.2}O_{2-\delta}$," with -- 5%Pt/$Ce_{0.8}Au_{0.2}O_{2-\delta}$ --.
Line 55, replace "1% Pt/12%$CeO_2$/$ZRO_2$" with -- 1% Pt/12%$CeO_2$/$ZrO_2$ --.
Lines 58 and 59, replace "nN/m ($CeO_2$)/p ($A_a A`_a A``_a B_b B`_b B``_b O_{2-\delta}$)/q ($A```_a A````_a A`````_a B```_b B````_b B`````_b O_{2-\delta}$)" with --nN/m ($CeO_2$)/p ($A_a A`_a A``_a B_b B`_b B``_b O_{2-\delta}$)/q ($A```_a A````_a A`````_a B```_b B````_b B`````_b O_{2-\delta}$)--.

Column 13,
Line 67, replace the second "," with -- . --.

Column 14,
Line 2, replace "$Ce_{0.8}Au_{0.22}O_{2-\delta}$," with -- $Ce_{0.8}Au_{0.2}O_{2-\delta}$, --.

Column 15,
Line 59, replace "$CeO_{0.8}Zr_{0.2}O_{2-\delta}$" with -- $Ce_{0.8}Zr_{0.2}O_{2-\delta}$ --.

Column 16,
Line 37, replace "1250-1402 $cm^-$(a)," with -- 1250-1402 $cm^{-1}$(a), --.

Column 21,
Line 27, please add "~" before "1000".

Column 22,
Line 32, replace "Pt/$Zro_2$" with -- Pt/$ZrO_2$ --.

Column 23,
Line 32, replace "5%Pt/$Ce_{0.2}Co_{0.2}O_{2-\delta}$" with -- 5%Pt/$Ce_{0.8}Co_{0.2}O_{2-\delta}$ --.

Column 27,
Line 18, after "with" please add -- light-off termperatures (50% conversion to $CO_2$) between 40º C and 60º C. For MEK, this catalyst --.

UNITED STATES PATENT AND TRADEMARK OFFICE
CERTIFICATE OF CORRECTION

PATENT NO.   : 6,458,741 B1
DATED        : October 1, 2002
INVENTOR(S)  : Roark et al.

It is certified that error appears in the above-identified patent and that said Letters Patent is hereby corrected as shown below:

Column 30,
Line 51, before "100" please add -- ~ --.

Column 31,
Line 1, replace "$Ce_{0.6}Cu0.4O_{1.6}$" with -- $Ce_{0.6}Cu_{0.4}O_{1.6}$ --.
Line 26, before "100" please add -- ~ --.

Column 32,
Line 5, please replace "$NO_3{}^{31}$" with -- $NO_3^-$ --.

Column 33,
Line 11, before "100" please add -- ~ --.

Column 35,
Line 28, replace "$CC(NO_3)_3$" with -- $Ce(NO_3)_3$ --.

Column 37,
Line 42, replace

"$nN/Ce_{t-x}Zr_cA_aA'_aA''_{a'}B_bB'_bB''_{b'}O_{2-\delta}$" with

-- $nN/Ce_{1-x}Zr_cA_aA'_aA''_{a'}B_bB'_bB''_{b'}O_{2-\delta}$ --.

Column 40,
Line 18, replace "$Ce_{1-x}Mn_bCO_{2-\delta}$" with -- $Ce_{1-x}Mn_bCo_b, O_{2-\delta}$ --.

Signed and Sealed this

Eighteenth Day of March, 2003

JAMES E. ROGAN
*Director of the United States Patent and Trademark Office*